(12) United States Patent
Baumgartner et al.

(10) Patent No.: US 7,581,170 B2
(45) Date of Patent: Aug. 25, 2009

(54) VISUAL AND INTERACTIVE WRAPPER GENERATION, AUTOMATED INFORMATION EXTRACTION FROM WEB PAGES, AND TRANSLATION INTO XML

(75) Inventors: Robert Baumgartner, Vienna (AT); Sergio I'Lesca, Ronde (IT); Georg Gottlob, Vienna (AT); Marcus Herzoo, Vienna (AT)

(73) Assignee: Lixto Software GmbH, Vienna (AT)

( * ) Notice: Subject to any disclaimer, the term of this patent is extended or adjusted under 35 U.S.C. 154(b) by 856 days.

(21) Appl. No.: 10/479,039

(22) PCT Filed: May 28, 2002

(86) PCT No.: PCT/IB02/03036

§ 371 (c)(1),
(2), (4) Date: May 17, 2004

(87) PCT Pub. No.: WO02/097667

PCT Pub. Date: Dec. 5, 2002

(65) Prior Publication Data

US 2005/0022115 A1  Jan. 27, 2005

Related U.S. Application Data

(60) Provisional application No. 60/294,213, filed on May 31, 2001.

(51) Int. Cl.
*G06N 3/00* (2006.01)
(52) U.S. Cl. ..................................................... 715/234
(58) Field of Classification Search .................. 715/234, 715/243, 254, 255
See application file for complete search history.

(56) References Cited

U.S. PATENT DOCUMENTS 5,826,258 A  10/1998  Gupta et al.

(Continued)

OTHER PUBLICATIONS

TracerLock™ http://web.archive.org/web/20010504003134/http://peacefire.org/tracer/lock/.

(Continued)

*Primary Examiner*—Stephen S Hong
*Assistant Examiner*—Kyle R Stork
(74) *Attorney, Agent, or Firm*—Sughrue Mion, PLLC

(57) ABSTRACT

A method and a system for information extraction from Web pages formatted with markup languages such as HTML [8]. A method and system for interactively and visually describing information patterns of interest based on visualized sample Web pages [5,6,16-29]. A method and data structure for representing and storing these patterns [1]. A method and system for extracting information corresponding to a set of previously defined patterns from Web pages [2], and a method for transforming the extracted data into XML is described. Each pattern is defined via the (interactive) specification of one or more filters. Two or more filters for the same pattern contribute disjunctively to the pattern definition [3], that is, an actual pattern describes the set of all targets specified by any of its filters. A method and for extracting relevant elements from Web pages by interpreting and executing a previously defined wrapper program of the above form on an input Web page [9-14] and producing as output the extracted elements represented in a suitable data structure. A method and system for automatically translating said output into XML format by exploiting the hierarchical structure of the patterns and by using pattern names as XML tags is described.

3 Claims, 32 Drawing Sheets

U.S. PATENT DOCUMENTS

| | | | |
|---|---|---|---|
| 5,841,895 A | 11/1998 | Huffman | |
| 5,860,071 A | 1/1999 | Ball et al. | |
| 5,898,836 A | 4/1999 | Freivald et al. | |
| 5,913,214 A | 6/1999 | Madnick et al. | |
| 5,966,516 A * | 10/1999 | De Palma et al. | 703/1 |
| 5,983,268 A | 11/1999 | Freivald et al. | |
| 6,081,804 A * | 6/2000 | Smith | 707/5 |
| 6,102,969 A | 8/2000 | Christianson et al. | |
| 6,128,655 A | 10/2000 | Fields et al. | |
| 2002/0169771 A1 * | 11/2002 | Melmon et al. | 707/5 |

OTHER PUBLICATIONS

Mind-it; printed Mar. 25, 2003 http://web.archive.org/web/20010602164634/www.netmind.com/index.shtml.

XWrap; screenshots.

Daniel F. Savarese OROMatcher 1.1 1997-2000 http://web.archive.org/web/20010603013706/http://www.savarese.org/oro/software/OR....

WebQL; http://web.archive.org/web/20010517194758/http://caesius.com/.

X-Fetch Suite—XML enabling and integrating information systems; Republica Corp, 2002 http://www.x-fetch.com/xhtml/summary.html.

WisoSoftCom InfoScanner MobileScanner Internet Data Mining for Portal http://web.archive.org/web/20010604082928/www.wisosoft.com/en/home.html.

Kapow Techonologies; 2001 SAL Holding, Internet Ventures Scandinavia, Impress Corp. http://web.archive.org/web/20010517005034/http://www.kapowtech.com.

Enabling e-Business with Business Process Integration; Orsus Solutions, Ltd. 2000, Sunnyvale, CA 94088 pp. 1-12.

Unlocking the Internet for Mobile Access/iGlue/Wireless for Integrating Web to Wireless Business Processes; Orsus Solutions, Ltd. 2000, Sunnyvale, CA 94088 pp. 1-15.

Michael Stonebraker and Joseph M. Hellerstein; Content Integration for E-Business; Hayward, CA 94545, pp. 1-9.

Gerald Huck, Peter Fankhauser, Karl Aberer and Erich Neuhold; Jedi: Extracting and Synthesizing Information from the Web; 64293 Darmstadt, Germany, pp. 1-10.

Wolfgang May and Georg Lausen; Information Extraction from the Web. Mar. 2000, 79110 Freiburg, Germany, pp. 1-48.

Giansalvatore Mecca and Paolo Atzeni; Cut and Paste, pp. 1-29.

David Konopnicki and Oded Shmueli; Information Gathering in the World-Wide Web: The W3QL Query Language and the W3QS System, Haifa 32000 Isarel, pp. 1-41.

Seung-Jin Lim Yiu-Kai Ng; WebView: A Tool for Retrieving Internal Structures and Extracting Information from HTML Documents, Provo UT 84602, pp. 1-19.

Fred Douglis, Thomas Ball, Yih-Farn Chen and Eleftherios Koutsofious; The AT&T Internet Difference Engine: Tracking and Viewing Changes on the Web, Jan. 1998, pp. 1-29.

Ling Liu, Calton Pu, and Wei Tang; Continual Queries for Internet Scale Event-Driven Information Delivery; Portland OR, 97291, pp. 1-30.

Nicholas Kushmerick, Daniel S. Weld and Robert Doorenbos; Wrapper Induction for Information Extraction, IJCAI-97, Seattle WA, 98195, pp. 1-7.

Chun-Nan Hsu and Ming-Tzung Dung; Generating Finite-State Transducers for Semi-Structured Data Extraction from the Web, Information Systems vol. 23 No. 8, pp. 521-538, 1998, Great Britain.

Ion Muslea, Steven Minton and Craig A. Knoblock; Hierarchical Wrapper Induction for Semistructured Information Sources, Kluwer Academic Publishers, Netherlands, Sep. 10, 1999 pp. 1-28.

Brad Adelberg; NoDoSe—A tool for Semi-Automtically Extracting Structured and Semistructured Data from Text Documents, Evanston IL, 60201 pp. 1-25.

Stephen W. Liddle, Douglas M. Campbell and Chad Crawford; Automatically Extracting Structure and Data from Business Reports, Provo UT, 84602 pp. 1-23.

Scott B. Huffman; Learning information extraction patterns from examples, Menlo Park CA, 94025 Feb. 22, 2995, pp. 1-15.

D.W. Embley and L. Xu; Locating and Reconfiguring Records in Unstructured Multiple-Record Web Documents, Provo UT, 84602 pp. 1-20.

Hasan Davulcu, Guizhen Yang, Michael Kifer and I.V. Ramakrishnan; Computational Aspects of Resilient Data Extraction form Semistructured Sources, Stony Brook NY, 11794 Feb. 3, 2002, pp. 1-17.

Hasan Davulcu, Guizhen Yang, Michael Kifer and I.V. Ramakrishnan; Design and Implementation of the Physical Layer in WebBases: The XRover™ Experience, J. Lloyd et al. (Eds.): LNAI 1861, pp. 1904-1105, 2000. © Springer-Verlag Berlin Heidleberg 2000.

Naveen Ashish and Cragi A. Knoblock; Semi-automatic Wrapper Generation for Internet Information Sources, Marina del Rey CA, 90292 pp. 1-10.

Ling Liu, Calto PU and Wei Han; XWRAP: An SML-enabled Wrapper Construction System for Web Information Sources, Atlanta GA 30332 pp. 1-11.

Arnaud Sahuguet and Fabien Azavant; Building Intelligent Web Applications Using Lightweight Wrappers, Barrault Paris, 75634 Cedex 13, France, Jul. 11, 2000 pp. 1-37.

Berthier Ribeiro-Neto, Alberto H.F. Laender and Altigran S. Da Silva; Extracting Semi-Structured Data Through Examples, 31270-901 Belo Horizonte MG Brazil, pp. 1-8.

Jean-Robert Gruser, Louiqa Raschid, Maria Ester Vidal and Laura Bright; Wrapper Generation for Web Accessible Data Sources, College Park MD, 20742 pp. 1-10.

Robert Baumgartner, Sergio Flesca and Georg Gottlob; Visual Web Information Extraction with Lixto, Roma Italy, 2001 pp. 1-10.

Robert Baumgartner, Sergio Flesca and Georg Gottlob; The Elog Web Extraction Language, pp. 1-13.

J. Hammer, H. Garcia-Molina, J. Cho, R Aranha and A. Crespo; Extracting Semistructured Information from the Web, Stanford, CA 94305 pp. 1-8.

Alberto O. Mendelzon and Geroge A. Mihaila; Querying the World Wide Web, Mar. 20, 1996, pp. 1-23.

* cited by examiner

Fig. 7

| Name | Website | Used Example Page | No. Testpages |
|---|---|---|---|
| Amazon | http://www.amazon.com/ | Lord of the Rings | 10 |
| CIA Factbook | http://www.odci.gov/cia/publications/factbook/ | United Kingdom | 12 |
| Cinemachine | http://www.cinemachine.com/ | The World is not enough | 15 |
| DBLP | http://www.informatik.uni-trier.de/~ley/db/ | Michael Ley | 10 |
| Election/State | http://www.cnn.com/ELECTION/2000/results/ | Alabama | 50 |
| EBAY | http://www.ebay.com/ | query on Notebooks | 20 |
| Excite Weather | http://www.excite.com/weather/forecast | London (UK) | 12 |
| Jobs-Jobs-Jobs | http://www.jobsjobsjobs.com/ | 23370 | 10 |
| Perl Module List | http://www.cpan.org/modules/00modlist.long.html | single huge page | ex.pg. |
| Travelnotes | http://www.travelnotes.org/ | query on Istanbul | 10 |
| Yahoo People Email | http://people.yahoo.com/ | query on Mayer | 15 |
| Yahoo Weather | http://weather.yahoo.com/ | Paris | 15 |

Table 1: Some of the test-sites used for *Lixto*

| Name | wrapable? | Complexity | Correct | Pg.s for 100% | Time/Pattern (mins) | Depth |
|---|---|---|---|---|---|---|
| Amazon | yes | 16/9 = 1.78 | 95% | 3 | 22/9 = 2.44 | 4 |
| CIA Factbook | yes | 17/5 = 3.4 | 80% | 3 | 18/5 = 3.6 | 3 |
| Cinemachine | yes | 6/4 = 1.5 | 100% | 1 | 16/4 = 4 | 2 |
| DBLP | yes | 27/9 = 3 | 90% | 2 | 54/9 = 6 | 8 |
| Election Results / State | yes | 4/2 = 2 | 100% | 1 | 6/2 = 3 | 2 |
| EBAY | yes | 19/8 = 2.38 | 99.9% | 2 | 21/8 = 2.63 | 4 |
| Excite Weather | yes | 22/7 = 3.14 | 100% | 1 | 30/7 = 4.3 | 3 |
| Jobs Jobs Jobs | yes | 21/12 = 1.75 | 90% | 3 | 40/12 = 3.3 | 2 |
| Perl Module List | yes | 22/5 = 4.4 | (100 %) | (1) | 60/5 = 14 | 6 |
| Travelnotes | yes | 11/4 = 2.75 | 95% | 2 | 20/4 = 5 | 2 |
| Yahoo People Email | yes | 10/3 = 3.3 | 100% | 1 | 24/3 = 8 | 3 |
| Yahoo Weather | yes | 22/10 = 2.2 | 100% | 1 | 12/10 = 1.2 | 3 |

Table 2: Evaluation of wrapper generation

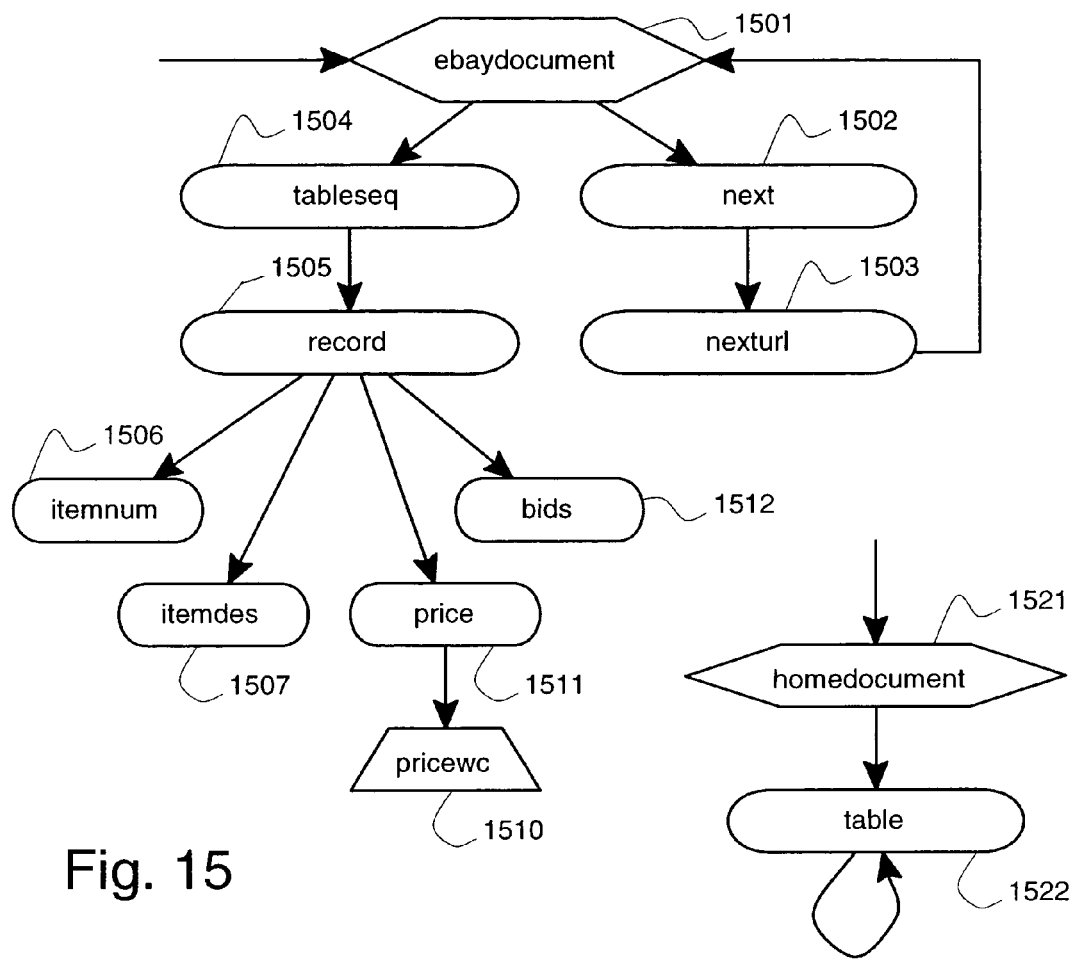
Fig. 15
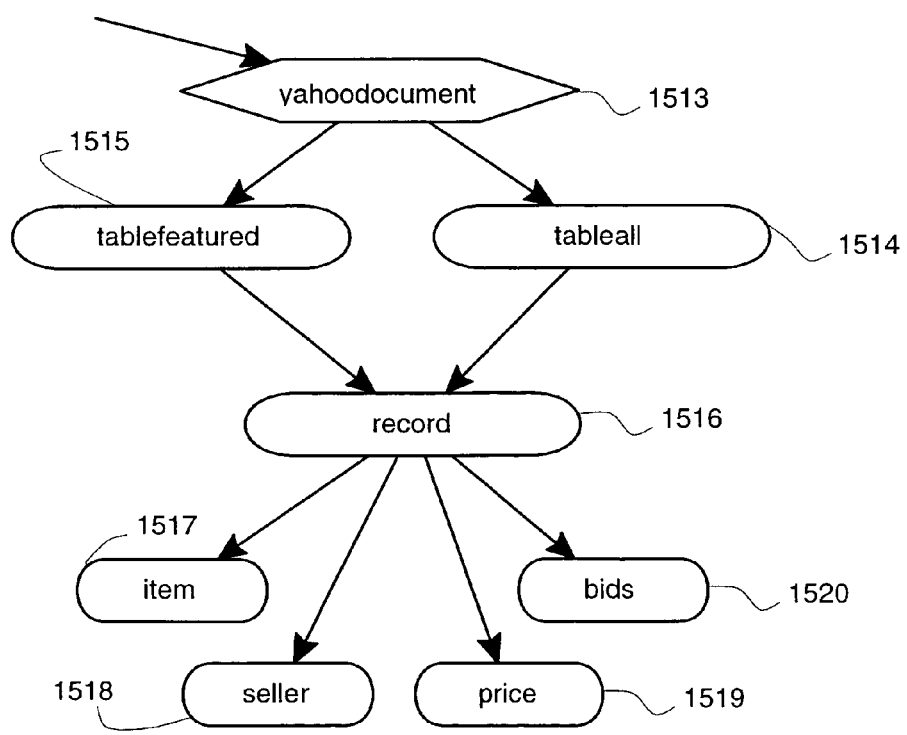

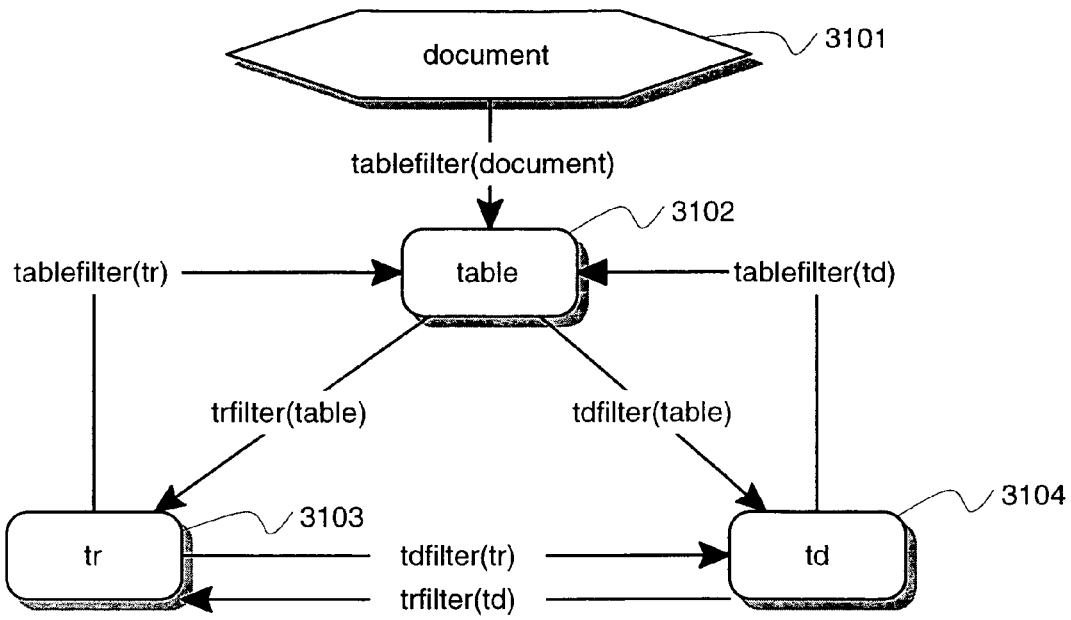
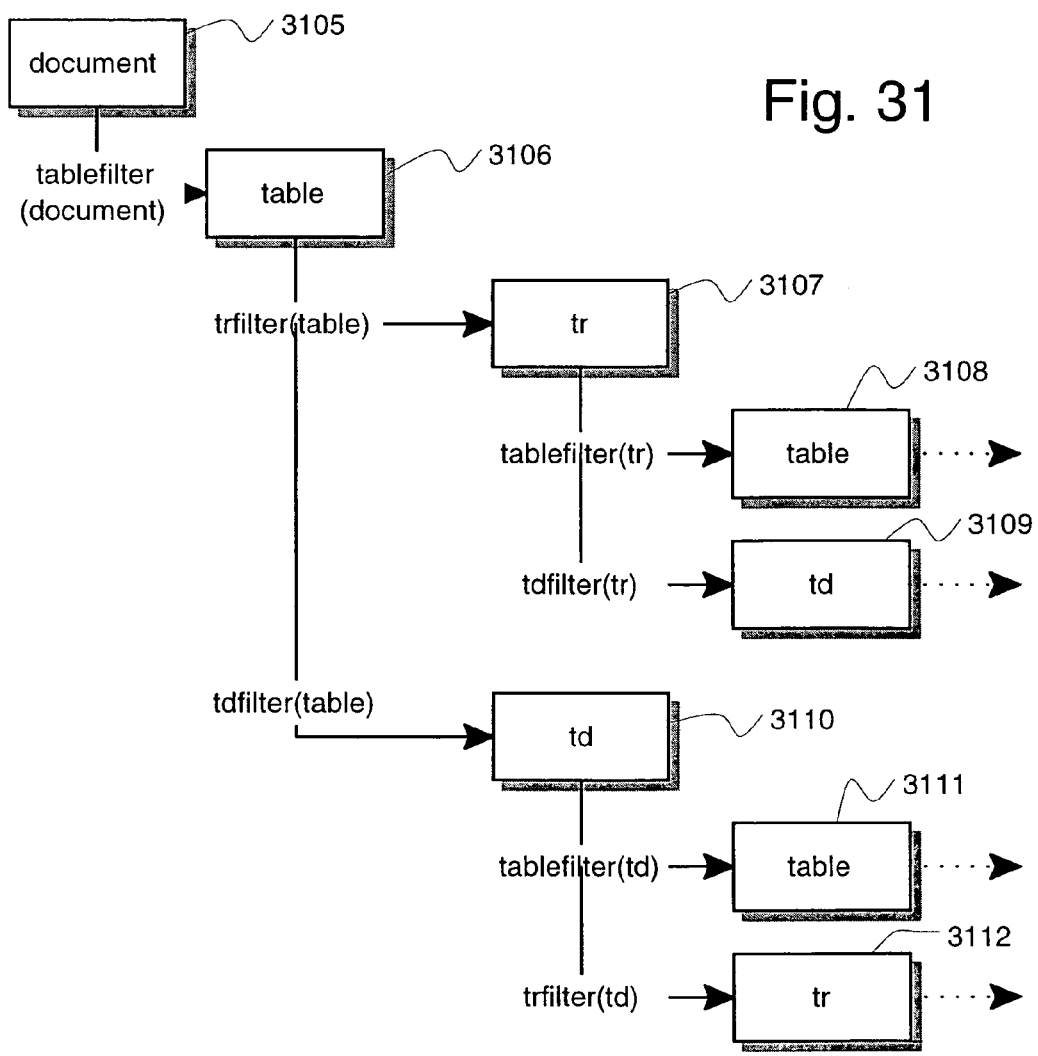
Fig. 31

VISUAL AND INTERACTIVE WRAPPER GENERATION, AUTOMATED INFORMATION EXTRACTION FROM WEB PAGES, AND TRANSLATION INTO XML

A. RELATED APPLICATIONS

This is a National stage entry under 35 U.S.C. § 371 of PCT Application No. PCT/IB02/03036 filed May 28, 2002; the above noted application is hereby incorporated by reference.

The present application claims priority from the U.S. Provisional Application Ser. No. 60/294,213, having the same title filed May 31, 2001

B. BACKGROUND

1. Field of Invention

This disclosure teaches techniques related in general to the field of information processing. More particularly, the teachings relate to methods, systems and computer-program products for information extraction from Web pages, to the construction of wrappers (i.e. extraction programs), based on example Web pages, and to the transformation of "relevant" parts of HTML documents into XML.

2. Basic Concepts, Terminology, and Introduction

The World Wide Web (abbreviated as Web) is the world's largest data repository and information retrieval system. In this environment, client machines effect transactions to Web servers using the Hypertext Transfer Protocol (HTTP), which is an application protocol usually providing user access to files formatted in a standard page description language known as Hypertext Markup Language (HTML). HTML provides basic document formatting (and some logical markup) and allows the developer to specify "links" to other servers and documents. In the Internet paradigm, a network location reference to a server or to a specific Web resource at a server (for example a Web page) is identified by a so-called Uniform Resource Locator (URL) having a well-defined syntax for describing such a network location. The use of an (HTML-compatible) browser (e.g. Netscape Navigator, Microsoft Internet Explorer, Amaya or Opera) at a client machine involves the specification of a link by the means of an URL. The client then makes a request to the server (also referred to as "Web site") identified by the link and receives in return an HTML document or some other object of a known file type. Simple and less sophisticated browsers can easily be written in a short time and with little effort in (object-oriented) programming languages such as Java, where powerful program libraries are available that already contain modules or classes providing the main functionalities of browsers (for example, the JEditorPane class of the javax.swing package).

Browsers or other applications working with HTML documents internally represent an HTML document in the form of a tree data structure that basically corresponds to a parse tree of the document. A model for representing and manipulating documents in form of trees is referred to as Document Object Model (DOM). Several DOMs for HTML documents have been defined and are used by different programming environments and applications, but the differences among these DOMs are rather inessential. An example for such a DOM is the so called "Swing DOM", which is part of the Javax Swing Package, a programming package containing useful libraries of Java classes for manipulating HTML documents. A DOM tree of an HTML document represents its hierarchical structure. In particular, the root of a DOM tree of an HTML document represents the entire document, while intermediate nodes of the tree represent intermediate elements such as tables, table rows, and so on. The leaves usually represent terminal (i.e., structurally indecomposable) data such as atomic text items or images. Each node of an HTML DOM tree can be associated with certain attributes that describe further features of the represented element (such as style, font size, color, indentation, and so on).

One important disadvantage of HTML is its main orientation as formatting and layout language, but not as data description language. In fact, the nodes of an HTML DOM tree are predefined elements that basically correspond to HTML formatting tags. Therefore it is difficult and very cumbersome (if at all possible) to query an HTML document using query languages in order to automatically extract useful and hierarchically structured information. Given that HTML provides no data description nor any tagging or labeling of data except for formatting purposes, it is often difficult and sometimes impossible to formulate a query that allows a system to distinguish, say, a first name from a family name or from an address appearing in the same HTML document. For this reason, web documents which are intended to be queried or processed by software applications are hierarchically organized using display-independent markup. Such, so-called semistructured, documents are often more suitably formatted in markup languages such as XML (eXtensible Markup Language).

XML is a standard for data exchange adopted by the World Wide Web Consortium (W3C) in 1999. The main advantage of XML is that it allows a designer of a document to label data elements using freely definable tags. The data elements can be organized in a hierarchy with arbitrarily deep nesting. Optionally, an XML document can contain a description of its grammar, the so-called Document Type Definition (DTD). An XML document or a set of such documents can be regarded as a database and can be directly processed by a database application or queried via one of the new XML query languages such as XSL, XSLT, XPath, XPointer, XQL, XML-QL, XML-GL, and XQuery. Moreover, powerful languages such as XSLT do not just serve for defining queries but can transform their output into an appropriate format suitable for further processing, e.g. into an email message or a piece of plain text to be sent to a cellular phone.

Note that most Web pages are still formatted in HTML. This is not expected to change soon, even though XML has been attracting a lot of attention. One reason for this may be that, due to the limited syntax of HTML, this language is somewhat easier to learn and to use than XML. Moreover, HTML documents are very often designed by laypersons, i.e., non-programmers, who are not suitably trained in the logical skills to systematically define data structures as required by XML and who therefore feel more comfortable using widely available editors and tools such as Dreamweaver, Frontpage or HotMetal in order to create HTML Web pages in a "what you see is what you get" manner. Furthermore, document designers often do not anticipate the need of others to process their documents automatically but mainly have a human beholder of their Web pages in mind. Finally, many companies deliberately refrain from offering data in XML format in order to obstruct automated processing of the published data by others.

On the other hand, there is a tremendous need for automating Web data processing and monitoring tasks. In the Business to Business (B2B) context it is often of crucial importance to a company to be immediately informed about price changes on the Web site of a competitor, about new public offerings or tenders popping up on a Web site of some corporate or government institution, or about changes in exchange rates, share quotas, and so on. Similarly, individuals can heavily profit from automated web monitoring. For example, imagine one would like to monitor interesting notebook offers at electronic auctions such as eBay (http://www.ebay.com). A notebook offer is considered interesting if, say, its price is below GBP 3000 (Great Britain Pounds), and if it has already received at least two offers by others. The eBay site allows one to make a keyword search for "notebook" and to specify a price range in USD (US Dollars) only. More complex queries such as the desired one cannot be formulated. Similar sites do not even give restricted query possibilities and leave you with a large number of result records organized in a huge table split over dozens of Web pages. One has to wade through all these records manually, because of no possibility to further restrict the result.

All these problems could be solved efficiently if the relevant parts of the respective source data were made available in XML format.

Thus, there is a significant need for methods and systems that are able to perform some or all of the following four tasks:

1. Identify and isolate relevant parts or elements of (possibly remote) Web pages.
2. Automatically extract the relevant parts of Web documents even though the respective documents may continually change contents and even (to a certain extent) structure.
3. Suitably transform the extracted parts into XML to make them available for querying and further processing.
4. Assist a developer or application programmer in creating and using programs or systems able to perform tasks (1), (2), and (3). A subtask of central importance is supporting the developer in the definition of relevant extraction patterns. Extraction patterns serve to identify information of one particular kind.

Tasks (1) and (2) together are often referred to as "Web information extraction" or also as "data extraction from the Web". Task (3) is referred to as "translation into XML". Note that a useful and meaningful translation into XML does not merely consist of reformatting an HTML document, according to the XML standard, but also in enriching the document with structural information and data description tags. The translated document will thus contain some structural and descriptive information that is not present in the original document.

A program specifying how the above tasks (1), (2), and (3) are to be performed is referred to as "wrapper" or "wrapper program". Wrappers may be written in a publicly available multi-purpose (procedural) programming language with primitives able to manipulate web resources (such as Java, C++, or Perl) in which case they can be compiled (or interpreted) and executed in a regular fashion using standard software resources (just as other programs in that language). Alternatively, wrappers can be formulated in some dedicated or proprietary high-level declarative language that needs a specially constructed interpreter or compiler.

A program or system that automatically or semi-automatically generates wrappers is referred to as "wrapper generator". A software tool that merely assists a human in manually programming and testing a wrapper, is referred to as "wrapper programming assistant". Task (4) can be solved by means of a wrapper generator, by means of a wrapper programming assistant, or by some hybrid tool.

3. Desirable Properties of Methods and Systems for Wrapper Generation and Web Information Extraction It is desirable to enable a very large number of computer users, including laypersons having no programming skills or expertise on HTML or similar formats, to create robust wrappers using a small number of sample pages, such that these wrappers are then able to automatically extract relevant and complex parts of Web pages and to translate the extracted information automatically into XML. With respect to this goal, a method or system for wrapper generation, Web data extraction, and translation into XML should fulfill at least some of the following properties:

High expressive power. The system should enable the definition of complex, structurally organized patterns from Web pages and translate the corresponding data (the so-called pattern instances) into a corresponding hierarchically structured XML document.

User friendliness. It should allow a human wrapper designer to design, program, or specify wrappers in a very short time. The user interaction should be efficient and suitable for constructing wrappers and specifying the XML translation.

Good learnability. The learning effort for being able to understand the method or use the system should be as small as possible. The method or system should be accessible to, and usable by, a layperson who is not a programmer or a computer scientist and has no programming experience. In the best case, it should not even require knowledge of HTML or XML, which means that a designer is never directly confronted with HTML or XML code (even the XML output can be displayed using nested tables).

Good visual support. It should offer the wrapper designer a GUI (graphical user interface) for specifying wrappers or XML translations. Ideally, the visual user interface allows a wrapper designer to work directly on displayed sample source documents (e.g. on HTML Web pages) and supports a purely visual way of defining extraction patterns.

Ease of accessibility and installation. The system should be widely accessible and should not require particular installation efforts. Ideally, the system provides an interface so that it can be used through a standard Web browser such as Netscape or Internet Explorer.

Parsimony of samples. In case the method or system uses sample pages as a basis for constructing wrappers, it should require only very few of these (a single one at best) for most applications. The reason is that, in many cases, a wrapper designer has only one or very few sample pages at hand. For example, if we decide to construct a wrapper to translate the homepage of the United States Patent and Trademark Office (USPTO) available at http://patents.uspto.gov/into XML (e.g. in order to monitor upcoming new information and press releases and new federal register notes), then, at the time of wrapper construction, one instance of this page will be available at hand, namely, the current page. It should be possible to construct a wrapper based on this single instance which works well for future versions of this page.

Robustness. Wrappers are generally aimed at extracting information from similarly structured Web pages of changing content. It is obvious that wrappers risk failing to deliver a correct result if the structure of the source documents changes. However, a good wrapper is expected to have a certain degree of robustness, i.e., insensibility to minor structural changes. The method or system should allow the generation of fairly robust wrappers.

Runtime Efficiency. The method should provide efficient algorithms and the system should implement these algorithms efficiently such that the system becomes usable in practice and is highly scalable. (This is, of course, a general requirement to be fulfilled by almost all software methods and systems).

Smooth XML Interface. The method or system should provide a smooth and user-friendly way of translating the extracted data into XML in order to make it accessible to further processing, e.g. via XML query engines or well-known transformation languages such as XSLT. Ideally, the translation to XML is done automatically on the basis of the information gathered from the designer during the process of defining extraction patterns.

Clearly, a method and system fulfilling all these requirements is highly desirable and useful. In the paper "Content Integration for E-Business" (M. Stonebraker and J. M. Hellerstein "Content Integration for E-Business", Proceedings of SIGMOD 2001) some of the challenges needed for content integration are presented:". In short, a powerful, easy-to-use tools, is needed to address the broad challenges of cleaning, transforming, combining and editing content. These tools must be targeted at typical, non-technical content managers. In order to be useable the tools must be graphical and interactive, so that content managers can see the data as it is mapped. Any automated techniques must be made clearly visible, so that domain experts can edit and adjust the results. The development of semi-automatic content mapping and integration tools represents a new class of systems challenges, at the nexus of query processing, statistical and logical mapping techniques, and data visualization". The disclosed teachings are aimed at realizing some of the advantages and overcoming some of the disadvantages noted herein.

4. References

The following documents provide background information helpful in understanding this disclosure, and to that extent, they are incorporated herein by reference. They are referred to, using the abbreviated notations shown below, in subsequent discussions to indicate specific relevance wherever necessary.

(1) U.S. Patent Documents

| | | |
|---|---|---|
| [U1] U.S. Pat. No. 5,826,258 | Gupta et al. | 1998 |
| [U2] U.S. Pat. No. 5,841,895 | Huffmann | 1998 |
| [U3] U.S. Pat. No. 5,860,071 | Ball et al. | 1999 |
| [U4] U.S. Pat. No. 5,898,836 | Freivald et al. | 1999 |
| [U5] U.S. Pat. No. 5,913,214 | Madnick et al. | 1999 |
| [U6] U.S. Pat. No. 5,983,268 | Freivald et al. | 1999 |
| [U7] U.S. Pat. No. 6,102,969 | Christianson et al. | 2000 |
| [U8] U.S. Pat. No. 6,128,655 | Fields et al. | 2000 |

(2) Other Publications

[S1] M. Stonebraker and J. M. Hellerstein "Content Integration for E-Business", Proceedings of SIGMOD 2001

[S2] G. Huck, P. Fankhauser, K. Aberer, E. Neuhold "Jedi: Extracting and Synthesizing Information from the Web", Proceedings of the 3rd IFICS International Conference on Cooperative Information Systems, CoopIfs'98, IEEE Computer Science Press, ISBN 0-8186-8380-5, pp. 32-43, 1998

[S3] W. May and G. Lausen, "Information Extraction from the Web", Technical Report No. 136, Institut fuer Informatik, Albert-Ludwigs-Universitaet, 79110 Freiburg, Germany

[S4] G. Mecca, P. Atzeni, "Cut and Paste", Journal of Computer and System Sciences, Vol. 58, No. 3, pp. 453-482, 1999

[S5] D. Konopnicky and O. Shmueli "Information Gathering in the WWW: The W3QS System", ACM Transactions on Database Systems, Vol.23 No.4, 1998

[S6] S.-J. Lim, and Y.-K. Ng "WebView: A Tool for Retrieving Internal Structures and Extracting Information from HTML Documents" Proceedings of the Sixth International Conference on Database Systems for Advanced Applications (DASFAA), Apr. 19-21 1999, Hsinchu, Taiwan, IEEE Computer Society Press, ISBN 0-7695-0084-6, pp. 71-80

[S7] F. Douglis, T. Ball, Y.-F. Chen, E. Koutsofio, "The AT&T Internet Difference Engine: Tracking and Viewing Changes on the Web", World Wide Web Vol.1 No.1, pp. 27-44, 1998

[S8] L. Liu, C. Pu, and Wei Tang, "Continual Queries for Internet Scale Event-Driven Information Delivery", IEEE Transactions on Knowledge and Data Engineering, Vol. 11, No. 4, July/August 1999

[S9] Nicholas Kushmerick, Daniel S. Weld, Robert B. Doorenbos, "Wrapper Induction for Information Extraction", Proceedings of the Fifteenth International Joint Conference on Artificial Intelligence, IJCAI 97, Nagoya, Japan, Aug. 23-29, 1997. Morgan Kaufmann, 1997, Vol.1, pp. 729-737, 1997

[S10] C.-N. Hsu, M. Tsung Dung "Generating Finite-State Transducers for Semistructured Data Extraction from the Web", Information Systems, Vol.23, No. 8, pp.521-538, 1998

[S11] I. Muslea, S. Minton, and C. A. Knoblock "Hierarchical Wrapper Induction for Semistructured Information Sources", Journal of Autonomous Agents and Multi-Agent Systems, Vol. 4, No. ½, March 2001, pp. 93-114, 2001

[S12] B. Adelberg, "NoDoSe—A Tool for Semi-Automatically Extracting Structured and Semistructured Data from Text Documents", Proceedings of the ACM SIGMOD International Conference on Management of Data, Jun. 2-4, 1998, Seattle, Wash., USA. ACM Press, ISBN 0-89791-995-5, pp. 283-294, 1998

[S13] Stephen W. Liddle, Douglas M. Campbell, Chad Crawford "Automatically Extracting Structure and Data from Business Reports", Proceedings of the 1999 ACM CIKM International Conference on Information and Knowledge Management, Kansas City, Mo., USA, Nov. 2-6, 1999, ACM Press 1999, ISBN 1-58113-146-1, pp. 86-93, 1999

[S14] S. B. Huffman, "Learning information extraction patterns from examples" in S. Wermter, E. Riloff, and G. Sheler, eds., "Connectionist, Statistical, and Symbolic Approaches to Learning for Natural Language Processing", pp. 246-60. Springer-Verlag, 1996

[S15] David W. Embley, L. Xu, "Locating and Reconfiguring Records in Unstructured Multiple-Record Web Documents" Informal Proceedings of the WebDB 2000 International Workshop on the Web and Databases, Texas, USA, May 18-19, 2000, in conjunction with ACM PODS/SIGMOD 2000, pp. 123-128, 2000),

[S16] H. Davulcu, G. Yang, M. Kifer, and I. V. Ramakrishnan "Computational Aspects of Resilient Data Extraction from Semistructured Sources" Proceedings of the Nineteenth ACM SIGMOD-SIGACT-SIGART Symposium on Principles of Database Systems, May 15-17, 2000, Dallas, Tex., USA. ACM 2000, ISBN 1-58113-214-X, pp. 136-144, 2000),

[S17] H. Davulcu, G. Yang, M. Kifer, and I. V. Ramakrishnan "Design and Implementation of the Physical Layer in Web-Bases: The XRover Experience", Proceedings of Computational Logic—CL 2000, First International Conference, London, UK, 24-28 Jul., 2000, Lecture Notes in Computer Science 1861 Springer 2000, ISBN 3-540-67797-6 pp. 1094-1105 2000

[S18] Naveen Ashish, Craig A. Knoblock, "Semi-Automatic Wrapper Generation for Internet Information Sources" Proceedings of the Second IFCIS International Conference on Cooperative Information Systems, CoopIS'97, Kiawah Island, S.C., USA, Jun. 24-27, 1997, IEEE Computer Science Press 1997, ISBN 0-8186-7946-8, 1997

[S19] L. Liu, C. Pu, and W. Han "XWRAP: An XML-enabled Wrapper Construction System for Web Information Sources", Proceedings of the 16th International Conference on Data Engineering San Diego Calif., Feb. 28-Mar. 3, 2000, IEEE Computer Society Press, pp. 611-621, 2000

[S20] A. Sahuguet, F. Azavant, "Building Intelligent Web Applications Using Lightweight Wrappers", Data and Knowledge Engineering, Vol.36, pp. 283-316, 2000

[S21] B. Ribeiro-Neto and A. H. F. Laender and A. S. da Silva, "Extracting Semi-Structured Data Through Examples", Proc. of CIKM, 1999

[S22] J. R. Gruser, L. Raschid, M. E. Vidal, and L. Bright "Wrapper Generation for Web Accessible Data Sources", Proceedings of CoopIS 1998

[S23] R. Baumgartner, S. Flesca, G. Gottlob "Visual Web Information Extraction with Lixto", Proc. VLDB 2001

[S24] R. Baumgartner, S. Flesca, G. Gottlob "The Elog Web Extraction Language", Proc. LPAR 2001

[S25] J. Hammer, H. Garcia-Molina, J. Cho, R. Aranha, and A. Crespo "Extracting Semistructured Information from the Web", in Proceedings of the Workshop on Management of Semistructured Data. Tucson, Ariz., May 1997

[S26] A. O. Mendelzon, G. A. Mihaila, and T. Milo "Querying the World Wide Web", Journal of Digital Libraries, Vol. 1 No.1, pp.54-67, 1997

[W1] Orsus Solutions, "iGlue Wireless for Integrating Web to Wireless Business Processes", white paper, Orsus Solutions, Ltd., 1250 Oakmead Parkway #236, Sunnyvale, Calif. 94088, Catalog Number WPIGS 2.0/00, 2000

[W2] Orsus Solutions "Enabling e-Business with Business Process Integration" Orsus Solutions, Ltd., 1250 Oakmead Parkway #236, Sunnyvale, Calif. 94088, white paper, Catalog Number WPIGW 1.6/00, 2000

[B1] S. Ceri, G. Gottlob and L. Tanca, "Logic Programming and Databases", Surveys in Computer Science, Springer Verlag, 1990, ISBN 3-540-51728-6

[B2] Bernhard Thalheim, "Entity Relationship Modeling: Foundations of Database Technology", Springer, ISBN 3540654704

[B3] J. E. Hopcroft and J. Ullman: Introduction to Automata Theory, Languages, and Computation, Addison-Wesley, ISBN: 0201441241

[B4] Martin Fowler, "UML Distilled: A Brief Guide to the Standard Object Modeling Language", Addison-Wesley, ISBN 020165783X 5. Description of Related Art Prior Methods and systems related to those claimed here can be divided into four categories:
1. Wrapper programming languages and environments,
2. Web change monitoring and notification tools,
3. Machine learning approaches, and,
4. Supervised interactive wrapper generation.

These approaches are discussed in detail.

a) Wrapper Programming Languages and Environments

Wrapper programming languages are languages that allow a programmer to write a wrapper program. In the widest sense of this definition, every general-purpose programming language with means for accessing and manipulating internet resources such as Web pages is also a wrapper programming language. In this sense, programming languages such as Java, Perl, Python, TCL, etc. can be considered wrapper programming languages. Similarly, programming environments facilitating program generation in these languages and testing can be considered wrapper programming environments. There are, however, several languages and environments that are more specifically suited for wrapper programming because they include various special primitives and functions tailored for peculiar issues and needs of wrapper programming. An example is Jedi (Java based Extraction and Dissemination of Information) by Huck et al. (G. Huck, P. Fankhauser, K. Aberer, E. Neuhold "Jedi: Extracting and Synthesizing Information from the Web", Proceedings of the 3rd IFICS International Conference on Cooperative Information Systems, CoopIfs'98, IEEE Computer Science Press, ISBN 0-8186-8380-5, pp. 32-43, 1998). Jedi is a wrapper programming language that uses attributed grammars in order to deal with ambiguities in source documents. Another example is the Florid language (W. May and G. Lausen, "Information Extraction from the Web", Technical Report No. 136, Institut fuer Informatik, Albert-Ludwigs-Universitaet, 79110 Freiburg, Germany) which consists of a complex logic programming language enriched by several features facilitating wrapper programming. Another well-known approach is TSIMMIS (J. Hammer, H. Garcia-Molina, J. Cho, R. Aranha, and A. Crespo "Extracting Semistructured Information from the Web", in Proceedings of the Workshop on Management of Semistructured Data. Tucson, Arizona, May 1997), where the extraction process is based on a procedural program augmented by the possibility of identifying parts of a tree structured document via path templates containing wildcards. A very simple and expressively limited method of wrapper programming based on regular grammars can be found in U.S. Pat. No. 5,826,258.

An advanced and rather expressive procedural wrapper programming language is EDITOR (G. Mecca, P. Atzeni, "Cut and Paste", Journal of Computer and System Sciences, Vol. 58, No. 3, pp. 453-482, 1999), which uses primitives

| | |
|---|---|
| [H1] http://www.peacefire.org/tracerlock/ | Tracerlock Tool |
| [H2] http://www.netmind.com | Mind-It |
| [H3] http://www.cc.gatech.edu/projects/disl/XWRAP/xwrap.html | X-Wrap Slides |
| [H4] http://www.savarese.org/oro/software/OROMatcher1.1.html | OroMatcher |
| [H5] http://caesius.com | Caesius WebQL |
| [H6] http://www.x-fetch.com | Republica X-Fetch |
| [H7] http://www.wisosoft.com | Wisosoft InfoScanner |
| [H8] http://www.kapowtech.com | Kapowtech RoboSuite | such as "copy", "search", and replacement, borrowed from text editors, as well as special pattern matching algorithms.

U.S. Pat. No. 6,102,969 describes a wrapper programming language called WDL (Wrapper Description Language) that facilitates the semantic description of queries, forms, and pages by using a declarative description format that combines features from grammars and regular expressions.

Finally, there are SQL-like query languages for the Web such as W3QL (D. Konopnicky and O. Shmueli "Information Gathering in the WWW: The W3QS System", ACM Transactions on Database Systems, Vol.23 No.4, 1998), and WebSQL (A. O. Mendelzon, G. A. Mihaila, and T. Milo "Querying the World Wide Web", Journal of Digital Libraries, Vol. 1 No.1, pp.54-67, 1997), and the SQL extension described in U.S. Pat. No. 5,913,214.

The system WebQL (http://caesius.com) is similar in syntax to SQL. It allows for crawling links and filling out forms, but is restricted to HTML output.

The system WebView (S.-J. Lim, and Y.-K. Ng "WebView: A Tool for Retrieving Internal Structures and Extracting Information from HTML Documents" Proceedings of the Sixth International Conference on Database Systems for Advanced Applications (DASFAA), Apr. 19-21 1999, Hsinchu, Taiwan, IEEE Computer Society Press, ISBN 0-7695-0084-6, pp. 71-80) is merely a parser for HTML documents (or hierarchies of URL-linked HTML documents) transforming them into a semi-structured data graph (SDG) which bears some similarity to a DOM tree and which can be subsequently queried. This system has almost no proper pattern location and extraction capabilities. The burden of data extraction is shifted to the user who queries the SDG via a complex SQL-like query language.

Generally (with a few exceptions), wrapper programming languages have a high expressive power. In particular, many of these languages are Turing complete in the sense that they can express all recursive functions over Web pages. (In addition, they have facilities for navigating the Web and for performing various operations on the Internet that are outside the scope of our analysis). They allow a programmer to implement rather robust wrappers, are fairly or even well accessible, often well supported by programming environments and often easy to install. However, there are serious drawbacks of wrapper programming languages. In particular, using wrapper programming languages is very hard for a non-expert, it is tedious, and requires, in addition to programming skills and expertise in the particular language, the knowledge of markup languages such as HTML. Testing and debugging hand written wrapper programs is difficult and time consuming. Wrapper programming languages are hard to learn for people not skilled in programming and offer no (or at most only very limited) visual support. Rather than working visually on a sample page, a programmer has to consider the HTML code of that pages while writing the program. This is often much more intricate than what one sees on the screen. Finally, wrapper programming languages offer no (or no efficient) support for translation into XML. The translation must be explicitly programmed or specified using programming language features such as grammars, which requires additional skills that non computer-scientists usually do not have. In summary, wrapper programming languages are not a suitable approach towards our goal of enabling a large number of non-experts to create wrappers for information extraction and translation into XML.

b) Web Change Monitoring and Notification Tools

There are tools and techniques for automatically monitoring Web pages for updates and notifying a user in case. Most of these tools just check whether the Web page has changed at all or search whether some user specified keyword happens to appear in an updated version of the page. Some of these tools apply such simple checks to multiple pages obtained through a Web search engine or to postings appearing in newsgroups (for example the TracerLock tool accessible via http://www-.peacefire.org/tracerlock/). Such tools have no substantial data extraction capabilities and can be disregarded as relevant prior art in the context of the disclosed invention.

Some systems such as the AT&T Internet Difference Engine AIDE (F. Douglis, T. Ball, Y.-F. Chen, E. Koutsofio, "The AT&T Internet Difference Engine: Tracking and Viewing Changes on the Web", World Wide Web Vol.1 No.1, pp. 27-44, 1998) related to U.S. Pat. No. 5,860,071 use a differencing algorithm in order to inform a user about those portions of text of a Web page that are new with respect to a previous version and those portions of text that have disappeared. However, no user-specified information extraction is possible.

Only very few Web change monitoring tools offer additional, somewhat more significant information extraction functions. The probably most relevant example is Mind-it (see http://www.netmind.com) in relationship with U.S. Pat. No. 5,898,836. In this approach, HTML documents are divided into sections delimited by HTML tags. On a visualized Web page a user can indicate those particular sections that should be monitored for changes and those which should be excluded from the monitoring process. The user can interactively select the relevant portions of a source document by dragging a highlight with a mouse over the text to be selected. Alternately, the user can select whole paragraphs by triple-clicking anywhere inside these sections, or double-clicking on a single word or by other similar actions. The system is able to adjust a region highlighted by a user to the smallest section containing it. The user has also the possibility to declare that a particular piece of text should be monitored by putting this piece of text into a special box via drag and drop actions. Change notifications are sent to the user only with respect to the selected sections or portions of text. Alternatively, the user may exclude some sections, and only the remaining sections will be monitored for change.

In U.S. Pat. No. 5,983,268, ways to identify the location of selected numeric values in a source document (e.g. a Web page formatted in HTML) are described. The preferred way to identify and remember the location of the selected numeric value is to store several characters immediately preceding and/or following the selection. These characters are known as "markers".

U.S. Pat. No. 6,128,655 contains (among other issues) the description of a simple form-based standard filtering mechanism for HTML Web pages. This mechanism allows the selection of certain sections (called "components") of a Web page by specifying sufficiently long start and end segments of the HTML code of these sections. The method is actually not used in the context of monitoring tools, but its function of identifying sections of Web pages is similar to features of such tools.

In any case, the pattern definition and extraction capabilities of (even advanced) Web change monitoring tools are limited to very simple "flat" patterns, such as paragraphs, portions of text, sections, and numeric values. No complex hierarchical data structures can be identified or extracted. The structural information contained in the parse tree of the document is not sufficiently exploited. Moreover, selected items, sections, or portions of text are merely identified via their textual surroundings (markers), their proper textual content, their surrounding tags, or by keyword-related issues. This identification is often not sufficiently robust. For example, in order to identify a numeric value location, a system-generated marker might contain some unsuitable unrelated element belonging to a different tree path. This element itself may be subject to frequent changes. If it changes, the information about the numeric value location is likely to be lost. Often one would like to monitor (or extract) many similar items of a specific type, for example all records of an eBay auction page containing a certain keyword (including future records of the same type). Even such simple requests cannot be expressed by current Web change monitoring tools. Finally (and not surprisingly), Web change monitoring tools do not have facilities for translating structured content into XML. In summary, these tools are far from fulfilling our above described goals and requirements. On the positive side, Web change monitoring and notification tools such as Mind-it are very easy to use, require almost no learning effort, have an excellent visual support, are easily accessible over the Internet, and are algorithmically rather efficient.

Note that there are Web change monitoring and notification tools that have much better information extraction capabilities because they rely on a separate and independent supervised wrapper generator. An example is the continual query system OpenCQ (L. Liu, C. Pu, and Wei Tang, "Continual Queries for Internet Scale Event-Driven Information Delivery", IEEE Transactions on Knowledge and Data Engineering, Vol. 11, No. 4, July/August 1999) whose capabilities for wrapping portions of HTML pages are mainly due to the supervised wrapper generator XWRAP which constitutes a separate piece of software. We excluded such Web change monitoring tools from our discussion and analysis here because the class of corresponding wrapper generators (including XWRAP) will be discussed in the section on supervised interactive wrapper generation below.

c) Machine Learning Approaches

Inductive machine learning, i.e., learning from examples and counterexamples (i.e. positive and negative examples), is a sub-discipline of Computer Science which has recently found many applications in the area of information extraction and wrapper generation. The aim is to induce document structure information and extraction patterns and automatically generate extraction rules and procedures based on a set of similarly structured sample Web documents or on a set of similar items occurring in a Web page. There is a variety of inductive wrapper generators both for arbitrary text documents (including HTML documents as a special case) and for HTML documents. These approaches mainly differ in the applied machine learning technique for inducing grammars or automata able to recognize structural properties and relevant data items in web documents. Many publications refer to machine-learning related theoretic problems; only a few describe practically working systems with an interactive environment for visually selecting examples and counterexamples of pattern instances, and for highlighting pattern instances induced by the system. An example for such a system is the Wien wrapper induction environment (Nicholas Kushmerick, Daniel S. Weld, Robert B. Doorenbos, "Wrapper Induction for Information Extraction", Proceedings of the Fifteenth International Joint Conference on Artificial Intelligence, IJCAI 97, Nagoya, Japan, Aug. 23-29, 1997. Morgan Kaufmann, 1997, Vol.1, pp. 729-737, 1997). Other well-known examples include SoftMealy (C.-N. Hsu, M. Tsung Dung "Generating Finite-State Transducers for Semistructured Data Extraction from the Web", Information Systems, Vol.23, No. 8, pp.521-538, 1998) and Stalker (I. Muslea, S. Minton, and C. A. Knoblock "Hierarchical Wrapper Induction for Semistructured Information Sources", Journal of Autonomous Agents and Multi-Agent Systems, Vol. 4, No. ½, March 2001, pp. 93-114, 2001). Systems particularly well suited for inductive learning from plain text documents (but also able to be applied to HTML documents) are:

NoDoSe (B. Adelberg, "NoDoSe—A Tool for Semi-Automatically Extracting Structured and Semistructured Data from Text Documents", Proceedings of the ACM SIGMOD International Conference on Management of Data, Jun. 2-4, 1998, Seattle, Wash., USA. ACM Press, ISBN 0-89791-995-5, pp. 283-294, 1998).

The system by Liddle et al. (Stephen W. Liddle, Douglas M. Campbell, Chad Crawford "Automatically Extracting Structure and Data from Business Reports", Proceedings of the 1999 ACM CIKM International Conference on Information and Knowledge Management, Kansas City, Mo., USA, Nov. 2-6, 1999, ACM Press 1999, ISBN 1-58113-146-1, pp. 86-93, 1999).

The LIEP system (S. B. Huffman, "Learning information extraction patterns from examples" in S. Wermter, E. Riloff, and G. Sheler, eds., "Connectionist, Statistical, and Symbolic Approaches to Learning for Natural Language Processing", pp. 246-60. Springer-Verlag, 1996.) See also U.S. Pat. No. 5,841,895.

The following papers describe approaches using example-based generalization techniques related to learning.

Embley and Xu 2000 (David W. Embley, L. Xu, "Record Location and Reconfiguration in Unstructured Multiple-Record Web Documents" Informal Proceedings of the WebDB 2000 International Workshop on the Web and Databases, Texas, USA, May 18-19, 2000, in conjunction with ACM PODS/SIGMOD 2000, pp. 123-128, 2000), where a model for locating records via heuristic algorithms based on a domain-specific ontology is presented.

Davulcu et al. 2000a (H. Davulcu, G. Yang, M. Kifer, and I. V. Ramakrishnan "Computational Aspects of Resilient Data Extraction from Semistructured Sources" Proceedings of the Nineteenth ACM SIGMOD-SIGACT-SIGART Symposium on Principles of Database Systems, May 15-17, 2000, Dallas, Tex., USA. ACM 2000, ISBN 1-58113-214-X, pp. 136-144, 2000), where methods for generalizing extraction expressions are presented.

Davulcu et al. 2000b (H. Davulcu, G. Yang, M. Kifer, and I. V. Ramakrishnan "Design and Implementation of the Physical Layer in WebBases: The XRover Experience", Proceedings of Computational Logic—CL 2000, First International Conference, London, UK, 24-28 Jul., 2000, Lecture Notes in Computer Science 1861 Springer 2000, ISBN 3-540-67797-6 pp. 1094-1105 2000), where the system XRover is presented which (among other features) can extract certain flat patterns from Web Documents based on generalized extraction expressions as described in the above-cited reference.

While wrapper generation by machine learning (or related techniques of automatic generalization) is an appealing topic for theoretical and experimental research, it is rarely used in practice. Inductive learning has several severe drawbacks in the context of wrapper generation. In particular, in order to induce a working wrapper, one often needs a large number of sample Web pages or a large number of sample target items on a Web page. Obtaining such samples is in many cases impossible, e.g., because there is only one "current" page available whose content changes slowly. Producing fake samples via self-made perturbations of existing data material (as suggested. in Davulcu et al. 2000a) is tedious and, moreover, can lead to unrealistic samples in case this task is automated. Our criterion of sample parsimony is thus violated.

Note also that information extraction approaches based on machine learning have a rather limited expressive power. In fact, efficient learning algorithms are best suited for flat repetitive patterns and cannot be easily applied to induce complex hierarchical data structures. Moreover, only those features present in the samples can be learned. For similar reasons, wrappers generated by machine learning are often not quite robust. For example, if a wrapper generator is supposed to identify a certain pattern by the property that this pattern occurs immediately behind a date item, and if there are hundred sample pages that unluckily have date items of the same year, e.g. 2001, then the system risks to erroneously induce that the desired pattern must occur after the number 2001 and will not work on pages with dates of the following year. Redressing such situations requires substantial human interaction and supervision, or the application of ontological reasoning tasks that work in few cases only.

The user-friendliness of machine learning tools can be rated medium at best. In fact, the selection of samples and the hand-labeling of a sufficient number of examples and counterexamples in Web pages as well as the correction of certain errors can be rather tedious. Learning to use such systems is generally not too difficult, but requires the acquisition of some basic skills of selecting samples and of estimating their quality. Current systems with visual support are not directly usable through Web browsers but require the installation of specific software. Due to the complexity of the underlying algorithms, machine learning tools are not quite runtime efficient in case of slightly more complex patterns.

Several wrapper learning tools offer visual support, mainly limited to visual facilities for selecting pattern instances, labeling data, and for displaying induced results. The most advanced visual support is offered by NoDoSe, where visual and interactive means for learning structured data and translation into XML are given. This works very nicely on plain text documents. Unfortunately, NoDoSe does not work that well on HTML files. In fact, processing HTML files with NoDoSe requires a wrapper designer to perform a pre-processing step that transforms the HTML file into a table. Then the wrapper developer works visually on that table rather than on the original document. Unfortunately, in many cases, the table can become extremely large and confusing. For example, if NoDoSe is fed with samples consisting of similarly structured eBay pages containing lists of auction items, then the pre-processor transforms these samples into a table with hundreds of columns which is confusing and difficult use. Most wrapper learning tools apart from NoDoSe do not support translation into XML.

In summary, wrapper generating tools based on machine learning techniques are not suitable tools in the light of the above-stated requirements.

d) Supervised Interactive Wrapper Generation

This class comprises methods and tools for semi-automatically constructing wrappers of advanced expressive power via an interactive process that is closely supervised by a human. These approaches are based on the assumption that a human who intends to design a wrapper knows best what kind of patterns are to be extracted from Web documents and how such patterns should be characterized so to make the characterization robust w.r.t. future changes of the document structure and content. Thus, supervised wrapper generators are much more based on the "teaching" paradigm rather than on self-learning aspects.

An early and simple system for semi-automatically generating wrappers for structured internet sources was designed by Ashish and Knoblock (Naveen Ashish, Craig A. Knoblock, "Semi-Automatic Wrapper Generation for Internet Information Sources" Proceedings of the Second IFCIS International Conference on Cooperative Information Systems, CoopIS'97, Kiawah Island, S.C., USA, Jun. 24-27, 1997, IEEE Computer Science Press 1997, ISBN 0-8186-7946-8, 1997). This system guesses a page structure and constructs corresponding labeled patterns by automatically decomposing a page according to the explicit nesting hierarchy of the document determined by section headings and formatting information provided by HTML (characterized by font size, etc.) or indentation of text items. The user interaction during this structuring phase is limited to correcting certain erroneously recognized tokens that are highlighted on sample documents. The system outputs a grammar describing the nesting hierarchy of sections. This grammar then allows the system to parse similar documents, associating titles to sections and enabling thus a user to formulate simple queries. The expressive power of this approach is extremely limited. The approach assumes that some explicit description (or tagging) of the relevant data is already contained in the sample document (in form of names of section headers) or at least unambiguously determined by simple attributes of headers (such as their font size), which is very often not the case. There is no possibility of locating desired extraction items by more complex contextual conditions. Moreover, no user-defined complex patterns can be created that are not already determined by basic formatting issues and paragraph headings. Accordingly, the constructed wrappers are not robust, except for sets of input documents having exactly the same formatting structure. No translation into XML is offered.

Another early approach of supervised wrapper generation was developed in "Wrapper Generation for Web Accessible Data Sources" by J. R. Gruser, L. Raschid, M. E. Vidal, and L. Bright at the Proceedings of CoopIS 1998. A translation to a semistructured data format can be generated.

The following systems are more advanced and can be considered the prior art most related to our own invention.

The XWRAP system by Ling Liu, Carlton Pu and Wei Han (L. Liu, C. Pu, and W. Han "XWRAP: An XML-enabled Wrapper Construction System for Web Information Sources", Proceedings of the 16th International Conference on Data Engineering San Diego Calif., Feb. 28-Mar. 3, 2000, IEEE Computer Society Press, pp. 611-621, 2000). See also the demonstration slides (XWrap demonstration slides, available at http://www.cc.gatech.edu/projects/disl/XWRAP/xwrap.html). The system consists of a toolkit for interactively developing wrappers and for translation into XML. According to the description in the latter reference, "XWrap normalizes the Web page into a tree structure using a source-specific parser. The region extraction wizard allows the developer to specify rules to identify important regions. Region properties, such as region range, are based on tree-path regular expressions of selected nodes in the tree. In order to reach a particular node in the tree, the developer can simply highlight strings on the HTML page, and XWrap can associate the string to its corresponding tree node. XWrap creates region extraction rules automatically after the developer specifies region properties through the GUI interface. XWrap analyzes three types of regions, table, list, and paragraph. [ . . . ] The semantic token extraction allows the developer to specify rules to extract tokens of interest in each region. XWrap derives the hierarchy structure of information of interest from the semantic token extraction rules and region extraction rules. Hierarchy structure extraction rules are composed in XML template format, which directs the template engine to some special placeholders, where data fields should be inserted into the templates. If we want to produce XML data as wrapper results, it will facilitate the wrapper code generation. After we get all the extraction rules, XWrap can compile these rules into a runable program."

The main drawbacks of this system are:

- The limited expressive power of its pattern definition mechanism. First, the system lacks sufficiently powerful semi-automatic generalization mechanisms that allow a user to specify several similar patterns at once while marking only a single pattern of the desired type. Secondly, the system lacks sufficient visual facilities for imposing inherent (internal) or contextual (external) conditions to an extraction pattern, e.g. "extraction pattern X should appear after a recognized instance of the extraction pattern Y but not before an instance of pattern Z", and so on. Thirdly, the division into the two levels of description "region" and "token" and the automatic hierarchical structure extractor severely limit the ways to define extraction patterns. For example, it is impossible to create disjunctive pattern definitions where a developer specifies a hierarchical pattern in terms of several alternative descriptions.
- A limited visual user interface. The user does not directly select all regions and tags on the browser-displayed Web page but is forced to additionally use other windows (or frames) which display the parse tree of the document. This is rather tedious in case of complex documents and, in addition, implies that the user must be able to understand HTML code.

The World Wide Web Wrapper Factory toolkit W4F (A. Sahuguet, F. Azavant, "Building Intelligent Web Applications Using Lightweight Wrappers", Data and Knowledge Engineering, Vol.36, pp. 283-316, 2000). This system offers an advanced programming environment for an SQL-like query language called HEL (HTML Extraction Language) for semi-structured documents. Parts of the SQL-like query can be generated using a specialized visual extraction wizard which is limited to returning the full DOM tree path of an element which the user wants to extract and interactively selects by directly pointing to it on the browser-displayed Web page. Note that this is just a support for constructing HEL queries. Except for certain trivial extraction tasks, the wizard is not able to generate a full query. Instead, the full query must be programmed by the user by hand-editing and generalizing tree-paths generated by the wizard and adding further HEL language constructs. The expressive power of the set of queries that can be visually generated (without hand coding) is extremely limited. This implies that a user of the W4F system is required to have both expertise of the HEL language and expertise of HTML. This, in turn, means that, notwithstanding the visual support by the wizard, the W4F system shares the main aforementioned disadvantages of wrapper programming languages. At the cost of necessary programming efforts, HEL is clearly more expressive than the visual pattern definition method of XWRAP. Note, however, that HEL is a rather complex language requiring a tricky use of index variables and fork constructs in order to correctly describe hierarchically ordered and/or compound extraction patterns. The language is hard to learn and hard to use for a person not trained in computer science. W4F also contains a so called "mapping wizard" that helps the user to define a translation of the query output into XML, and a visual interface for testing and refining the wrapper interactively before deployment. However, the testing wizard does not display extracted instances of patterns directly on the browser-displayed input document. Instead, it shows the user the XML output data structure.

DEByE (B. Ribeiro-Neto and A. H. F. Laender and A. S. da Silva, "Extracting Semi-Structured Data Through Examples", Proc. of CIKM, 1999) is an example-based system relying on bottom-up extraction. Although this kind of extraction has some advantages, programs are very difficult to update. The system is embedded into an information processing environment called WEByE. DEByE relies on "symmetric passages" conditions, which are not that expressive.

Republica's X-Fetch Wrapper (http://www.x-fetch.com) uses its own script language DEL for generation of extraction rules. One of the major disadvantages of X-Fetch Wrapper is that the tree structure of HTML is completely neglected. Extraction is solely based on regular expressions embedded into this extraction language. DEL programs can either be written with the DEL Editor, which assists the user to write such script files, or alternatively in the Rule Generator. The Rule Generator assists the wrapper developer on very regular pages containing a list of records. On such pages, the designer can label data areas of his choice; however, very often she has to re-edit the program with the DEL Editor. DEL programs can be written for other source formats such as Word documents. The implementation of X-Fetch wrapper is not platform-independent and relies on a Windows architecture.

Another tool, the RoboSuite of Kapow Technologies (http://www.kapowtech.com) offers fully visual support for wrapper generation. The designer can specify various kinds of options. Extraction rules navigate both the document tree and regular expressions. One of the major drawbacks of the system is that no nested output XML can be generated, but just a flat relational scheme. Additionally, no flexible contextual conditions are available.

The wisosoft InfoScanner (http://www.wisosoft.com) suffers a similar disadvantage as RoboSuite. Output patterns just form a flat relational scheme, and are not connected to each other in a general tree-structure. Hence, both approaches do not use the full power of XML. In InfoScanner, additionally, the developer is forced to interact with the script program. However, visual support is offered to create such scripts.

The iGlue software by Orsus Solutions Ltd. (Orsus Solutions, "iGlue Wireless for Integrating Web to Wireless Business Processes", white paper, Orsus Solutions, Ltd., 1250 Oakmead Parkway #236, Sunnyvale, Calif. 94088, Catalog Number WPIGS 2.0/00, 2000) and (Orsus Solutions "Enabling e-Business with Business Process Integration" Orsus Solutions, Ltd., 1250 Oakmead Parkway #236, Sunnyvale, Calif. 94088, white paper, Catalog Number WPIGW 1.6/00, 2000). This software (consisting of the two packages iGlue/Wireless and iGlue/Web) is used for integrating business processes over the Internet and contains, among other features, a graphical tool for extracting content from HTML or XML formatted Web pages. As stated in the first cited white paper, "a developer can point to a Web page and highlight the data to be extracted. The data extraction editor converts the page into XML displaying a hierarchical tree of the XML page, with the selected data highlighted. Using drag and drop, as well as built-in filters, an XQL or XPath query can be built, and the extracted data is stored in a table." The mentioned translation into XML at the beginning of the process is not an extraction task but merely a re-formatting of the HTML source into an equivalent well-formed XML document (in particular, containing all HTML tags of the original document). Therefore the developer needs to understand HTML. For defining the extraction patterns, the developer mainly uses a window (or frame) containing a visualization of the XML tree and another window where the XQL or XPath query can be edited. That is, the extraction pattern is not directly defined by acting on (and interacting with) a browser-displayed image of the source document. As for the W4F system, the visual interactive part of the extraction-pattern definition process is mainly limited to returning a full tree path which must be manually post-processed. Again, the expressive power of those XQL or XPath queries that can be generated by fully interactive actions without manual editing is extremely limited. For most applications, the developer will need to edit an XPath expression or an XQL query. This means that the user is supposed to have familiarity with at least one of these languages. Complex hierarchical patterns can not be defined visually. Contextual conditions on extraction patterns cannot be easily expressed (if at all).

In summary, existing supervised wrapper generation tools suffer from serious deficiencies. First, their extraction capability is of limited expressive power (at least, when no editing or programming is involved). Second, the visual interfaces of these tools require the developer to work on an explicitly represented DOM tree rather than just on the browser-displayed source document. It follows that these tools require expertise not commonly owned by laypersons.

The analysis of the various conventional approaches to wrapper generation for semistructured Web documents is roughly summarized in Table 1 (the actual evaluation may pointwise differ for a few single tools, according to the discussion above). This analysis clearly shows that the existing approaches have various drawbacks and do not meet the aforementioned desirable goals and criteria. It should also be clear that a method and system satisfying all these criteria cannot be obtained by merely combining features of the existing methods and systems. For example, the visual interface of Mind-It is good, but this is to be seen in close relationship with the limited expressive power of this tool; the visual pattern definition mechanisms of Mind-it cannot be carried over to a tool that allows a developer to specify more complex extraction patterns. To overcome the problems of prior approaches, substantially new ideas and techniques are necessary.

SUMMARY

The disclosed teachings provide methods, systems and computer-program products for the visual and interactive generation of wrappers for Web pages under the supervision of a human developer, for automatically extracting information from Web pages using such wrappers, and for translating the extracted content into XML. The features included are:

a method and system for interactively and visually defining information extraction patterns under the supervision of a human developer on the base of visualized sample Web pages;

a method and system for successively and hierarchically collecting information extraction patterns in order to generate a wrapper;

a method for logically representing the knowledge about sets of desired extraction patterns which jointly constitute a wrapper specification, as well as an abstract data structure that refines the logical definition and renders it more precise;

a declarative logic programming language, called Elog, for effectively encoding pattern descriptions (and thus wrappers) in a format that meets said data structure;

a method and system for executing wrappers (corresponding to a set of previously defined extraction patterns) on local or remote Web pages and thus for automatically extracting relevant information from said Web pages;

a data representation method for data extracted from Web pages, i.e., for pattern instances;

a method for defining XML translation rules that specify how extracted content should be translated into XML and for constructing an XML Document Type Definition (DTD) for that output;

a method and system for effectively translating extracted data into XML format.

The totality of the disclosed teachings constitutes an integrated and compound technique for specifying extraction patterns, for extracting information corresponding to such patterns, specifying XML translation rules, and translating extracted information into XML, as well as for organizing the overall process. As part of this integrated technique is a corresponding system. The global method and the global system are both referred to as "Lixto" (more specifically, as the Lixto method and the Lixto System). Note that Lixto is not confined to a single embodiment but can be embodied in various ways. It should be clear that while Lixto is discussed in detail, it is only an example implementation and should not be construed to restrict the scope of the claims in any way.

TABLE 1

Summary of evaluation of previous approaches.

| | Wrapper programming Languages and environments | Change monitoring and notification tools | Machine learning | Supervised wrapper generation |
|---|---|---|---|---|
| Expressive power | good | very bad | bad | bad/medium |
| User friendliness | bad | good | medium | medium |
| Ease of learning | bad | good | fair | bad/medium |
| Visual support | bad | good | fair | medium/fair |
| Access & installation ease | fair/good | good | medium | medium/fair |
| Sample parsimony | good | good | very bad | good |
| Robustness | good | medium | medium | medium/fair |
| Runtime efficiency | good | good | bad/medium | good |
| XML translation | fair | very bad | medium | fair/good |

Further, computer-program products including computer-readable media with instructions that implement the systems and methods disclosed, completely or partially, are also contemplated as being within the overall scope of the disclosed teachings. It should be noted that the media could be anything including but not limited to RAMs, ROMs, hard disks, CDs, tapes, floppy disks, Internet downloads, etc. In short, any medium that can fix all or a subset of the instructions, even for a transient period of time, is considered as a computer-readable media for the purposes of this disclosed teaching. Further the type of computer that can implement is also not restricted to any particular type, but includes personal computers, workstations, mainframes and the like. Also, it can be implemented on a stand-alone computer or in a distributed fashion across a network, including but not limited to, the Internet.

BRIEF DESCRIPTION OF THE DRAWINGS

1. Architecture Overview: A diagram depicting the overview of the Lixto architecture.

2. Architecture Overview: Using the extractor as stand-alone program.

Figure 1:
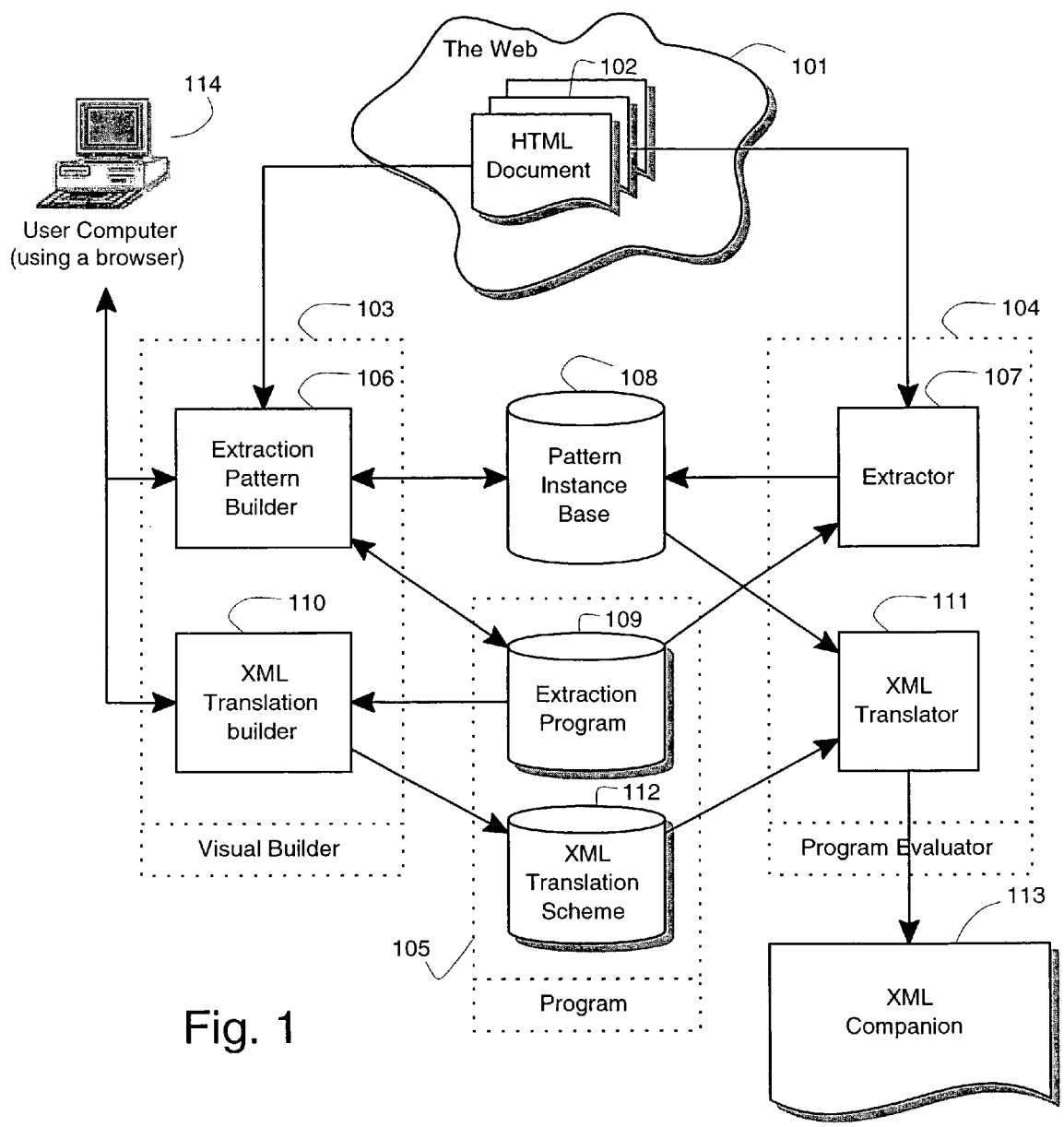

3. Pattern-Filter-Diagram: Logical structure of a sample pattern illustrating the general pattern structure.

4. Package Architecture of preferred embodiment: Package structure of actual implementation.

5. Lixto Screenshots: Vectorized screenshots showing Lixto at work.

6. Lixto Screenshots: Vectorized screenshots showing Lixto at work (part 2).

7. Table of empirical results: Evaluation of Lixto w.r.t. different sample web sites.

8. Example of an HTML tree: Illustration of a possible way to parse an HTML document.

9. Pattern EER: The entity relationship diagram of pattern and filters.

10. Filter EER: The entity relationship diagram of filters and their constituents.

11. Rule Evaluation: Algorithm of evaluating an Elog rule.

12. subsequence evaluation: Algorithm of evaluating the "subsequence" predicate.

13. before evaluation: Algorithm of evaluating the "before" predicate for tree filters.

14. before string evaluation: Algorithm for evaluating the "before" predicate for string filters.

15. Example pattern structure: Example wrapper program structures.

16. Pattern Generation: Pattern Generation Algorithm.

17. Tree Filter Generation: Algorithm for creation of tree filters.

18. String Filter Generation (including concept/comparison): Algorithm for creation of text filters.

19. Attribute Filter Generation: Algorithm for creation of attribute filters.

20. Tree Condition Generation External (before,after,not-before,notafter): Algorithm for creating external tree conditions.

21. Tree Condition Generation Internal (contains, firstson [startwith], lastson[endwith]): Algorithm for creating internal tree conditions.

22. Attribute Selection (including to add concepts and comparison predicates): Algorithm for specifying attribute conditions that refer to constant values or to concepts.

23. String Condition Generation External: Algorithm for creating external string conditions.

24. String Condition Generation Internal: Algorithm for creating internal string conditions.

25. Comparison Selection: Algorithm for adding comparison conditions.

26. Range Condition Generation: Algorithm for imposing range intervals to a filter.

27. Computing a tree region and basic extraction definition atom based on offsets: Algorithm for computing a tree region and the main filter atom.

28. Generating a Document Filter: Algorithm for creating a document filter.

29. Pattern Generation with Recursive Wrapping: Pattern Generation Algorithm in case of recursive wrapping.

30. Distance Tolerance Selection for External Conditions: How distance tolerance values are computed.

31. Evaluation of an Example Elog Program: Illustrating an example evaluation for a recursive wrapper program.

32. Extraction Job Server: This extraction job server contains several jobs, each creating an XML companion.

DETAILED DESCRIPTION

The following description of a preferred embodiment of our invention and of some variations and ramifications thereof is made for illustrating the general principles of the invention and is not to be taken in any limiting sense.

A. Synopsis of an Implementation

In a preferred embodiment, the Lixto architecture (FIG. 1) consists of two main building blocks: The Visual Builder and the Program Evaluator. The visual builder allows a wrapper designer to create and to store a wrapper in form of an extraction program (in our preferred embodiment, a program in the language Elog). Moreover, the visual builder allows a designer to specify how extracted data should be translated into XML format and to store such a specification in form of an XML translation scheme consisting of a list of XML translation rules. The program evaluator automatically executes an extraction program and a corresponding XML translation scheme over Web pages by extracting data from them and translating the extracted data into XML format. The program evaluator can act as a stand-alone program (FIG. 2) performing data extraction from Web pages based on previously constructed extraction programs and XML translation scheme. However, the program evaluator is also used during the wrapper designing phase in order to test partial or full wrapper programs.

The Lixto system can be installed and run as an application on a computer of a designer or end-user, or in a server mode, where designers and/or end users access a running Lixto implementation on some server via a standard browser through the Internet. In the latter case, no installation by a designer or user is necessary.

Figure 5:
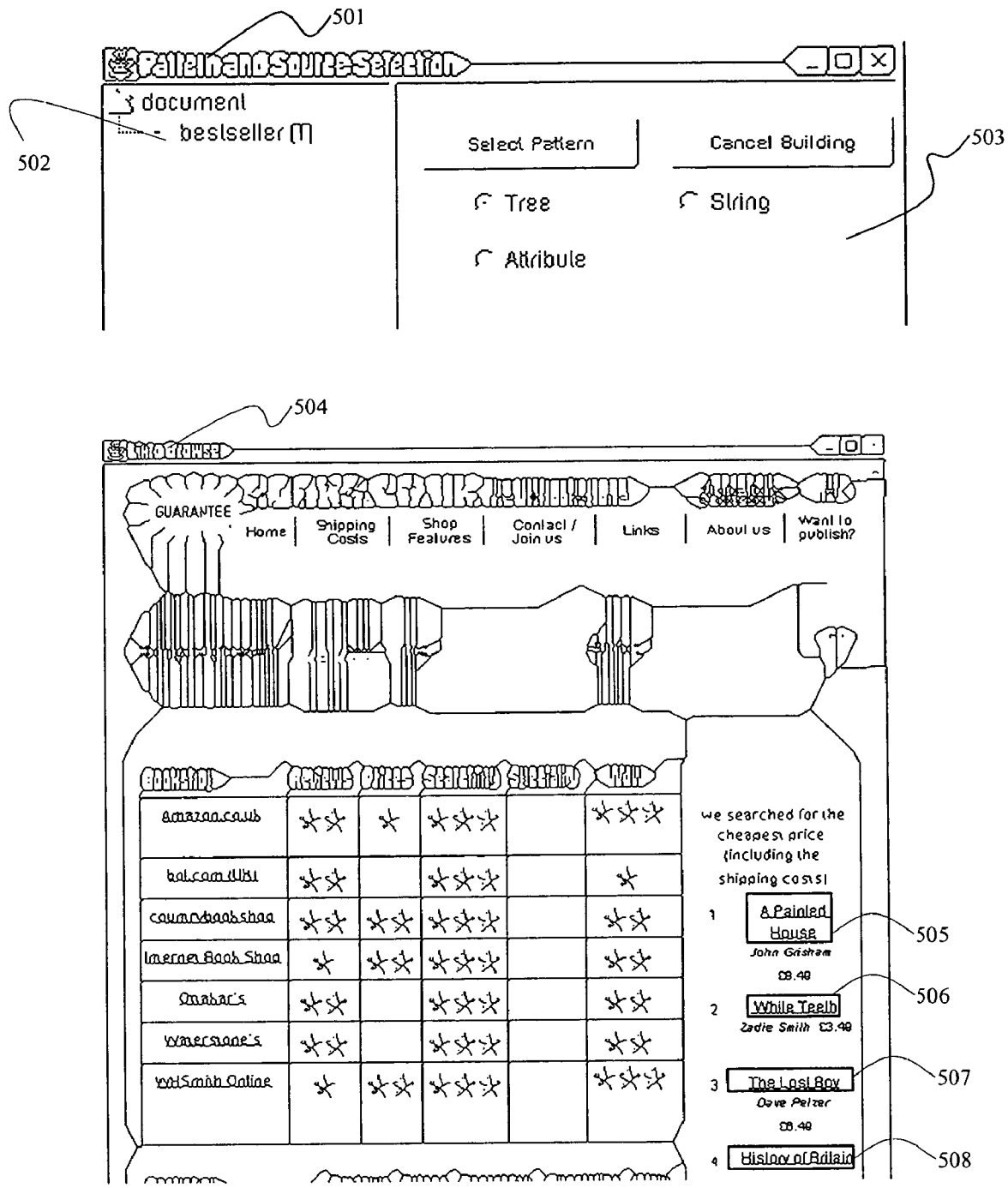

Lixto allows a non-professional user to build wrappers directly on the base of one or more browser-displayed sample Web pages (FIG. 5). A wrapper is constructed by formalizing, collecting, and storing the knowledge about desired extraction patterns. Extraction patterns (FIG. 9) describe single data items or chunks of coherent data to be extracted from Web pages by their locations and by their characteristic internal or contextual properties. Extraction patterns are generated and refined interactively and semi-automatically with help of a human wrapper designer (FIGS. 16-29). They can be organized within a graph. They are constructed in a hierarchical fashion on sample pages by marking relevant items or regions via mouse clicks or similar actions, by menu selections (FIGS. 5-7), and/or by simple textual inputs to the user interface. A wrapper, in our approach, is thus a knowledge base consisting of a set of extraction patterns (or more precisely, a set of representations of extraction patterns).

While patterns are descriptions of data to be extracted, pattern instances are concrete data elements on Web pages that match such descriptions, and hence are to be extracted. On any Web page, zero, one, or more pattern instances may match the same pattern.

Figure 9:
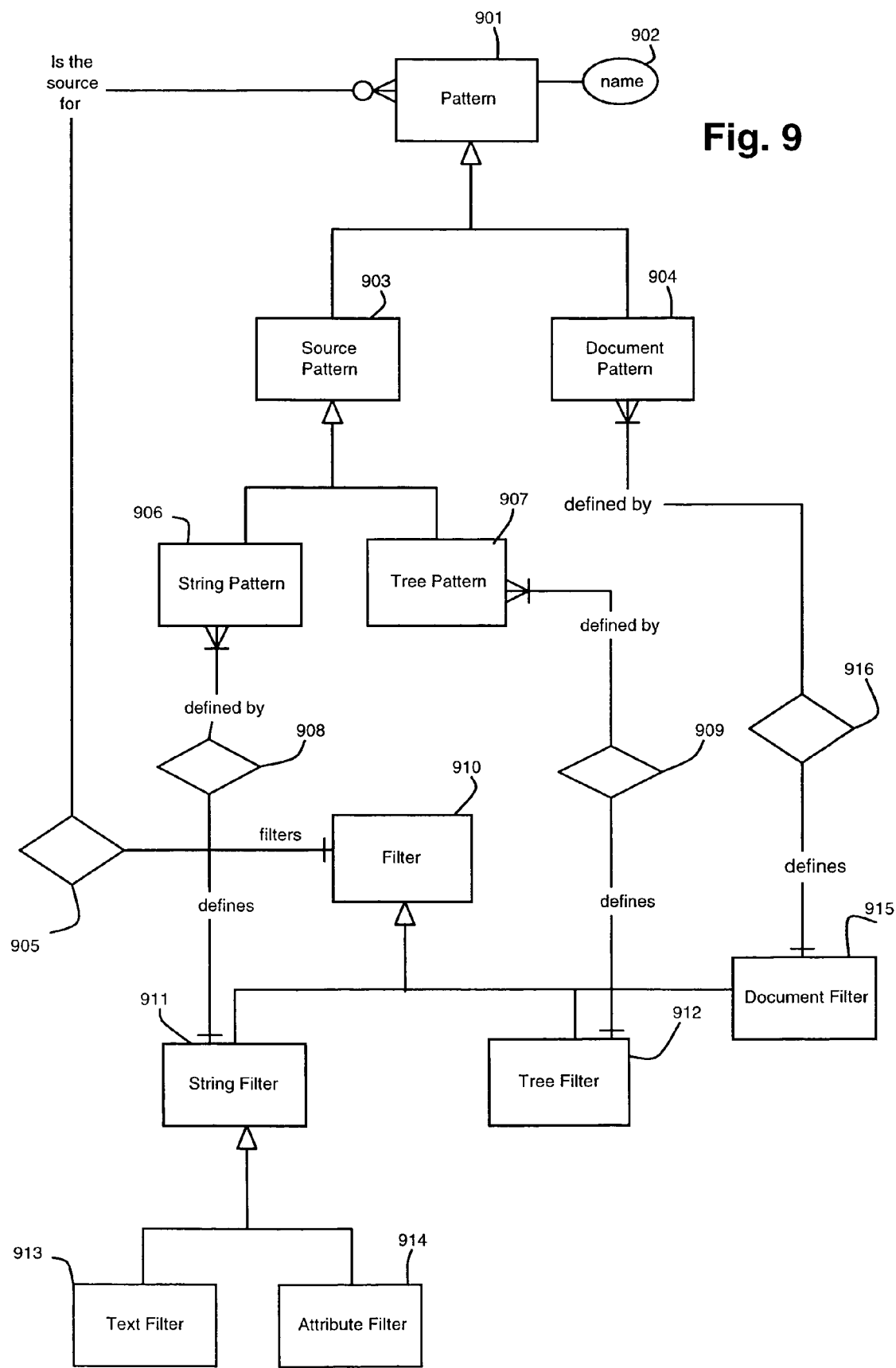

Lixto distinguishes between different types of patterns: Tree patterns, string patterns, and document patterns (FIG. 9). Tree patterns serve to extract parts of documents corresponding to tree regions, i.e., to subtrees of their parsing tree. String patterns serve to extract textual strings from visible and invisible parts of a document (an invisible part could be, e.g., an attribute value such as the name of an image). Document patterns are used for navigating to further Web pages.

The logical organization of an extraction pattern is as follows (FIG. 9, and cf. FIG. 3 for an example): Each extraction pattern has a name and contains a number of filters (FIG. 10) such that each filter provides an alternative definition of data to be extracted and to be associated with the pattern. For example, assume that keywords we would like to extract from a Web page occur either in red color or in boldface and are distinguished from other text by these (and maybe additional) features. Then a pattern with a name "keyword" could be defined by means of two filters, one for red keywords, and the other one for keywords in boldface. The set of filters of a pattern is interpreted disjunctively (i.e., as connected by logical ORs). Tree patterns are specified via tree filters (defining tree regions) and text filters are specified via string filters (defining textual strings to be extracted).

A tree filter contains a representation of a generalized parsing-tree path for structured Web pages matching a (possibly empty) set of items on each such page, and a set of conditions restricting said items to those of interest. The restriction to match a generalized tree path and the conditions of a filter are interpreted conjunctively (i.e., according to logical AND) in the sense that an element of a Web page satisfies a filter if and only if it matches its generalized tree path and satisfies all conditions of the filter simultaneously. Similarly, a string filter contains the specification of a formal language (in our preferred embodiment, via a regular expression), some additional information where to extract text from and possibly some further conditions (see below). Again, the constituents of a string filter are interpreted conjunctively, in the sense that a string must satisfy all corresponding requirements simultaneously in order to be extracted.

Lixto offers the possibility to express various types of conditions restricting the intended pattern instances of a filter. The main types of conditions are inherent (internal) conditions, contextual (external) conditions, and range conditions:

An internal condition of a filter specifies that some characteristic feature must appear (or must not appear) within the target pattern instances to be extracted. For example, an internal condition may say that an URL must occur in some text to be extracted, or that a table to be extracted should not contain any element in red color.

An contextual condition of a filter imposes some restrictions on the context in which a target pattern instance is allowed to appear. For example, a "before" condition might specify that in the text before a target pattern, some characteristic element or feature (a word or a color or a specific font size, etc.) must appear. Similarly, Lixto provides an "after" condition with the obvious respective meaning, and it is also possible to further qualify such conditions with distance indications (some more sophisticated embodiments may even use "below" and "above" conditions and the like). Moreover, "before" and "after" conditions can be negated. E.g. a "notbefore" condition specifies that some characteristic element or feature must not occur before a desired target pattern.

A range condition specifies that among the pattern instances of each parent-pattern instance which satisfy all other conditions, only those in a certain interval (e.g., the first three) should be extracted.

In addition to these three basic types of conditions, Lixto allows a designer to express auxiliary conditions. Some of the are:

pattern reference conditions, expressing that the some elements must be an instance of some defined pattern (usually different from the pattern associated with the current filter);

concept conditions, expressing that some attribute value belongs to a predefined "ontological" class (for example, that a string corresponds to a city name or that a string expresses a date);

comparison conditions, which are predefined relations for predefined "ontological" classes of elements (e.g., dates can be compared for checking whether one date occurs before another specified date, or it can be checked whether a string represents the city name "Vienna", regardless of the language in which it occurs).

The use of concept and comparison conditions presupposes that an implementation of Lixto either has some built-in ontological knowledge or has access to an external ontological database. The system is open for both. In our preferred embodiment we assume that ontological knowledge is directly available in form of datalog facts e.g. of the form city(vienna), city(wien), etc., or in form of predefined datalog predicates such as date(X, Y), where an instance of X (representing a date) is transformed into a standard format as instance of Y. Our method and system is open for adding various further types of auxiliary conditions.

Extraction patterns are defined by the designer in a hierarchical manner (FIGS. 16-29). A pattern that describes an entire document is referred to as a document pattern. Certain document patterns are available as predefined patterns automatically created by the system. In particular, the document pattern corresponding to the starting Web page, the so called "home document pattern" is available as a pre-existing pattern. Other patterns are defined interactively by the wrapper designer. Filters or patterns can be defined in the context of other patterns (so called source patterns or parent patterns). For example, a pattern "name" may be first defined, and then patterns "first_name" and "family_name", etc., may be defined in the context of the source pattern "name". To reflect such dependencies among patterns, in addition to their aforementioned constituents, filters or patterns (depending on the chosen embodiment) contain information about their respective source patterns. For most usual extraction tasks, defining flat patterns or a strict hierarchy of patterns will be sufficient. However, the invention does not limit the pattern definition to be strictly hierarchical (i.e. tree-like). In our preferred embodiment, pattern definitions are allowed to be recursive (similar to recursive type definitions in programming languages). For example, in the preferred embodiment described below, a pattern "table" may be defined by use of two filters, where one filter refers to a document pattern as source (called parent-pattern instance), while the other filter refers to the "table" pattern itself (see e.g., FIG. 15, especially [1521], [1522]). This way it is, for instance, possible to define a wrapper which automatically extracts all tables from a hierarchy of nested tables, where, at the instance level, each extracted table refers to its closest environment (either a document or a table). In less sophisticated embodiments, recursive pattern definition may be disallowed.

While patterns are not required to form a strict (tree-like) hierarchy, pattern instances always form a strict hierarchy and can be arranged as a tree (or forest, in case they stem from different documents). In fact, a Lixto pattern instance consists of data (a tree region or a string) plus a reference to a parent-pattern instance (except for the original "home" document on which Lixto is started).

The visual and interactive pattern definition method provided by the disclosed invention allows a wrapper designer to define an extraction program and an associated XML translation scheme without programming efforts. The Lixto Visual Builder allows a wrapper designer to define filters and patterns with the help of one or more characteristic example pages, and to modify, and store patterns. At various intermediate steps, the designer has the possibility to test a partially or fully constructed filter or pattern (FIGS. 16, 17, 18, 29), both on the example pages used to construct the pattern as well as on any other Web page. The result of such a test is a set of pattern instances, which is displayed by a browser as highlighted items (i.e., the background of matched pattern instances in the browser-display changes).

In order to design a particular pattern, the designer has the possibility to visually design several filters for that pattern, test each filter separately and then test the entire pattern. Our invention comprises algorithms for pattern and filter definition (FIGS. 16-29). Roughly, the filter description procedure for tree-filters can be described as follows: The designer marks an initial element on an example Web-page (for example, a table). The system associates to this element a generalized tree path of the parse tree that (possibly) corresponds to several similar items (for example, several tables). The designer then tests the filter for the first time. If more than just the intended data items are extracted (and thus highlighted) as a result of the test, then the designer adds restrictive conditions to the filter and tests the filter again. This process is repeated as long as undesired data items are extracted. At the end of the process, the filter extracts only desired items. A similar procedure is used for designing string filters.

Note that Lixto offers very advanced visual methods for defining and adding filter conditions. First, the designer may choose the type of condition she would like to add to the filter under construction via a comfortable menu. Second, there are special interactive and visual methods for defining a condition of the required type. For example, a "before" condition can be specified by first highlighting (e.g. with the mouse) an element with the required characteristics that occurs before a previously identified example pattern-instance, and then selecting the relevant attributes (e.g. color, font-size, textual content, etc) of the "before element" via a special menu.

A pattern is designed by initially asserting one filter for the pattern (FIGS. 16, 29), and, in case this is not sufficient (because testing shows that not all intended extraction items on the test pages are covered), asserting successively more and more filters for the pattern under construction, until each intended extraction item is covered by at least one filter associated to that pattern.

Observe that the methods of filter construction and pattern construction correspond to methods of definition-narrowing and definition-broadening that match the conjunctive and disjunctive nature of filters and patterns, respectively. It is the responsibility of the wrapper designer to perform sufficient testing, and—if required by the particular application—test filters and patterns also on Web pages different from the initially chosen example pages. Moreover, it is up to the wrapper designer to choose suitable conditions that will work not only on the test pages, but also on all other target Web pages.

The visual and interactive support for pattern building offered by Lixto also includes specific support for the hierarchical organization of patterns and filters. For example, when a designer creates (with system interaction) a new filter, she needs to mark the source pattern (the so-called parent-pattern) of the filter (usually via a simple mouse-click on a pattern-hierarchy displayed in a graphical user interface). The system then helps the designer to choose a suitable instance of the source pattern on the example page(s) which is appropriate for defining the subordinate filter.

A wrapper definition process according to Lixto (and consequently, a Lixto wrapper) is not limited to a single sample Web document, and not even to sample Web pages of the same type or structure. During wrapper definition, a designer may move to other sample Web pages (i.e., load them into the browser), continuing the wrapper definition there. The URLs of such further pages are either provided explicitly by the wrapper designer (e.g. by typing the URL or by navigation actions), or they are obtained as instances of previously defined document patterns. There are two main reasons why moving to other sample pages can be useful.

First, a wrapper designer may want to define a pattern consisting of filters that respectively describe extraction targets for different page types. For a simple example, assume that a wrapper designer intends to write a wrapper extracting prices from certain Web pages both from the US and the UK, where the characteristic features of price items are a "$" sign on US Web pages but a "£" sign on UK pages. Assume, furthermore, that the current sample page is a US page. The wrapper designer creates a pattern named "price" and defines two filters for it, the first taking care of US pages, the second of UK pages. After having visually created an appropriate filter for prices in USD on an already loaded US sample page, the designer switches to a UK sample page and visually defines the second filter for the "price" pattern on that page. The wrapper will then work on both types of pages.

Second, a wrapper designer may want to define a pattern that (together with its sub-patterns) groups together elements from several pages. The designer thus needs to "teach" the system on the base of sample pages how to follow URLs and collect the elements from the different pages. For example, an electronic auction company such as eBay publishes catalogs containing Web pages with auction items. Each item is described by a line stating summary information for each given auction item. Each such line contains a link to a Web page with more detailed information on the respective item (such as the seller location and the seller rating). The designer first visually defines a pattern called "item" on the summary page by highlighting one sample item and specifying appropriate conditions for it. The designer then adds child patterns for all relevant data elements of an item that are available on the summary page (e.g. item number, price, and number of bids), as well as a document pattern called "link" corresponding to the link to (i.e. the URL of) the more specific page describing the item. The designer then proceeds by following this URL, loading the corresponding page, and defining the remaining relevant patterns (such as "seller_location" and "seller_rating") as child patterns of this document pattern.

An extraction program consists of a list of patterns. In our preferred embodiment, extraction programs are encoded in a Logic Programming language called Elog. Elog is a version of the well-known datalog language, enriched with a number of special atoms with a predefined semantics for several subtasks related to information extraction. Datalog, in turn, is a sub-formalism of pure Prolog without function symbols (for a precise definition of Datalog, its logical and operational semantics, etc, see S. Ceri, G. Gottlob and L. Tanca, "Logic Programming and Databases", Surveys in Computer Science, Springer Verlag, 1990, ISBN 3-540-51728-6). In other embodiments, other methods or data structures for representing patterns and filters can be used.

In Elog a pattern p is represented by a set of rules having all the same head atom of the form p(S,X), where p is the pattern name, and S and X are variables. Each of the rules corresponds to one filter. The head of an Elog rule r is always of the form p(S,X) where p is a pattern name, S is a variable which is bound in the body of the rule to the name of the parent pattern of the filter corresponding to r, and X is the target variable which, at extraction time, is bound to some target pattern instance to be extracted (either a tree region or a textual string). The body of an Elog rule contains atoms that jointly restrict the intended pattern instances. For example, an Elog rule corresponding to a tree filter contains in its body an atom expressing that the desired pattern instances should match a certain tree path and another atom that binds the variable S to a parent-pattern instance. Optionally, the rule body may contain some further atoms expressing conditions that the pattern instances to be extracted should additionally fulfill. In particular, for each type of condition, there exists an Elog built-in predicate, i.e., a predicate whose evaluation semantics is determined by Lixto and corresponds precisely to the condition it represents. For example, a "before" condition is expressed by a special atom before(S,X . . . ) which will evaluate to true only for those tree regions X with parent pattern-instance S, which fulfill the before condition (specified via the remaining arguments ". . . " of the atom).

Figure 2:
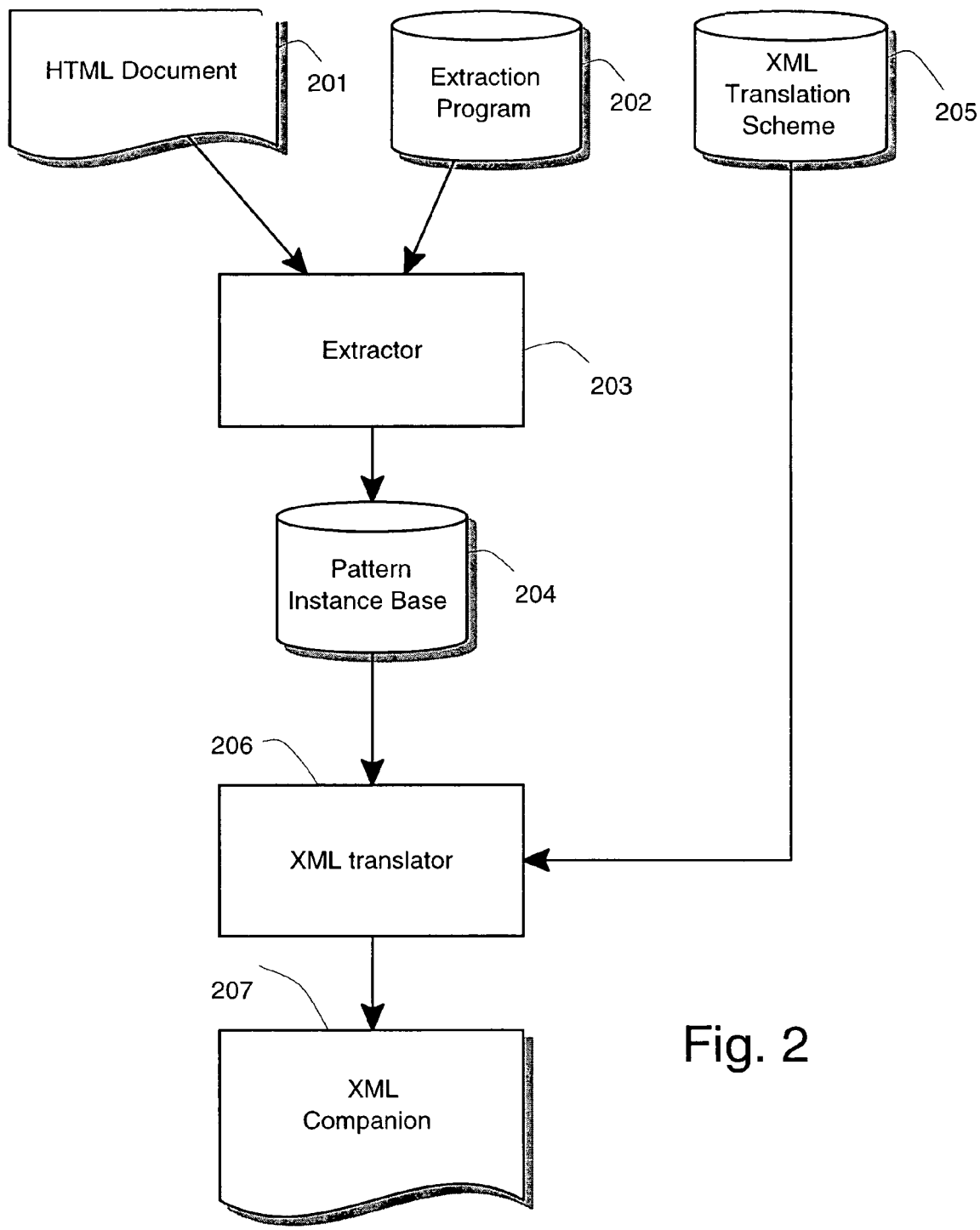

In our preferred embodiment, the process of interactive pattern generation and the generation of the corresponding Elog program is performed by the Extraction Pattern Builder module of the Visual Builder (FIG. 1).

The XML Translation Builder, another interactive module of the visual builder (FIG. 1), is responsible for supporting a wrapper designer during the generation of the so-called XML translation program. One key issue is that, by default, pattern names that are chosen by the designer during the pattern design process are taken as output XML tags and that the hierarchy of extracted pattern instances (which is always a proper tree-like hierarchy) determines the structure of the output XML document. Thus, in case no specific action is taken by the designer, a standard translation of the extracted pattern instances into XML will be performed without any need of further interaction. However, Lixto also offers a wrapper designer the possibility to modify the standard XML translation in the three following ways:

The designer can rename some patterns with the effect that a new name instead of the actual pattern name appears as tag name in the XML translation.

The designer can suppress some patterns from the translation. In this case, instances of non-suppressed patterns that are children of a suppressed pattern instance I will appear in the XML translation as children of the closest non-suppressed ancestor of I. For example, assume a designer wants to construct a wrapper that extracts all records from the third table of some Web page. She may first construct a pattern table that precisely identifies the third table. Then she may define a pattern record using a filter whose parent-pattern is the table pattern (with the effect that only records from the document's third table are identified as instances of the record pattern). In this case the pattern hierarchy is of the form document<-table<-record, where each arrow symbolizes a reference to a parent pattern. While the pattern table has an essential (but in a sense auxiliary) role in the definition of extraction items, the designer may decide to suppress it in the XML output. Then the XML output document will display a hierarchy of the form document<-record, where each record pattern instance is a child of the document instance.

For each pattern the designer can choose the set of attributes that should be carried over to the output XML document. For example, font, color, or positional attributes of HTML items can either be carried over to the XML output or can be suppressed in case they are not of interest.

The desired modalities of the XML translation (as described above) are determined during the wrapper design process by a very simple and very user-friendly graphical interface and are stored in form of a so called "XML translation scheme" that encodes the mapping between extraction patterns and the XML schema in a suitable form.

The Extractor module of the Program Evaluator (FIG. 1) interprets extraction programs over Web pages. In our preferred embodiment, the Extractor module consists of an Elog interpreter enriched by a page fetching mechanism. The Extractor module parses a web document and stores the parse tree (containing full information about the document) in form of a suitable data structure, in our preferred embodiment, as a Java Swing DOM tree. If several Web Documents are visited, the information about the content and structure of all these pages is maintained by the Extractor module in form of a forest of parse trees.

The extractor is started with an initial input Web page and can fetch further pages automatically, if necessary. For example, in case some Elog rule has to be evaluated that refers (as parent pattern) to a document that has not yet been loaded, then this new document is fetched and parsed, and its parse tree is made available for further processing by adding it to the forest of parse trees of all pages that already have been loaded.

The main basic objects on which an Elog program operates are tree regions and strings occurring on Web pages. Note that the set of all tree regions and strings of a used web document is implicitly contained in the parse-tree of this document. For representing a particular tree region or a string, in our preferred embodiment, a data structure (Java object) with one or more pointers to vertices of the corresponding parsing tree is used. The pointers precisely delimit the intended tree region or text. Variables occurring in Elog rules ranging over tree regions or over text strings are unified with such objects during program evaluation. Extracted pattern instances correspond to instances p(s,x) of head atoms p(S,X), where s is an object representing a source-pattern instance (i.e., a parent-pattern instance) and x is an object representing the tree region or string corresponding to the actual pattern instance.

The mechanism of Elog program evaluation is similar to the evaluation of datalog programs. However, in our preferred embodiment, Lixto can provide some additional minimization mechanisms. For example, if two pattern instances A and B of the same pattern having the same parent pattern instance are derived, and if A is contained in B (either as tree region or as string), then only the smaller pattern instance is kept and the larger one is deleted. The extracted pattern instances are stored in the Pattern Instance Base which is usually a main-memory repository.

The XML translator module (FIGS. 1, 2) accesses the Pattern Instance Base and translates the pattern instances into XML respecting the parent-child dependencies between pattern instances and respecting the translation modalities specified in the XML translation scheme. The final output of the Lixto Program Evaluator is an XML Document that can be stored to a disk file and further processed by other applications.

The use of the Lixto program evaluator can be automated by combining the program evaluator with a control module that implements a method for specifying and automatically executing continual extraction and XML translation tasks. The control module periodically calls the program evaluator in order to check user-specified Web pages. Based on previously defined wrappers and XML schemes, the control module triggers the extraction of relevant content, its translation it into XML, and the storage or update of the respective XML output. In particular, XML companions to HTML Web pages can be maintained. An "XML companion" to an HTML Web page with changing content is a continually updated XML page containing the translation of the relevant information.

Moreover, Lixto can be integrated into an information processing system allowing a developer to design personalized information channels (also called "Information Pipes"). Such channels define and control complex information flows whose sources are web documents, and whose sinks are e.g. delivery modules that sends information updates to cellphones, email accounts, or databases. Intermediate components of such information pipes could be query and transformation components, for instance, modules that merge various XML input files into a common format via an XSLT transformation.

a) Advantages of the Disclosed Teachings

Lixto allows a wrapper designer to specify complex structurally ordered extraction patterns based on the object hierarchy present in the input document(s) and, at the same time, based on various types of conditions imposed by the designer such as contextual conditions, internal conditions, and range conditions. Moreover, Lixto allows a designer to specify powerful string extraction patterns in order to extract information from pieces of unstructured text appearing in a document. This combination of extraction-definition features allows one to design sophisticated wrappers for highly complex Web pages. A recent test of an implemented prototype of Lixto (FIG. 7; explained in the section "Empirical Results" of the detailed description below) aimed at wrapping pages from twelve important and complexly structured Web sites, such as eBay, DBLP, Travelnotes, and so on. The result shows that Lixto is able to correctly wrap all these pages and to translate them perfectly into structured XML documents. In summary, Lixto has a high expressive power.

Wrapper construction with Lixto is an entirely visual and interactive process (FIGS. 16-29). Patterns, filters, and conditions are mainly defined via the graphical user interface by actions such as selecting items by mouse-clicks or region-marking on example Web pages displayed in a browser. Thus, Lixto allows a designer to construct patterns in a "what you see is what you get" manner on example Web pages. While rather complex patterns can be created with Lixto, the pattern definition process itself is simple and clear cut. Testing a wrapper is easy and can be done at any time on the current example page by just clicking a button. Lixto is thus a very user friendly system with an excellent visual support.

Constructing a Lixto wrapper does not require to know or to learn a programming or query language, nor does Lixto require the knowledge of HTML or XML. The only view of a document used by the Lixto user interface while constructing a wrapper is the standard view of a browser-displayed Web page. A wrapper designer is never confronted with a parse-tree or the HTML source of a document. Generalized tree-path expressions (or equivalent XPATH expressions) are automatically generated and remain invisible to the normal user (but expert users have the possibility to enter or change them manually). Experiments on an implementation have proven that using the system can be learned in a few hours. It is thus fair to say that using Lixto is very easy to learn.

A server version of the Lixto system can be accessed via the Internet through a standard browser such as Netscape 4 or Internet Explorer 5. Therefore, if such a server version is used, no installation whatsoever is necessary (a commonly used software environment is sufficient) and the system is very easy to access for wrapper designers and users. Given that our preferred embodiment of Lixto is implemented in Java2, even the installation of the Lixto software on a server, or on any other computer is very easy, and does not noticeably differ from the installation of any other Java2 software package.

The Lixto method was conceived in a way to give a designer the ability to exploit at maximum the relevant features of example pages that are characteristic for the set of all other pages to be wrapped. The number of example pages needed for constructing perfectly accurate wrappers clearly depends on the regularity of the entire set of pages to be wrapped. For example, if this set consists of two substantially different subsets of pages (e.g. weather reports from two different sources whose Web pages differ drastically in structure), then at least two example pages will be necessary for wrapper construction. However, experimental evaluations show that for many applications just one example page is sufficient for constructing a 100% accurate wrapper, and that on the average two such sample pages are sufficient (See FIG. 7 and its description given in the sequel of this document). One can therefore safely state that the Lixto wrapper constructing method is highly parsimonious with respect to sample pages.

The wealth of conditions and selection methods (internal, contextual, range, ontological, etc.) from which a wrapper designer can choose, allows her to design very robust wrappers. Moreover, a Lixto pattern can be defined via several alternative filters. Filters disjunctively contribute to a pattern. This can be exploited to create particularly robust wrappers. Assume, for example, that a desired extraction pattern can be unambiguously characterized by several alternative features (this happens very often in practice). A wrapper designer then may use several filters, each one for a separate distinctive feature. This implies that in case of future structural changes, where one or the other feature will disappear, it is still likely that the wrapper will continue to work correctly, given that the desired items can still be derived through the other filters. Thus, redundant specifications can be used to increase robustness. In summary, Lixto is a good system for creating robust wrappers.

The disclosed algorithms and procedures both for wrapper construction and for information extraction all have low degree polynomial-time worst-case behavior. Therefore, reasonable implementations of the proposed algorithms and procedures will lead to runtime-efficient software. In fact, an implemented prototype of Lixto has shown satisfactory runtime behavior, even though no specific runtime optimization techniques were used.

Lixto uses a smooth and user-friendly XML translation mechanism. In fact, by default, the designer does not need to care about the XML translation, which is automatically done based on the constructed pattern hierarchy and the chosen pattern names that will be used as XML tags. Moreover in case a designer wants to modify the standard XML translation, she has comfortable means of doing so.

In summary, Lixto has all desirable properties we required from a wrapper generation and web information extraction tool. It is a powerful easy-to-use tool for content transformation usable by typical non-technical content managers. We believe that Lixto is a relevant step to fill a gap in the area of web tools, in particular, in the sense of the above quotation from Stonebraker's and Hellerstein's SIGMOD 2001 paper "Content Integration for E-Business".

B. Architecture Description a) Overview

FIG. 1 gives an overview of the logical building blocks of the Lixto architecture. On the top, the World Wide Web [101] and a set of structural similar pages [102] are sketched. A wrapper is usually defined with the help of one sample page or a very small set of sample pages. And ideally, it will work for all structurally similar pages. The actual implementation is described later; our preferred embodiment can either work on the server-side (in particular, on a Web server supporting a Java servlet engine), or completely on a client machine.

Two building blocks of the Lixto architecture are:
  The visual builder [103]: It contains the visual and interactive wrapper generation modules, in particular the extraction pattern builder [106] and the XML translation builder [110]. The visual builder is responsible for interactively generating the extraction program (the wrapper) guided by the wrapper developer, and for generating an XML translation scheme.
  The program evaluator block [104]: It consists of the extractor [107] and the XML translator [111]. The extractor performs data extraction from HTML pages according to given extraction programs. The output of the extractor consists of the so-called pattern instance base which is a collection of extracted pattern instances. The XML translator transforms a suitable subset of these pattern instances into XML according to the XML translation scheme. Once an extraction program and a corresponding XML translation scheme have been generated, the program evaluator module can work as a stand-alone application for repeated or continual extraction from different or changing Web pages. However, the program evaluator is also used during the program generation phase in order to evaluate partial programs on sample pages and to provide immediate feedback to the developer. In this case, the visual builder calls the program evaluator.

A wrapper program can be used as input for the program evaluator (e.g. via command-line parameters) to generate, an XML companion of a regularly changing HTML Web page. An XML companion of an HTML page is an XML file containing translations of relevant parts of the HTML page that is regularly updated. In terms of database technology, an XML companion is a personalized XML view of an HTML document. Moreover, as described later on (in the section on ramifications), an Extraction Job Server can be used to define and manage XML companions (see also FIG. 2).

While a pattern is merely an abstract description of desired data elements to be extracted from Web pages, a pattern instance is a concrete data element of a Web page, matching a specified pattern. Thus pattern instances are the actual objects to be extracted from Web pages. As we will explain later in more detail, each pattern instance is either a tree region (of a Web page) or a string, matching some specified pattern. A pattern instance also contains information about the corresponding patterns it matches, and about a hierarchically super-ordinated pattern instance, the so-called parent pattern instance, from which it was extracted as a subelement (for example, a pattern instance table row also contains a pointer to a corresponding table pattern instance identifying a table to which the particular table row belongs). Therefore, there is a well-defined parent-child relationship among pattern instances and thus these instances form a forest. The root of each tree in this forest is an instance of a document pattern (i.e. of a pattern describing an entire document), and the intermediate nodes describe relevant parts of that document pattern.

Three data collections that are used in the Lixto architecture are:
  Extraction Program [109]: A program is generated step-by-step in the extraction pattern builder and interpreted and executed by the extractor. It consists of a number of rules in a declarative language called Elog. Rules are representations of filters. Patterns are sets of Elog rules with the same head. The executor generates a pattern instance base, where all extracted instances of all patterns of the program, are stored. An Elog program is a collection of datalog-like rules containing extraction conditions in their bodies. Due to its datalog-like logical syntax and semantics, Elog is ideally suited for representing and successively incrementing the knowledge about patterns described by users. Elog is described in more detail below, in the section labeled "The Elog language").
  XML Translation Scheme [112]: An XML translation scheme defines how each pattern is mapped to XML. It is generated with the XML Translation Builder and interpreted by the XML Translator to generate an XML document using a previously generated pattern instance base. The XML translation scheme, as described below, consists of a set of tuples. Each tuple sets a number of flags for one particular pattern.
  Pattern Instance Base [108]: The pattern instance base is the collection of all pattern instances generated by the extractor. This knowledge base can be used as temporary storage of currently extracted patterns during wrapper generation. Moreover, if a wrapper program is evaluated, a pattern instance base is generated as an intermediate step, and the XML translator accesses this knowledge base to generate an XML document.

(1) Extraction Pattern Builder [106]

The Extraction Pattern Builder [106] provides the visual user interface (UI) that allows the user, which we refer to as wrapper designer or developer (working on her computer [114]), to specify the desired patterns to be extracted (by asserting filters) and the basic "algorithms" for creating a corresponding wrapper program (FIGS. 16 to 29, to be explained later on). The output of this module is a wrapper (an extraction program) [109] in the declarative language Elog (sometimes also referred to as Extralog). The Elog program itself is invisible to the designer unless she explicitly demands to view or manipulate it, that is wrappers can be generated without knowledge of Elog. An Elog program consists of a set of patterns. To every pattern one or more filters are attached. In our preferred embodiment, filters are realized as datalog-like rules. An Elog program can be considered a knowledge base that expresses knowledge about desired contents to be extracted. The generation of the wrapper program is an interactive process controlled by the extraction pattern builder, where this knowledge base is successively refined based on visual interactions with the wrapper designer. This interactive process of refining the Elog program consists of a number of successive narrowing or broadening steps where the designer teaches the system using a small set of relevant example Web pages. Detailed flowcharts (FIG. 16 to FIG. 29) describing the pattern building process are given in the section on the method of pattern creation.

(2) XML Translation Builder [110]

The elements extracted by one or more previously defined patterns can be translated into XML according to XML translation rules generated by the interactive XML translation builder [110]. This XML translation builder allows the developer to choose a mapping from the extracted information (i.e., pattern instance bases generated by the extractor module) to XML. It is possible to exploit the hierarchical structure of the extraction patterns and to re-use the pattern names as default XML element names. The attributes of the output XML elements are by default those already present in the parse tree of the source HTML document. The developer has the possibility to interactively choose the attributes that shall appear in the XML output. Further, there is also the possibility to decide which patterns are written to XML, i.e. ignoring auxiliary patterns. The XML translation builder [110] uses an extraction program [109] as input and generates with user assistance an XML translation scheme [112]. Together with the extraction program [109] the XML translation scheme [112] forms the program [105] which is actually used to generate the XML companion [113] of an HTML page.

(3) Extractor [107,203]

The Extractor [107] is an Elog program interpreter that performs the actual data extraction based on a given Elog program [109,202]. The extractor is used both during the pattern building and program construction phases, and as a stand-alone program (FIG. 2) (e.g. as command line tool taking as input an HTML document, an Elog program and a XML translation scheme to produce XML output).

During the pattern building and program construction phase, the extraction pattern builder [106] interacts with the extractor [107,203] to apply the so-far created program (or parts of it) to create a pattern instance base [108,204]. As explained, the pattern instance base is a logical base of hierarchically ordered pattern instances (the order is given by the parent-child relationship among pattern instances). These instances are either tree regions (describing elements or element-lists) or string sources. In the preferred embodiment of the extraction pattern builder we make use of a pattern instance base cache during wrapper generation to avoid having to re-compute it all the time.

The pattern instance base [108,204] is the internal data format resulting from the application of a wrapper program to an HTML page (or a DOM tree in general). This internal data format can be mapped to XML [205,206,207].

(4) XML Translator [111,206]

The XML translator [111,206] is an XML translation scheme interpreter that performs the actual mapping from a pattern instance base [108,204] to an XML document [113, 207]. An XML translation scheme [205] simply associates patterns and filters with several kind of flags (such as "write HTML attributes as attributes of an XML element"). It can be interactively generated with the XML translation builder. Together with the extractor [107,203], the XML translator [111,206] constitutes the program evaluator [104], which, given a particular Web page and a program, produces a corresponding XML document [113,207], the so-called XML companion of this page (possibly involving further pages accessible via links from the original Web page). The system is open for using powerful XML query tools to work on that XML output.

C. Data Structures and Internal Data Representation

Before we can describe the main algorithms of the visual builder [103] and the program evaluator [104] at a detailed level, it is necessary to describe the data structures used in our preferred embodiment in the present section. We will thus describe the used document model and how patterns and filters are logically represented, and we will give a careful definition of the Elog language. Moreover, we will describe data structures for representing an XML translation scheme and data structures for suitably representing pattern instances.

In the following {x|x in S and x has property p} denotes the set of all elements of S which have the property p. Ordered tuples are written in parentheses using comma as separation sign.

a) Document Model

The disclosed data extraction technique applies to all kinds of documents, although the preferred source of information are documents formatted with a markup language such as HTML. Those can be represented as trees of elements, where each element represents a portion of the document that is marked up with a particular tag. The tree associated with each document is defined in the following way.

(1) Document Tree

In our preferred embodiment we use document trees to represent HTML documents. There are several possible ways of defining document trees corresponding to an HTML document depending on the set of considered attributes that are associated with the nodes of the tree, and on the way such trees are constructed. For instance, the document tree can be defined using the tree of the elements defined in the Document Object Model (DOM) proposed by the World Wide Web Consortium (http://www.w3c.org) or using the Swing DOM tree generated by the Java Swing Parser (that conforms to the abstract model of document trees described here). In our preferred embodiment we produce a document tree based on the Java Swing Parser (http://java.sun.com).

Formally, a Document Tree is represented as a six-tuple $H=(N,par(.),|.|,G,start(.),end(.))$, where N is the set of nodes in the tree (nodes are also referred to as elements), par is a function associating each node n in N (except the root) with its parent, and |.| is a node labeling function from N to the set of natural numbers. |.| associates each element with a number according to the order of appearance of the element in the text of the document. $G_n$ is the attribute graph associated with each element n of N, and start(.) and end(.) return the start and end offsets of each element (measured in characters) as natural number (to possibly be used as distance measure). The final three arguments are described in some more detail below.

Elements of a document tree represent structural or textual parts of the document and are further qualified by attributes (for example, color attributes, font attributes and size attributes). We assume the presence of a set of attribute designators A. Each element n of an HTML tree (or in general, document tree) N is thus associated with a number of attributes, where each attribute consists of an attribute designator (e.g. "font-color") and a corresponding attribute value (e.g. "blue"). The attribute designators are taken from a fixed set A containing the designators of all possible attributes according to the underlying document object model plus the designators of some virtual Lixto attributes.

Always, A contains two distinguished attribute designators: "name", that represents the type and name of an element, and "elementtext", which represents the "textual" contents of an element. The value of "elementtext" of an element is defined as left-to-right concatenation of the contents of contained leaf elements. In addition to those attributes already contained explicitly in the DOM, our preferred embodiment uses the virtual attributes "elementtext" (as just described), "colpos" and "imgdata". A virtual attribute is an attribute that needs to be computed by the system rather than being explicitly present in the original document tree. Every table column (represented by "td") is associated with a "colpos" attribute which has as value a list of integers expressing the column number of the td element in the hierarchy of tables where this td occurs (e.g. a table column in position four contained in a table which occurs inside a table column in third position of another table is labeled as "[3]:[4]"). "imgdata", on the other hand, is used only in conjunction with the "img" element and stores the actual image source as binary string (In alternative embodiments only a signature, checksum, or other characteristic values associated to the image are stored). In our preferred embodiment, the values of the virtual attributes are computed on demand. However, alternative embodiments may compute the values of the virtual attributes immediately after constructing the document tree and store them as parts of an extended document tree. In this document we do not describe in detail how the values of virtual attributes are computed because this shall be obvious to those skilled in the art. They are computed by appropriate tree traversal algorithms. To sum up, the virtual attributes are:

elementtext: This attribute value is the concatenated text content of all its leaf elements.

colpos: This attribute value identifies the column number of a table data "td" (or elements of similar type in non-HTML documents) within a table (even for nested tables).

imgdata: This attribute value is the data of an image referred to by the "img" element.

In general, a node n of an HTML tree has a small number of associated attributes. However, two attributes are always required: the "name" attribute which is usually provided by the DOM, which returns the HTML element type and the above-explained elementtext attribute. Sometimes the value of an attribute is an attribute designator itself to which another value is attached (characterized as function value instead of the usual string value). In this case we speak of a second level attribute (or, more generally, of a deeper level attribute).

For example, the Swing parser, when applied to a content element of the form

```
<a href="index.html"> Mainpage </a>
``` treats the anchor element "a" as first level attribute with associated value "href", and "href" in turn as second level attribute with value "index.html". In general, there could be an arbitrarily deep hierarchy of attribute nesting levels. We assume (as done in the Swing DOM) that for each HTML node each designator occurs at most once; in particular, it can never happen that the same attribute designator can never occur at various levels of the attribute hierarchy associated with an HTML node (for instance no second-level attribute "size" for "font" and a first-level attribute "size" for table is used in the Swing parser, rather "font-size" is used in the first case). However, even for document object models who disobey this condition, our approach can be easily used by specifying the complete path to the deeper-level attribute.

With each HTML node n of a document we associate the attribute graph $G_n$ consisting of all pairs (attribute-designator, attribute-value) for all attributes of n, occurring at all possible nesting levels. For example, if n is the content element

```
<a href="index.html"> Mainpage </a>
``` then $G_n=\{$(name, content), (elementtext, "Mainpage"), (a, href, (href index.html)$\}$. Observe that leaf elements containing a text are elements of type "content". For a slightly more complex example see below.

Each element n in N is also associated with its start and end offsets in the document. These offsets resemble character offsets (ignoring all HTML tags). The start offset of an element m is: start(n)=length(C) where C is the concatenation of the values of the elemenext attributes of all the leaf elements x in the document such that |x|<|n|. The end offset of an element n is: end(n)=start(n)+length(text), where text is the value of the attribute elementext of n. In our preferred embodiment, the end offset of a leaf element (except of the last one) is the start offset of another leaf element (i.e. 1 is added to the end function).

Figure 8:
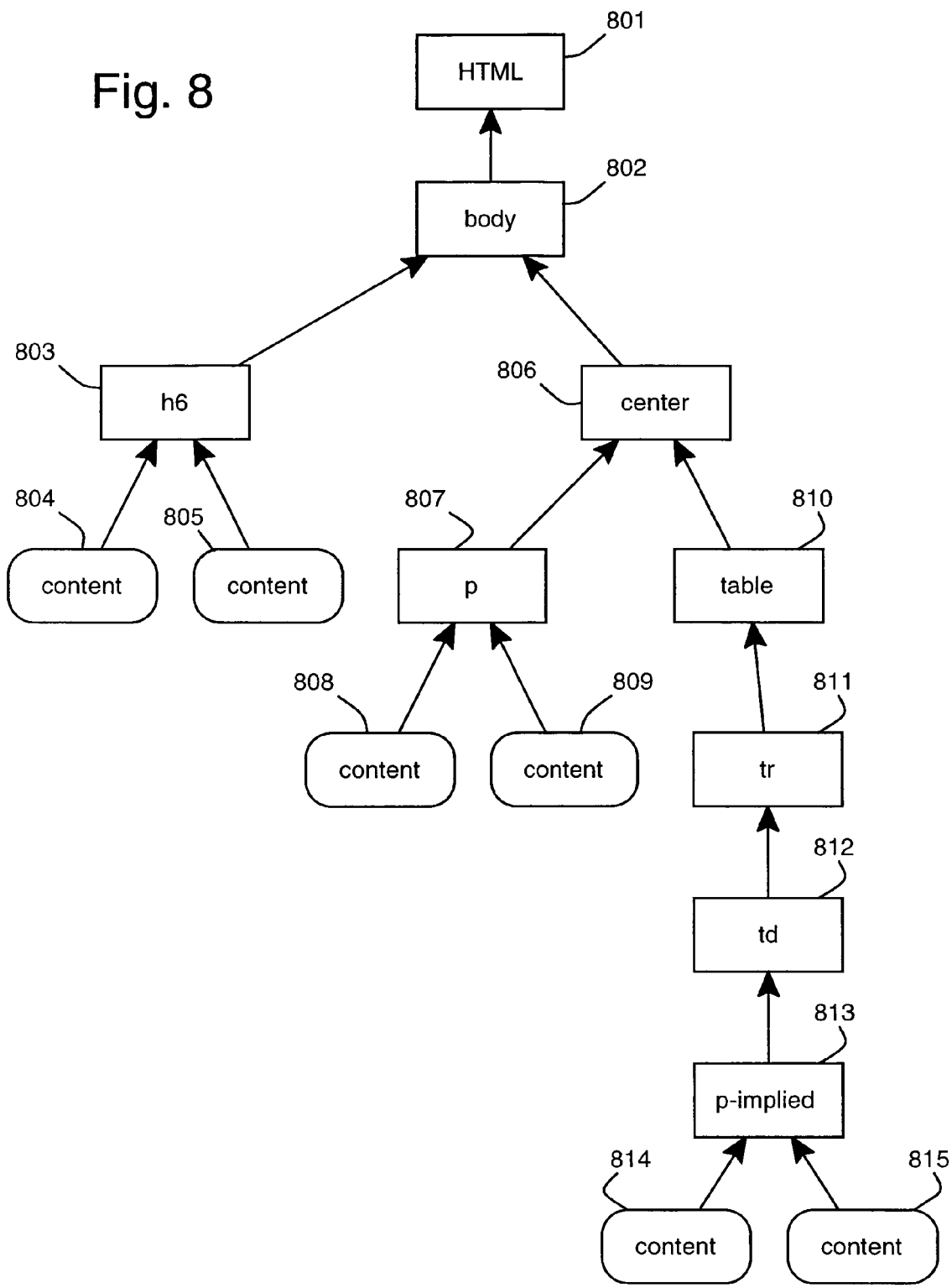

Consider the HTML document given below—its corresponding document tree as generated by the Java Swing Parser is shown in FIG. 8.

```
<html>
    <body bgcolor="#FFFFFF">
        <h6 align="center">Items for Sale</h6>
        <center>
        <p>
            <i><font color="#FF6633">1 items found for "Notebooks". Showing
            Item 1
                to 1.</font></i>
        </p>
        <table width="75%" border="1">
        <tr>
            <td width="49%" height="22"><a href="notebook1.html">56 K Modem
            PCMCIA
                Card for Notebooks</a></td>
        </tr>
```

```
            </table>
          </center>
        </body>
      </html>
```

Rectangles [801, 802, 803, 806, 807, 810, 811, 812, 813] and round boxes [804, 805, 808, 809, 814, 815] in FIG. 8 represent elements in the tree: Round boxes represent the textual content of the document and represent the leaves of the tree, whereas rectangles represent high level formatting elements (imposing a structure), like tables. Arrows between boxes represent the parent function and the text inside each rectangle is the value of the attribute "name".

To see how the content of the document is mapped to the content of the single elements consider the following elements and their characteristics.

Element [810] refers to the table of the example document, i.e. to the portion of the document contained between the pair of tags <table . . . > . . . </table>. It is further characterized by the attributes "width" and "border", i.e. the attribute graph $G_n$ associated to [810] is:
(width, 75%)
(border, 1)
(name, table)
(elementtext, 56 K Modem PCMCIA Card for Notebooks\n) where the character "\n" represents a newline character. Note that the value for the attribute "elementtext" is given by the concatanation of the "elementtext" value of [814] ("56 K Modem PCMCIA Card for Notebooks") and [815] ("\n").

Observe that in our preferred embodiment where we rely on the Swing parser, empty content elements (as [815]) occur as last child of a "p"-node. Moreover, virtual "p" nodes (called "p-implied") nodes (as [813]) are inserted into the document as parent nodes of content elements. In our preferred embodiment it is possible to ignore such "p-implied" tags and the final content element, too, if desired.

Element [814] refers to the portion of text: "<a href="notebook1.html">56 K Modem PCMCIA Card for Notebooks</a>" contained in the table. The element is characterized by the attributes "a", i.e. the attribute graph $G_n$ associated to [814] is:
(a, href)
(name, content)
(elementtext, 56 K Modem PCMCIA Card for Notebooks)
(href notebook1.html)

(2) Tree- and String Extraction

Our extraction technique is mainly developed for extracting single elements or tree regions (as defined below) from document trees. However, extraction from flat text (string extraction) is also possible. If, for example, the desired information is inside the content of a leaf element or inside the value of an attribute, then string extraction becomes necessary. For instance, if a first name and a surname are stored together in a single "td" of an original HTML document, the only possibility to split this information and to extract two separate items is the use of string extraction techniques. These techniques are based on regular expression matching and will be explained in detail later on.

Below a fragment of an eBay page is depicted. This example page was generated by a search for notebooks. These pages are usually rather structured. Each record is a table which contains the item number, the item description, possibly one or more references to pictures, price information (currency and price), a number of bids and the end date of the auction. We use this example to explain filters (rules), patterns and programs.

```
[...]
<INPUT type="SUBMIT" value="Search">   <A
href="http://pages.ebay.com/search/items/search.html"><FONT size=2>more search
options</A></FONT></TD>
<TD align="right"><FONT size=2><A href="http://cgi3.ebay.com/aw-
cgi/eBayISAPI.dll?TimeShow">eBay official time</A> 02:13:58 PDT</FONT><BR><FONT size=2><IMG
src="http://pics.ebay.com/aw/pics/new.gif"width=28 height=11> <A
href="search.dll?MfcISAPICommand=GetResult&query=notebook&ebaytag1=ebayreg&ht=1&st=0&SortPrope
rty=MetaEndSort&pb=y">Search by Price Range</A>
</FONT></TD>
</TR></TABLE><TABLE width="100%"><TR><TD align="left"><INPUT TYPE=checkbox NAME="srchdesc"
VALUE="y" ><FONT size=2>Search titles <B>and</B> descriptions (to find more items!)   <A
href="http://search-
completed.ebay.com/search/search.dll?query=notebook&ebaytag1=ebayreg&ht=1&SortProperty=MetaEnd
Sort">Search Completed Items</A></FONT></TD></TR></TABLE>
</FORM><TABLE border=0 cellPadding=0 cellSpacing=0 width="100%"><TBODY><TR><TD>
<TABLE bgColor=#666666 border=0 cellPadding=0 cellSpacing=0 width="100%"><TBODY><TR
bgColor=#999999><TD height=2><IMG height=1 width=780
src="http://pics.ebay.com/aw/pics/home/spacer.gif"></TD></TR></TBODY></TABLE>
<TABLE bgColor=#ffffff border=0 cellPadding=4 cellSpacing=0 height=20
width="100%"><TBODY><TR></TR><TBODY><TR align=left bgColor=#efefef vAlign=top><TD><P><FONT
size=3>Sort by:   <B>items ending first</B>
<B><FONT color=#000000 size=3> </FONT></B><FONT color=#000000 size=3>| </FONT><A
href="search.dll?MfcISAPICommand=GetResult&SortProperty=MetaNewSort&query=notebook&ebaytag1=eb
ayreg&ht=1&st=0">newly-listed first</A><B><FONT color=#000000 size=3> </FONT></B><FONT
color=#000000 size=3>| </FONT><A
href="search.dll?MfcISAPICommand=GetResult&SortProperty=MetaLowestPriceSort&query=notebook&eba
```

-continued

```
ytag1=ebayreg&ht=1&st=0">lowest prices first</A><B><FONT color=#000000 size=3>
</FONT></B><FONT color=#000000 size=3>| </FONT><A
href="search.dll?MfcISAPICommand=GetResult&SortProperty=MetaHighestPriceSort&query=notebook&eb
aytag1=ebayreg&ht=1&st=0">highest prices
first</A></FONT></FONT></TD></TR></TBODY></TABLE></TD></TR></TBODY></TABLE>
<TABLE width="100%"><TR valign=middle><TD height=42 width="40%"><FONT size=2><FONT
face="Verdana, Arial, Helvetica, sans-serif"><B>2959</B> items found for <B><FONT
color=#ff0000>notebook</FONT></B>. Showing items 1 to 50.</FONT>
</FONT><DIV align=right><FONT size=2></FONT></DIV></TD>
<TD align=right height=42 vAlign=middle width="60%"><FONT face="Verdana, Arial, Helvetica,
sans-serif"><FONT size=2><IMG height=9 src="http://pics.ebay.com/aw/pics/home/arrow_red.gif"
width=5></FONT><FONT size=2> Too Many items? Add words to your
search.</FONT></FONT></TD></TR></TABLE>
<TABLE border=0 width="100%" cellspacing=0 cellpadding=0><FONT face=Arial size=-1><TR><TD
width="1%"> </TD><TD align=center bgcolor="#ffce00" width="20%"><TABLE bgcolor="#ffce00"
border=0 width="100%" cellspacing=0 cellpadding=2><TR align=center><TD nowrap><FONT face=Arial
size=-1> <B>All items</B></FONT> </TD></TR></TABLE></TD>
<TD width="1%"> </TD><TD align=center bgcolor="#ffef93" width="20%"><TABLE bgcolor="#ffef93"
border=0 width="100%" cellspacing=0 cellpadding=2><TR align=center><TD nowrap><FONT face=Arial
size=-1> <A
href="search.dll?MfcISAPICommand=GetResult&query=notebook&ebaytag1=ebayreg&ht=1&SortProperty=M
etaEndSort&st=2">All items including Gallery preview</A> </FONT></TD></TR></TABLE></TD>
<TD width="1%"> </TD><TD align=center bgcolor="#ffef93" width="20%"><TABLE bgcolor="#ffef93"
border=0 width="100%" cellspacing=0 cellpadding=2><TR align=center><TD nowrap><FONT face=Arial
size=-1> <A
href="search.dll?MfcISAPICommand=GetResult&query=notebook&ebaytag1=ebayreg&ht=1&SortProperty=M
etaEndSort&st=1">Gallery items only</A> </FONT></TD></TR></TABLE></TD><TD width="35%">
</TD></TR></FONT></TABLE>
<TABLE bgColor=#666666 border=0 cellPadding=0 cellSpacing=0 width="100%"><TBODY><TR
bgColor=#ffce00><TD height=2><IMG height=1 src="http://pics.ebay.com/aw/pics/home/spacer.gif"
width=1></TD></TR></TBODY></TABLE><TABLE bgColor=#666666 border=0 cellPadding=0 cellSpacing=0
width="100%"><TBODY><TR bgColor=#ffce00><TD height=2><IMG height=1
src="http://pics.ebay.com/aw/pics/home/spacer.gif" width=1></TD></TR></TBODY></TABLE><TABLE
bgColor=#666666 border=0 cellPadding=0 cellSpacing=0 width="100%"><TBODY><TR
bgColor=#ffffff><TD height=2><IMG height=1 src="http://pics.ebay.com/aw/pics/home/spacer.gif"
width=1></TD></TR><TBODY></TBODY></TABLE>
<TABLE bgColor=#ffffff border=0 cellspacing=1 width="100%" cellpadding=0><TBODY><FONT size=2
face="Verdana, Arial, Helvetica, sans-serif"><TR bgcolor="#ccccff" vAlign=middle>
<TD align=middle valign="top" width="10%"><IMG border=0 height=1
src="http://pics.ebay.com/aw/pics/home/spacer.gif" width=80><BR><B>Item#</B><BR></TD>
<TD align="center" valign="top" width="52%" ><B>Current Items</B><BR></TD>
<TD align="middle" valign="top" width="14%"><B>Price</B><BR></TD>
<TD align="middle" valign="top" width="6%"><B>Bids</B><BR></TD>
<TD align="middle" valign="top" width="16%"><B>Ends PDT
</B><BR></TD></TR></FONT></TBODY></TABLE>
<TABLE width="100%" cellpadding=4 border=0 cellspacing=0 bgcolor="#EFEFEF">
<TR><TD valign="middle" width="11%"><FONT size=3>1230625670</FONT></TD>
<TD valign="top" width="52%"><FONT size=3><A href="http://cgi.ebay.com/aw-
cgi/eBayISAPI.dll?ViewItem&item=1230625670">NEW LEATHER LAPTOP / NOTEBOOK CASE $149
VALUE</A></FONT>
<A href="http://pages.ebay.com/help/basics/g-pic.html"><IMG height=15 width=16 border=0
alt="[Picture!]" src="http://pics.ebay.com/aw/pics/1st/pic.gif"></A>
</TD>
<TD nowrap align="right" valign="top" width="14%"><FONT size=3><B>$1.00</B></FONT></TD><TD
align="center" valign="top" width="6%"><FONT size=3>1</FONT></TD><TD align="right"
valign="top" width="16%"><FONT color="#FF0000" size=3>in 46 mins</FONT></TD></TR></TABLE>
<TABLE width="100%" cellpadding=4 border=0 cellspacing=0 bgcolor="#FFFFFF">
<TR><TD valign="middle" width="11%"><FONT size=3>1231169333</FONT></TD>
<TD valign="top" width="52%"><FONT size=3><A href="http://cgi.ebay.com/aw-
cgi/eBayISAPI.dll?ViewItem&item=1231169333">Compaq 12x1400 Notebook- Brand New In Box
!!!</A></FONT>
</TD>
<TD nowrap align="right" valign="top" width="14%"><FONT size=3><B>$765.00</B></FONT></TD><TD
align="center" valign="top" width="6%"><FONT size=3>19</FONT></TD><TD align="right"
valign="top" width="16%"><FONT size=3>Apr-23 04:04</FONT></TD></TR></TABLE>
<TABLE width="100%" cellpadding=4 border=0 cellspacing=0 bgcolor="#EFEFEF">
<TR><TD valign="middle" width="11%"><FONT size=3>1230629268</FONT></TD>
<TD valign="top" width="52%"><FONT size=3><A href="http://cgi.ebay.com/aw-
cgi/eBayISAPI.dll?ViewItem&item=1230629268">Commax I988 notebook computer like breand
new</A></FONT>
<A href="http://pages.ebay.com/help/basics/g-pic.html"><IMG height=15 width=16 border=0
alt="[Picture!]" src="http://pics.ebay.com/aw/pics/1st/pic.gif"></A>
</TD>
<TD nowrap align="right" valign="top" width="14%"><FONT size=3><B>$450.00</B></FONT></TD><TD
align="center" valign="top" width="6%"><FONT size=3>1</FONT></TD><TD align="right"
valign="top" width="16%"><FONT size=3>Apr-23 04:07</FONT></TD></TR></TABLE>
<TABLE width="100%" cellpadding=4 border=0 cellspacing=0 bgcolor="#FFFFFF">
<TR><TD valign="middle" width="11%"><FONT size=3>1135298005</FONT></TD>
<TD valign="top" width="52%"><FONT size=3><A href="http://cgi.ebay.com/aw-
```

-continued

```
cgi/eBayISAPI.dll?ViewItem&item=1135298005">Bayonet s From Janzen's Notebook NEW HB
NAR!</A></FONT>
<A href="http://pages ebay.com/help/basics/g-pic.html"><IMG height=15 width=16 border=0
alt="[Picture!]" src="http://pics.ebay.com/aw/pics/1st/pic.gif"></A>
<IMG height=15 width=54 border=0 alt="eBay Buy It Now Item!"
src="http://pics.ebay.com/aw/pics/promo/holiday/buyItNow_15x54.gif">
</TD>
<TD nowrap align="right" valign="top" width="14%"><FONT size=3><B>$37.00</B></FONT></TD><TD
align="center" valign="top" width="6%"><FONT size=3>-</FONT></TD><TD align="right"
valign="top" width="16%"><FONT size=3>Apr-23 04:31</FONT></TD></TR></TABLE>
<TABLE width="100%" cellpadding=4 border=0 cellspacing=0 bgcolor="#EFEFEF">
<TR><TD valign="middle" width="11%"><FONT size=3>1231172356</FONT></TD>
<TD valign="top" width="52%"><FONT size=3><A href="http://cgi.ebay.com/aw-
cgi/eBayISAPI.dll?ViewItem&item=1231172356">64MB MEMORY KIT FOR COMPAQ ARMADA
NOTEBOOK</A></FONT>
</TD>[...]
```

(3) Tree Regions

Given a document tree H, we could consider all kinds of tree regions as possible extraction targets. Even if, in an alternative embodiments it is possible to consider highly complex tree regions, in our preferred embodiment we consider only two types of tree regions (and believe that this is sufficient for practical purposes): sequences (general tree regions, element-lists) and simple tree regions (subtrees), a special case of the former. A tree region of H rooted in a node r is said to be simple if and only if all the descendants of r in H belong to the tree region (which we also call a subtree), whereas in case of a sequence, only a contiguous interval of children of r and their subtrees is considered, formally defined as follows via its parent node, first and last child nodes:

A sequence X of H can be represented as triple (r, f, l), where r, f and l are elements of H such that par(f)=par(l)=r and X contains exactly all those nodes n of r such that start(f)<=start(n) and end(n)<=end(l). Sequences can be equivalently characterized as follows: A sequence X of H can be represented as triple (r, f, l), where r, f and l are elements of H such that par(f)=par(l)=r and X contains exactly the following elements:

all children x of r such that |f|<=|x|<=|l|, and
if x is in X, then every descendent of x is in X, too;
no other nodes are contained in a tree region.

Recall that "|.|" identifies each element with a number (see previous sections). In the following, the subtree rooted at the element n is referred to as tree(n). With root(X) we denote the root node of a tree region X.

Figure 3:
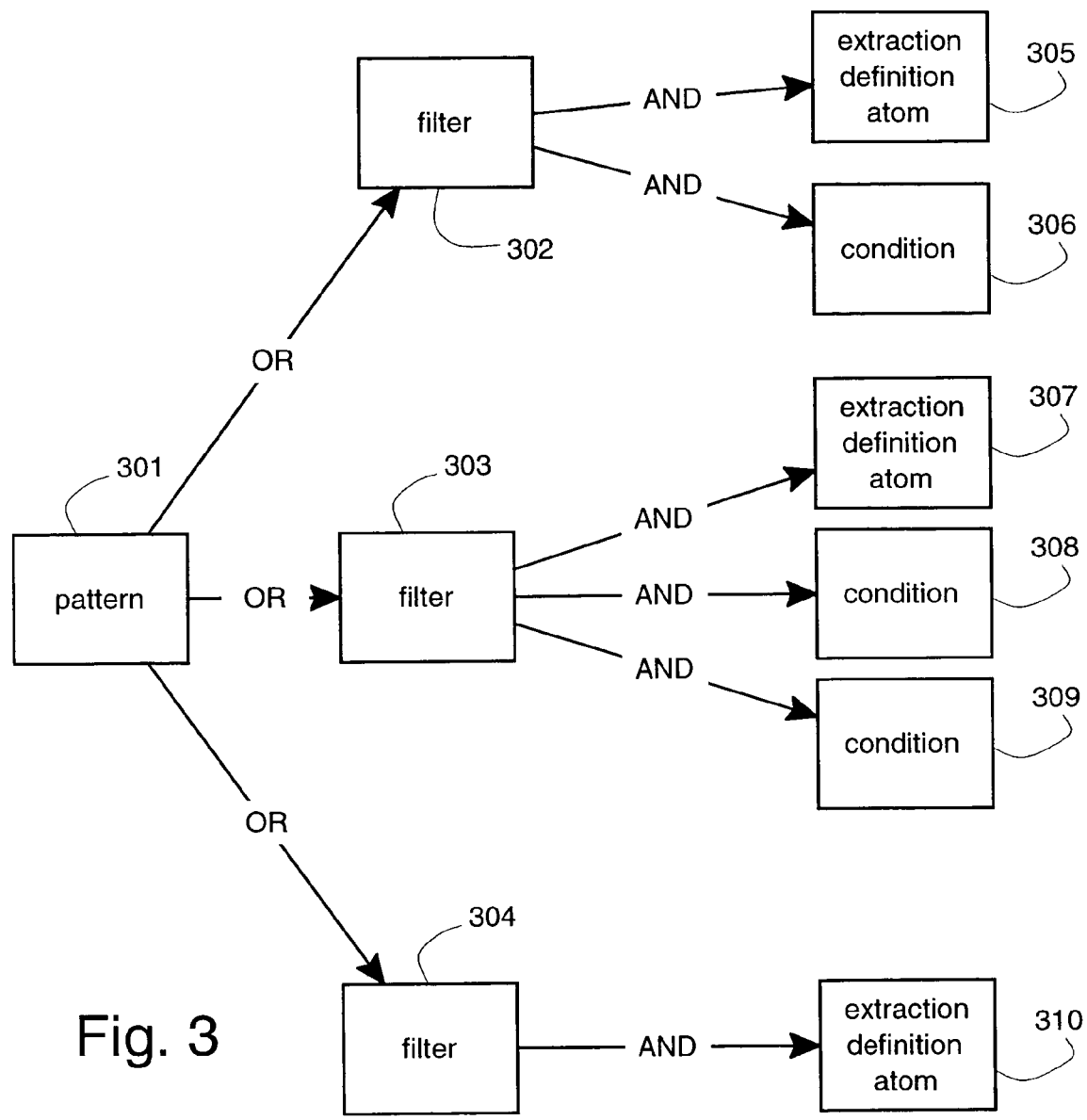
Figure 10:
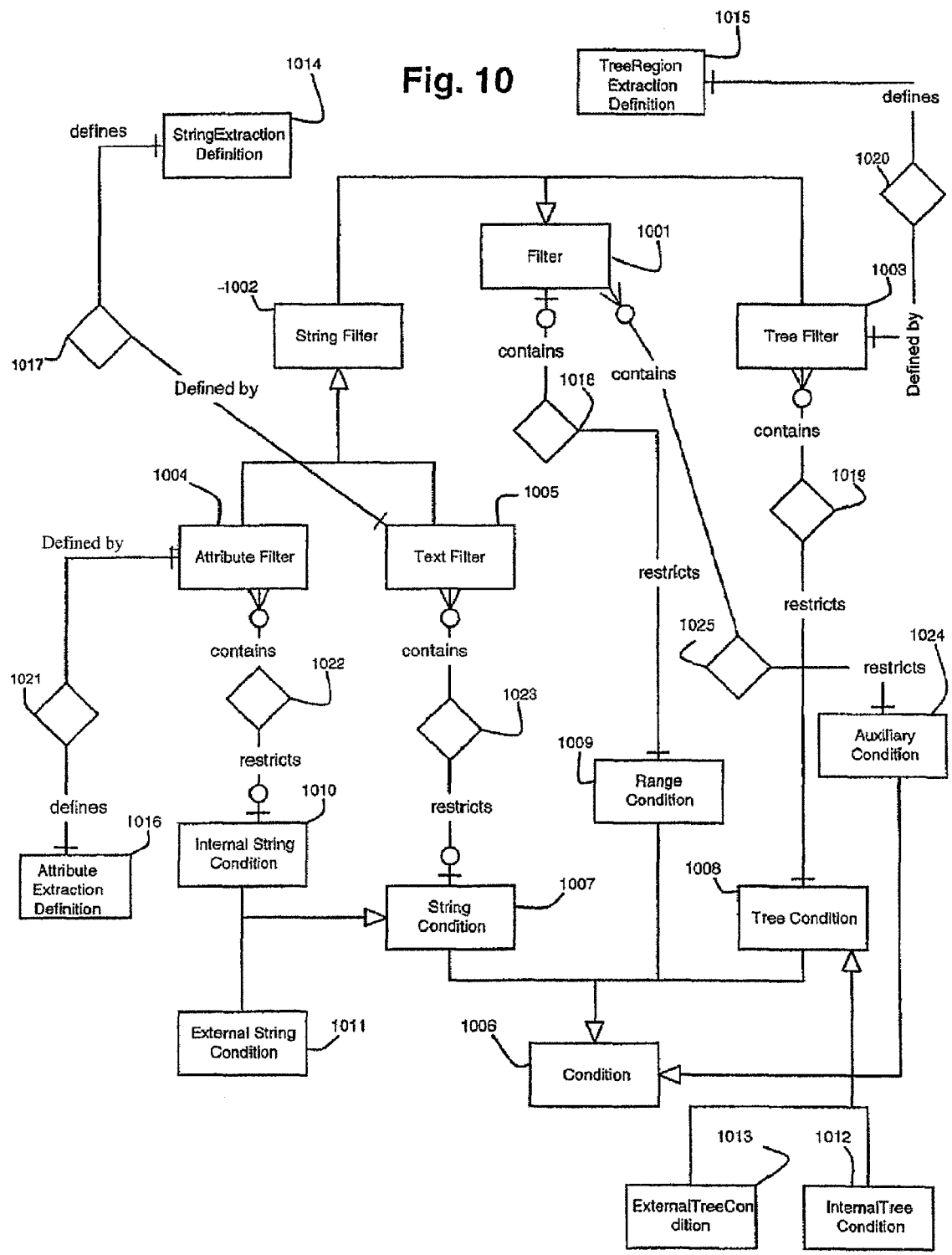

Example: One record of eBay can be characterized by a subtree with the root element "table". However, characterizing the region of all tables of an eBay page where entries occur, is not that straightforward. One has to describe it as a sequence (body, table, table) where the first and last children are tables. The sequence is too general to match the desired target only, hence external conditions (see below) expressing that directly before and after the sequence some headline and bottom-line appear needs to be added.

b) Data Representation for patterns and filters (FIGS. 3, 9, and 10)

A wrapper program consists of a set of extraction rules that define how to extract the desired information from a set of documents. Given a document, an extraction pattern selects pieces of this document. These portions of the original document selected by a pattern p are denoted as pattern instances.

Pattern instances can be both tree regions or string sources depending on the type of pattern. We denote pattern instances that are tree regions as tree pattern instances and pattern instances identifying text strings as string pattern instances.

Each pattern consists of a pattern name and one or more filters. Two or more filters for the same pattern contribute disjunctively to the pattern definition. In other terms, if a pattern p consists of k filters $f_1$ to $f_k$, then, on each input document D, the set of pattern instances of p w.r.t. D consists of the union of the sets $S_1$ to $S_k$ where, for $1<=i<=k$, each $S_i$ is the set of pattern instances w.r.t. D matched by the filter $f_i$. Moreover, in order to eliminate redundant information, various minimization or maximization techniques can be applied. However, it is not necessary to apply such techniques. In our preferred embodiment, if a and b are two instances of some pattern p and both are child-pattern instances of a same parent-pattern instance, then the designer can choose whether to use minimization, maximization or retrieve all results. In case of minimization, if a is contained in b, the system eliminates b according to the minimization principle that more specific pattern instances are preferred. This will be explained in detail in the section on program evaluation. Alternative embodiments can use other preference strategies to deal with pattern instance inclusion.

FIG. 3 explains the logical structure of a pattern via an example. A more detailed description is given in the entity relationship diagram of the language section, where, the predicates of Elog are also described in full detail. The logical scheme of one example pattern [301] consisting of three filters [302, 303, 304] is depicted. The pattern extracts the union of the extracted targets of each filter (additionally minimization or maximization of extracted instances of all filters of one pattern can be applied, as will be explained later). Each filter [302, 303, 304] consists of one extraction definition atom which characterizes the information to be extracted [305, 306, 307] and possibly a number of additional conditions [306, 308, 309]. A filter extracts targets which match the extraction definition atom and all imposed conditions. Targets are either elements, element-lists or strings as described in more detail later. Additionally, every filter contains an atom which refers from which parent pattern this instance derives (not depicted in FIG. 3).

More specifically, each filter refers to a parent pattern from which it has to extract the desired information and specifies how to retrieve this information from a parent pattern instance. Essentially a filter specifies the type of the desired information and how to distinguish the desired information from other similar information, i.e. it specifies some additional conditions that the desired information must fulfill. All the conditions in a filter are interpreted conjunctively in the sense that a portion of a Web page satisfies a filter if and only if it satisfies all the conditions expressed in these filter. For a sample pattern see FIG. 3.

FIG. 9 shows an extended entity-relationship diagram (EER) describing a data structure for representing and storing the definition of information patterns. For an explanation of various notations used in entity relationship diagrams refer to Bernhard Thalheim, "Entity Relationship Modeling: Foundations of Database Technology", Springer, ISBN 3540654704. We recall that there are alternative ways to describe this data structure, such as class diagrams or logical representation.

A pattern [901] can be a document pattern [903] or a source pattern [904], and is characterized by a unique name [902].

A document pattern represents a set of similarly structured Web pages, and is defined [916] by one or more document filters [915]. Document filters define a way to retrieve documents from the text (in particular, from given links) of other documents. Essentially, evaluating a document filter (which takes as parent pattern a string pattern instance or a constant string representing the URL) the corresponding documents are fetched and their document tree constructed. With document filters, patterns can be reused on further pages, and recursive behavior can be exhibited.

A source pattern describes parts or elements of (HTML) documents. It can be a tree pattern [907] or a string pattern [906]. Tree patterns define the information of interest using the tree representation of (HTML) documents, whereas string patterns represent (HTML) documents or parts of those as plain text disregarding formatting tags.

A tree pattern is defined by one or more tree filters [912] (relation [909]), whereas a string pattern is defined by one or more string filters [911] (relation [908]). Filters [910] can be tree, string or document filters; string filters can be distinguished in text filters [913] and attribute filters [914]—both are described below in more detail. Tree and string filters extract information (relation [905]) from instances of a pattern (either a source or a document pattern). An attribute filter can define a string pattern only and works on tree and document patterns only. A text filter can define a string pattern only and can refer to all kind of patterns as parent patterns. Tree filters can extract information from tree patterns or document patterns only.

Every filter is associated with exactly two patterns. First, it is associated with the actual extraction pattern [908, 909] to whose definition it contributes. Second, it refers to a parent pattern [905] which defines the hierarchical extraction context. However, not all filters belonging to the same pattern need to refer to the same parent pattern. This degree of freedom paves the way for recursive pattern definition as will be explained in the "Elog extraction programs" section. Moreover, allowing several filters of a pattern to have different parent patterns allows a developer to design pattern hierarchies that do not rigidly reflect the hierarchy present in the original HTML document. Examples of pattern definitions with filters referring to different parent patterns are given in FIG. 15 which will be explained in detail later on. Note that in more restrictive alternative embodiments of the disclosed invention it may be required that each filter of a pattern refers to the same parent pattern.

In general, one can view the pattern structure of a program as directed graph—an arc connects a pattern with another pattern if the second pattern is the parent pattern of at least one filter of the first pattern (using a multi-connection graph, each filter corresponds to an arc). Even though, in general, the pattern structure is a graph, the extracted pattern instances are always hierarchically ordered in form of a forest (as described below in more detail).

The structure of a filter is described in detail in FIG. 10 using an entity relationship diagram. The diagram does not describe the structure of a document filter as it consists of a document extraction definition only.

Example of eBay pages: One source pattern of an eBay wrapper may be called "price". It is defined with a single filter referring to "record" (the complete table for one auction item) as parent pattern and extracts the whole price information (using some conditions). In this case, the pattern "price" only refers to one parent pattern, however in general, a pattern may have more parent patterns. With eBay pages it makes sense to extract in hierarchical order, i.e. first extract the records, and then extract contained patterns such as price and bids to associate the corresponding pattern instances (the item to be sold, its price, the number of bids for this item) with each other. An eBay wrapper might also consider the "Next" button using a document pattern to extract and navigate to the next linked page of eBay search results. Here the same patterns shall be used on the new page, too, hence the document pattern which extracts eBay documents has multiple filters—the one to start with, and the one which refers to the "Next" button as parent pattern (see FIG. 15).

Example of yahoo auction pages: Yahoo Auction pages are (at least were at the time these lines were written) structured as follows—each item is described in one table row, however, there are two different tables and headings, namely "Featured Auctions" and "All auctions". One can define "record" by referring to two different parent patterns. "record" contains two filters, where one refers to "tablefeatured" (1515) and the other refers to "tableall" (1514) as parent pattern.

Filters [1001] are mainly characterized by the way they identify information being extracted. There are three different kind of filters:

Tree filters [1003] extract tree regions from other tree regions. They are defined by [1020] a tree region extraction definition [1015]. Pattern instances identified by a tree region extraction definition can be further filtered out by imposing additional tree conditions. Tree region extraction definitions specify the characteristics of the simple or general tree regions being extracted. In particular they specify how to identify the the root elements of these trees and, if the desired tree regions are not subtrees (in the spirit of our above definition), the characteristics of the first and last child that belongs to the region.

String filters [1002], which are further subdivided into attribute filters and text filters:

Attribute filters [1004] extract information from attribute values. They must identify an attribute designator whose information has to be extracted and impose some further conditions (as explained later). For this reason, attribute filters are defined by [1021] attribute extraction definitions [1016]. An attribute filter extracts the values of one kind of attribute designator (or optionally, of more than one kind, e.g. defined via regular expressions).

Text filters [1005] always extract a substring of the parent string pattern instance, but they are also defined by [1017] a string extraction definitions [1014] that can further restrict the characteristics of the substring being extracted. A string extraction definition is essentially the specification of a language that defines all the substrings that can be extracted.

We give three easy examples of when to use which kind of filter based upon the example page used above whose HTML tree is depicted in FIG. 8:

The wrapper designer wants to extract all table data entries of item descriptions. A tree filter allows to navigate the document tree down to instances of "td", e.g. additionally requiring that only content of table data is extracted which is written in bold.

The wrapper designer wants to extract information on all pages to which a given Web page refers via links. This information is not part of the elementtext of the document, but is contained in the attribute values. Therefore a special filter needs to be used which is capable of extracting the URLs out of attribute values. An attribute filter using as parent pattern a suitable tree pattern extracts the values of one or more specified attributes of the root elements of the tree-pattern instances.

The wrapper designer wants to extract the information about the currency of a price and the amount (price without currency). This information is contained within a leaf node, hence first, tree filters can navigate to the relevant node, but a text filter must be used to extract amount (e.g. considering numbers separated with at most one dot).

Extraction definitions are constitutional parts of filters— extraction definitions are location conditions which identify instances to be extracted. As can be seen in FIG. 10, according to the respective type of filter, there are three different kinds of extraction definitions: Tree Region Extraction Definitions, Attribute Extraction Definitions and String Extraction Definitions. These contain one or more element path definitions, an attribute path definition or a string path definition, respectively. The detailed syntax of extraction definitions according to our preferred embodiment will be defined below.

In addition to a required extraction definition, filters may contain refinement conditions, in the following simply called conditions [1006], that restrict the extracted filter instances that are matched by each filter. The following classes of conditions restrict the set of selected targets in the following way (more details will follow):

internal (inherent) tree conditions [1012] are used to require that the tree pattern instance that has to be extracted (a tree region) contains or does not contain a particular type of element.

external (context) tree conditions [1013] are used to require that some particular element precedes (or does not precede) or follows (or does not follow) the tree pattern instance that has to be extracted.

internal (inherent) string conditions [1010] are used to specify that a string pattern instance must (or must not) contain a particular substring.

external (context) string conditions [1011] require that a string belonging to a particular regular language does (or does not) precede (or follow) a string pattern instance that has to be extracted.

auxiliary conditions [1024, 1025] are conditions that express that certain elements (either desired pattern instances or other HTML elements or strings used by other conditions) should satisfy further restrictions (Such conditions are connected to either the extraction definition or to some of the above condition). In particular, in our preferred embodiment, the auxiliary conditions are of three types:

pattern reference conditions, expressing that the some elements must be an instance of some defined pattern (usually different from the pattern associated with the current filter)

concept conditions, expressing that some attribute value belongs to a predefined "ontological" class (for example, that a string corresponds to a city name or that a string expresses a date)

comparison conditions, which are predefined relations for predefined "ontological" classes of elements (e.g., dates can be compared for checking whether one date occurs before another specified date, or it can be checked whether a city name equals the city name "Vienna", regardless of the language in which it occurs)

Our method and system is open for adding various further types of auxiliary conditions. The current preferred embodiment supports date, city and currency. Moreover, some more restrictive embodiments may not allow any auxiliary condition at all.

range conditions [1009] restrict the number of possible targets extracted by the filter. The targets extracted by a filter are ordered according to their position in the parent-pattern instance; a range condition specifies that only some of the targets from this sequence are to be extracted, by defining ranges of valid positions in the sequence.

To each kind of filter some kinds of conditions can be applied. Every filter can contain a range condition. Attribute filters additionally can contain [1022] only internal string conditions [1010], whereas text filters can contain general string conditions [1007] and tree filters can contain general tree conditions [1008]. String conditions can be further specialized into internal string conditions [1010] and external string conditions [1011] whereas tree conditions can be further specialized into internal tree conditions [1012] and external tree conditions [1013].

Example

As internal condition, the user might require that each eBay record has to contain at least one hyperlink, or shall not contain a particular word. As external condition, the user may require that an eBay record is only extracted if somewhere before in the same document (the document itself is acting as parent instance) the usual headline occurs.

D. The Elog Language

Each pattern can be translated into a set of "datalog like" rules, called Elog rules, that formally define and represent the pattern. These rules are built by using a set of predefined predicates for expressing conditions. Atoms appearing in the bodies of Elog rules can contain complex constant terms which are mainly used to identify elements in a document tree. For an introduction to datalog and definition of standard notions (such as Herbrand universe) see S. Ceri, G. Gottlob and L. Tanca, "Logic Programming and Databases", Surveys in Computer Science, Springer Verlag, 1990, ISBN 3-540-51728-6.

(1) Tree Extraction: Element Path Definition

Recall that our technique provides two alternative and complementary mechanisms of data extraction: tree extraction and string extraction. The first exploits the tree structure of a document, using the hierarchical structure to increase the accuracy of the extraction task. For all kinds of extraction we require an location descriptor.

Elements of an HTML tree are identified by describing the properties of their corresponding tree paths and possibly the properties (attributes) of the elements themselves. This tree path acts as location descriptor for tree structures. A plain tree path connects an element to the root of a tree region (not necessarily the absolute root node of a document). Our method often uses incompletely specified tree paths. These are obtained from plain tree paths by inserting the wildcard "*" at some places. This wildcard acts as substitute for arbitrary elements except the element type occurring after the occurrence of the wildcard. Plain tree paths are considered special cases of incompletely specified tree paths. In this document, the term tree path is always used as a synonym of incompletely specified tree path.

A tree path, even a plain one, usually matches several HTML elements of a given page or page region. Indeed, it is normally desired to identify several elements. For example, a designer may want to extract all table rows from a given table and can use a single tree path to designate all table rows. Given a tree region of an HTML tree, the semantics of a tree path is given as the set of matched elements within this tree region.

As an example of a tree path consider ".*.table.*.tr". The dot is simply used as concatenation sign. Given the sample eBay page whose HTML code is stated above, this tree path matches all tr items in all tables of the document. Note that for this particular example the following tree paths also match precisely the same elements: ".*.tr", ".table.tr", ".*.body.*.tr". As will be explained in more detail below, a star in a tree path stands for all arbitrary (possibly empty) sequences of HTML tags, except for those sequences that violate certain minimality conditions. In our preferred embodiment, we use only the following minimality condition: Any star that occurs before an HTML tag t can match only those sequences of text that do not contain t. For example, if a document contains nested tables at various levels, then, in our preferred embodiment, the tree paths "body.*.table" and "*.table" both match the top-level tables only, and not tables that occur inside other tables. Note that other minimality conditions are conceivable and can be used in alternative embodiments. Tree paths used within a filter are always to be interpreted relative to a parent-pattern instance of the filter's parent pattern.

Tree paths are formally defined in the following way: A plain tree path is a sequence of consecutive nodes in a subtree of an HTML tree. In an incompletely specified tree path stars may be used instead of element names.

Recall that by element we understand a node of the DOM tree of a document. An element name is the type of a node of a DOM tree, i.e. a possible value for the "name" attribute of an element. Examples of element names in the Swing DOM used in our preferred embodiment are: table, tr, td, content, p.

Plain tree path. Let e be a possible value of the attribute "name" (i.e., e is an element type). Then .e is a plain tree path. If a and b are plain tree paths, then ab is a plain tree-path.

A plain tree path is an (absolute) location descriptor.

Incompletely specified tree path. e is defined as above. Then (1) Every plain tree path is an incompletely specified tree path. (2).*.e is an incompletely specified tree path, and (3): If a and b are incompletely specified tree paths, then ab is an incompletely specified tree path.

An incompletely specified tree path is a generalized location descriptor.

Matched elements. Given a tree path $tp=r_1 r_2 r_3 \ldots r_n$ where each $r_i$ is either of the form ".e" or ".*.e" where e is an element name, and given a tree region S of an HTML tree with root node r. For each i in 1 ... n, $T_i$ is defined as:

$T_0 = \{r\}$

If $r_i = .e: T_i = \{x | \text{exists m in } T_{i-1}: \text{par}(x) = m \text{ and the element name of x is e}\}$ If $r_i = .*.e: T_i = \{x | \text{exists m in } T_{i-1} \text{ and exists k in N: } \text{par}^k(n) = m, \text{ the element name of x is e and for each h such that } 1 <= h < k \text{ the element type of } \text{par}^h(x) \text{ is not e}\}$ The set tp(S) of elements matched by the tree path $tp=r_1 r_2 r_3 \ldots r_n$ relative to S is the set $T_n$. par is the parent function pointing to the parent element of a specified element.

It is possible to refine the selection process by specifying the characteristics of the desired elements using attribute conditions. An attribute condition c specifies that only those elements which have a defined value x for a certain attribute such that x satisfies the condition c, are matched. Thus, an attribute condition specifies the designator of the attribute to be tested and requires the value to be equal to the specified value or to contain it as a substring. Hence, attribute conditions can be formally represented as triples containing the attribute designator, its required value and a special Boolean parameter s which is true for exact match and false otherwise. Sometimes it is useful to express that a certain attribute is defined without requiring it to have a particular value. This can be expressed by using an empty second parameter together with false as third parameter of the attribute condition. It just means that the empty string is required to be a substring of the attribute value which is obviously fulfilled if and only if the attribute is defined for this element. Before giving a formal definition of attribute conditions, we illustrate this notion with an example.

Example (".*.hr", [(size, "3",true), (width, "",false)]) identifies horizontal rules which are of size 3 with some specified width attribute (regardless of the attribute value, due to the false and the empty value argument).

Attribute conditions. An attribute condition is a triple (x,y,s), where x is an attribute designator and y either a string (simple attribute condition) or a variable (concept attribute condition), and s can be true or false. An element satisfies an attribute condition (x,y,s) if it contains a pair (x,v) where, if s is true, v needs to be equal to y (or in case of a concept variable an instance of y), and if s is false, v needs to be a superstring of y only.

If y is a variable, this variable must be used within a concept condition of the same Elog filter which evaluates to true for y. In an alternative embodiment we do not distinguish between substrings and exact mode, but instead the user specifies a regular expression which the attribute value must match. In our preferred embodiment, this can be realized by adding a string pattern as child pattern.

Element path definition. An element path definition is a pair epd=(tp, C) where tp is a tree path and C is a set of attribute conditions. An element path definition is called simple if its tree path is plain and consists of only one element name.

Elements matched by an element path definition. Let epd= (tp, C) be an element path definition and S a tree region. epd(S) identifies the set of elements of S (i.e. starting at the root of S) obtained from the set tp(S) of elements in S matched by tp by removing these elements that do not satisfy at least one of the attribute conditions in C.

Example

Consider the element path definition (".*.hr", [(size, "3", true), (width, "",false)]). First, all horizontal rules at the required level of the HTML tree are returned. Afterwards, their attributes are compared with the required attributes, and if at least one condition is not satisfied, this horizontal rule is not extracted.

(2) String Extraction

As discussed before, our invention provides a second extraction method that relies on a flat representation of documents or document parts. String extraction is usually applied on the elementtext value of an element, though it may also be applied to the value of other attributes. As soon as one pattern is defined via string extraction, all its child patterns may only use string extraction. We denote as string source any string contained in an attribute of an element of an HTML tree (usually the elementtext attribute) associated with its offsets.

Text filters use a string path definition. Generally, a string path definition spd is specified via a formal language L (for example, using a regular expression). A spd applied to a string s allows one to identify and extract all substrings of S that are contained in the language L. Our preferred embodiment provides two different ways to specify such a language: using a regular expression or using a "concept" predicate. Indeed, as explained in detail below, the system allows even a mixture of these—i.e., a regular expression which may further contain some variables expressing predefined semantic and syntactic concepts.

Regular expressions are powerful tools for text processing and matching. If a string s is matched by a regular expression r we say that s is in r. Usually, extraction generates maximal or minimal not-overlapping substrings. See J. E. Hopcroft and J. Ullman: Introduction to Automata Theory, Languages, and Computation, Addison-Wesley, ISBN: 0201441241, for more information on regular expressions. See OroMatcher (http://www.savarese.org/oro/software/OROMatcher1.1.html) for a Java regular expression package.

String Path Definition. A string path definition spd is a regular expression r possibly containing variables $R_i$ which are used in a "concept" atom (concept($R_i$)) occurring in the same filter. We denote the language defined by spd as L(spd). A Variable V occurring in a regular expression is written as "\var[V]" in order to distinguish it from the lexicographic item "V". If a variable consists just of a single letter, we abbreviate it to "\varV".

Example

The string path definition "[0-9]+\s\varV" where, in the same filter, V is constrained by the concept condition city(V), matches each string which starts with at least one number followed by a blank ("\s") and by a city name. With this string path definition, postal numbers together with a city name can be extracted if occurring in this format on some Web page. "\s" and "[0-9]+" are standard regular expressions as used in Perl 5.

The language defined by a unary predicate p is the set of all ground terms t such that the associated ground atom p(t) evaluates to true. The various kinds of concept predicates used in our systems will be introduced in the section "Elog language definition". Now we define how substrings are matched.

More formally, the set spd(S) of strings in source S matching spd is defined as follows:

Matched substrings. If S is a string source or a tree region and spd a string path definition, then spd(S)={s|s is substring of S and s is in L(spd)} in case S is a string source, and spd(S)={s|s is a substring of some x such that (elementtext,x) is a pair in $G_e$ where e=root(S) and s is in L(spd)} if S is a tree region.

The above definition also includes the case where a string path definition contains variables $R_i$. In this case concept predicates, each using one of the variables need to occur in the respective rule. Possible variables are instantiated with all possible contents, and then the not matching ones are sorted out by own predicates.

Recall that string extraction is not limited to extraction of effectively visible text (i.e. content accessible via the elementtext attribute), but additionally, strings can be extracted from other attributes.

Attribute extraction requires the specification of an attribute designator. Normally, the attribute designator itself represented as a string would suffices, however, for generality reasons, in alternative embodiments, also a regular expressing matching some designators is possible (although usually not necessary).

Attribute path definition. An attribute path definition apd is a string s (which reflects an attribute designator).

Matched attributes. Let S be a tree region, apd an attribute path definition and let e be root(S) and $G_e$ its associated attribute graph. The application of apd to S returns the value of the attribute with designator apd, or an empty set in case this attribute is not present in S.

Example

Assume the width of a table should be extracted. The width of a table is not explicitly contained in the visible document content, and is thus not contained in the value of the elementtext attribute associated with the table, but it can be obtained as the value of the width attribute via an attribute pattern. If the value of width includes a percentage symbol, and the designer is not interested in that, she can define a further string pattern extracting the numeric values.

b) Elog Language Definition

Before defining the syntax of Elog rules which are used to represent filters, we define the built-in predicates of the Elog language which implement basic extraction tasks. Elog predicates are atoms of the form $P(t_1, \ldots, t_n)$ where P is a predicate name and $t_1 \ldots t_n$ are either variables or constants whose values range over the following three types of objects:

Source objects: Sources (pattern instances) are complex tree regions and string sources. (Usually, in our examples, S is used as a variable for parent-pattern instances, while the variable X refers to those pattern instances which are to be extracted by the current rule.) In our preferred embodiment, source objects (which correspond to HTML element type constants and string constants) are internally represented as Java objects (based on predefined classes of the Java Swing parser; for example, a node of a parsing tree is represented as an object of the class javax.swing.HTMLParser.Element providing information on all attribute values, offsets, etc.). In alternative embodiments, several other possible representations can be used. For example, the node of an HTML tree can be represented by its node number or alternatively, as a complete description of the unique path in the parsing tree that leads to the desired element, or any other suitable identifier of the node.

Path definition objects are element path definitions, string path definitions, and attribute path definitions (usually denoted by epd, spd and apd in the examples below); and numerical arguments: Either variables or constants.

In the terminology of logic programming, the union of these three classes of objects (source objects, path definition objects and numerical arguments) is referred to as the Herbrand universe of an Elog program. See S. Ceri, G. Gottlob and L. Tanca, "Logic Programming and Databases", Surveys in Computer Science, Springer Verlag, 1990, ISBN 3-540-51728-6 for the notion of Herbrand base and related notions.

Element path definitions, string path definitions and attribute path definitions are, in each wrapper program, used as constants only. As we will see later, these constants are provided by the extraction pattern builder. Note that in alternative embodiments, these arguments of Elog program atoms could also be variables that are dynamically bound to some values provided by some additional atoms.

In a datalog-like language, functions are usually treated as relations. In Elog, the function epd(S) mapping a given source to a set of matched elements is treated as a relation subelem (S,epd,X). This predicate evaluates to true if and only if S is a tree region, epd is an element path definition and X is a complete subtree of S such that root(X) is in epd(S). As far as string extraction is concerned, the predicate subtext is used for writing the function spd(S) as subtext(S,spd,X).

(1) Extraction Definition Predicates subelem(S,epd,X). A ground instance subelem(s,epd,x) of subelem(S,epd,X) evaluates to true if and only if s is a tree region, epd an element path definition, x is a simple tree region of s and root(x) in epd(x).

subsq(S,epd,fpd,lpd,X). A ground instance of the subsequence subsq(s,epd,fpd,lpd,x) of subsq(S,epd,fpd,lpd, X) evaluates to true if and only if s is a tree region, epd is an element path definition,fpd and lpd are simple element path definitions (describing the first and last child) and x=($m_0,m_1,m_2$) is a general tree region contained in the tree region s, i.e. $m_0$ in epd(s), $m_1$ in fpd(tree($m_0$)) and $m_2$ in lpd(tree($m_0$)) and $|m_2|>=|m_1|$.

subtext(S,spd,X). A ground instance subtext(s,spd,x) of subtext(S,spd,X) evaluates to true if and only if spd is a string path definition, s is a string source or a tree region and x is in spd(s).

subatt(S,apd,X). A ground instance subatt(s,apd,x) of subatt(S,apd,X) evaluates to true if and only if s is a tree region, apd is an attribute path definition of root(s), and x is in apd(root(s)).

getDocument(S,X). A ground instance getDocument(s,x) of getDocument(S,X) evaluates to true if and only if s is a string source and x is the document tree corresponding to the URL represented by s.

Note that: 1) the predicates subelem and subsq work on tree regions, 2) subtext and subatt are predicates that extract string sources, and 3) subtext can operate on both tree regions or string sources. However, subatt can be used only on a tree region, returns string sources and gives the possibility to extract the values of attributes.

Normally, each rule (as defined below) contains an extraction definition predicate in its body, the only exception is specialization. Rules specializing the results of another rule instead use a pattern reference (as defined below). An example is given below.

(2) Context Condition Predicates

We now describe how contextual (also called external) tree and string conditions are described by Elog atoms. Recall that such conditions further restrain the elements matching an extraction definition atom based on textual surroundings. In particular, Lixto uses before and after predicates and their negations stating that some specified item must (not) occur either before or after a desired pattern instance. Therefore, external conditions restraining the set of desired target pattern instances will refer not only to the target pattern instances themselves, but also to other elements of the document tree, so-called external elements, and will express that any valid target element shall occur in a certain spatial relationship (before, after, not before, not after) to such an external element. In our preferred embodiment, these external elements are by default required to occur within the corresponding parent-pattern instance of a given pattern instance, though in principle this requirement can be dropped.

In our preferred embodiment, the external before and after conditions are further qualified by an interval (start,end) of relative distance parameters expressing how far the external element may occur from the desired pattern instance to be extracted. The interval borders start and end are percent values that are determined by the designer during wrapper design phase. For notbefore and notafter conditions, their is a unique relative distance parameter dist specifying that within such distance a forbidden external element must not appear. The absolute distance values are computed from the relative distance values by a function g(condition_type, s, x, percentual_distance), where condition_type is the type of the external condition (before, after), s is the actual parent pattern instance, x is the actual pattern instance, and percentual_distance is the specified relative distance. Absolute distances are measured in terms of character offsets, i.e. number of characters.

For any given pattern instance x having parent-pattern instance s, the function g computes the absolute distance value g(before,s,x,v) or g(after,s,x,v), respectively, from the percentual value v as follows:

$$g(before,s,x,v)=start(x)-(v/100)*(start(x)-start(s))$$

$$g(after,s,x,v)=end(x)+(v/100)*(end(s)-end(x))$$

A before element y is inside the required distance from a target-pattern instance x if its end offset end(y) is within the required distance g(before,s,x,v) from the start offset of x. An after element y is inside the required distance from a target-pattern instance x if its start offset start(y) is within the required distance g(after,s,x,v) from the end offset of x. Note that in other embodiments slightly different definitions of distances can be used.

Formally, in our preferred embodiment we consider the following predicates:

before(S,X,epd,start,end,Y,P). A ground instance before(s, x,epd,start,end,y,p) of before(S,X,epd,start,end,Y,P) evaluates to true if and only if s and x are tree regions, epd is an element path definition and y is a subtree of s such that root(y) in epd(s), and y precedes x within exactly p characters where g(before,s,x,start)<=p<=g (before,s,x,end).

before(S,X,spd,start,end,Y,P). A ground instance before(s, x,spd,start,end,y,p) of before(S,X,spd,start,end,Y,P) evaluates to true if and only if x is a string source, s a source (whose text is considered), spd a string path definition and y a string source such that y is in spd(s) and end(y) precedes start(x) within exactly p characters in s where g(before,s,x,start)<=p<=g(before,s,x,end).

notbefore(S,X,epd,d). A ground instance notbefore(s,x, epd,d) of notbefore(S,X,epd,d) evaluates to true if and only if s and x are tree regions, and there is no element e in epd(s) that precedes start(x) within at most g(before, s,x,d) characters.

notbefore(S,X,spd,d). A ground instance notbefore(s,x, spd,d) of notbefore(S,X,spd,d) evaluates to true if and only if x is a string source, s a source and there is no substring y in spd(s) such that y precedes x within at most g(before,s,x,d) characters.

Tree paths are computed in a relative way (starting from the root node of the parent-pattern instance). Hence, it does not make sense to specify distance ranges absolutely. In the simplest case a designer imposing a before predicate just wants to express that an element (a so-called before element) having some specified properties should occur before a desired pattern instance to be extracted. In this case distances are not relevant, which is reflected by stating start with 0 percent and end with 100 percent. This means that a before element can occur in a distance of 0% up to 100% from the pattern instance, with 100% being the maximum possible distance for this pattern instance within the parent pattern instance (in case of before the maximum possible distance equals start offset of the pattern instance minus the start offset of the parent-pattern instance).

Our system stores percentual values for distance interval borders. How these can be visually defined is discussed below where we explain the method of pattern building. In a more sophisticated embodiment it may be possible to apply a condition not only to an extraction target, but also to other contextual elements such as elements that are required to occur before. For instance, one may specify via a first before condition that some before element y having red color must occur before any extraction target x, and then in turn a second before condition may require that some bold-faced element z occurs before y. For this reason, the Elog language explicitly mentions variables such as Y and P above to allow for further referencing contextual elements.

Example

The example of a before condition referring to another before condition can be equally expressed with two before conditions referring to the target-pattern instance additionally using a comparison condition. The first before condition uses the distance variable P, and the second before condition the distance variable Q. An additional comparison condition comparing two numbers "<(P,Q)" can be added to specify the order in which the before elements have to occur.

Similarly, after atoms are of the following forms.

after(S,X,epd,start,end,Y,P). A ground instance after(s,x,epd,start,end,y,p) of after(S,X,epd,start,end,Y,P) is true if and only if s and x are tree regions, epd is an element path definition, y is a subtree of s, such that root(y) is in epd(s), and x precedes y exactly p characters where g(after,s,x,start)<=p<=g(after,s,x,end).

after(S,X,spd,start,end,Y,P). A ground instance after(s,x,spd,start,end,y,p) of after(S,X,spd,start,end,Y,P) is true if and only if x is a string source, s a source (whose text is considered), spd a string path definition and y a string source such that y is in spd(s) and x precedes y exactly p positions in s where g(after,s,x,start)<=p<=g(after,s,x,end).

notafter(S,X,epd,d). A ground instance notafter(s,x,epd,d) of notafter(S,X,epd,d) is true if and only if s and x are tree regions, and there is no element e that follows x after at most g(after,s,x,d) characters such that e is in epd(s).

notafter(S,X,spd,d). A ground instance notafter(s,x,spd,d) of notafter(S,X,spd,d) is true if and only if x is a string source, s a source and there is no substring y in spd(s) such that y follows x in at most g(after,s,x,d) characters.

Observe that "start" and "end" can be either variables or constants. Moreover, in straight-forward extensions of our preferred embodiment, further contextual condition predicates can be defined, such as:

below(S,X,epd,Y). A ground instance below(s,x,epd,y) evaluates to true iff s and x are tree regions, epd is an element path definition and y is a subtree of s such that root(y) in epd(s), and y occurs before x and has the same value for the attribute "colpos". If a designer wants to extract the third column of a table, but only starting with the fifth line, then she first defines to use "colpos=3", and then imposes the condition that it occurs under the contents as given in the fifth entry (or some attribute information of the fifth entry). This could be equally expressed with after, with the restriction that the colpos argument must occur. Hence, "below" is simply an abbreviation for after(S,X,epd,0,100,y,p) where epd contains "colpos=[value]". The analogously defined predicate above works exactly the same way w.r.t. before conditions.

Other embodiments could offer the possibility of contextual conditions which refer to elements outside the parent-pattern instance, e.g. within the "grandfather", i.e. the parent-pattern instance of the parent-pattern instance, etc. Such an extended concept is very useful to be used with below/above predicates in hierarchical extraction.

Example

Consider a page which contains a table where a price information is stored in the third column. The table header contains the text "Price" for this respective column. Then one filter with the parent pattern record defined as table row could use an below condition which expresses that inside the grandparent (i.e. the table) there is a row with the elementtext "Price" for the same column position. The column position itself is a variable in this case, it is just required that it appears in the same position as the pattern instance matched by this rule. This wrapper is stable in the case that two columns change their position, or a new column is added.

(3) Internal Condition Predicates

Internal (also called inherent) conditions are used to restrict allowed pattern instances based on properties contained in the instances themselves, i.e. in the tree region that constitutes these instances. Subtree positioning predicates are the firstsubtree and lastsubtree predicate. The firstsubtree condition states that the first child of a tree region should contain a particular element—this is very useful for defining subsequences, as it gives the possibility to express that the first and last subtree must contain some elements with specific properties. Usually, the variable X as used below will be the target of the corresponding rule although this is not required.

firstsubtree(X,Y). A ground instance firstsubtree(x,y) of firstsubtree(X,Y) evaluates to true if and only if root(y) is the first child of the tree region x.

lastsubtree(X,Y). A ground instance firstsubtree(x,y) of firstsubtree(X,Y) evaluates to true if and only if root(y) is the last child of the tree region x.

contains(X,epd,Y). A ground instance contains(x,epd,y) of contains(X,epd,Y) evaluates to true if and only if x is a tree region containing a subtree y where root(y) is in epd(x).

contains(X,spd,Y). A ground instance contains(x,spd,y) of contains(X,spd,Y) evaluates to true if and only if x is a source, and y is in spd(x).

notcontains(X,epd). A ground instance notcontains(x,epd) of notcontains(X,epd) evaluates to true if and only if x is a tree region not containing a subtree y where root(y) is in epd(x).

notcontains(X,spd). A ground instance notcontains(x,epd) of notcontains(X,epd) evaluates to true if and only if x is a source and y is a string not in spd(x).

Observe that additionally to predicates expressing negated conditions, the semantics of Elog is also well-defined for using negation in general (e.g. a contains predicate with a not in front of it).

Example

A wrapper designer wants to define an eBay record by saying it is a table which starts with a number of at least seven digits. She can express this by adding an internal condition, first expressing that a seven-digit number shall be contained, and then specifying that it should occur in the elementtext of the first child of each table. A rule is generated containing "contains(X,(".*.td",[(elementtext,[0-9]{7},false)]), Y), firstchild(X Y)".

Example

Internal Conditions are also useful in case of string filters. Assume the following rule fragment: "subtext(S, "\varV",X), city(V), contains(X, "Rio",Y)". This extracts all city names which contain the word "Rio". The extraction definition predicate uses a semantic description of the relevant text portions, whereas the internal condition predicate uses a syntactic description to refine the selection.

(4) Further Conditions

Concept predicates are unary relations. They refer to semantic concepts like "isCity", expressing that the string is a city name, or syntactic ones like "isDate". Some predicates are built-in, however more concepts can be added to the system. In our preferred embodiment syntactic predicates are created as regular expressions whereas semantic ones refer to a database. In other alternative embodiments syntactical predicates can be expressed using different language specification tools, like grammars, regular patterns and others, whereas clearly semantic predicates can be stored using different approaches such as flat files. Our system is open for adding binary concept predicates, too. Such predicates like date(X,Y) can bind an output variable—e.g. for an input date x, the system returns a standard presentation (normal form) y as date.

Pattern predicates of the body refer to previously created patterns. Each matched pattern instance is an element of one designated pattern; for example, price may be a pattern name and the matched targets are its instances. Each filter contains a reference to its parent pattern. One can refer to arbitrary patterns, not necessarily sibling patterns. As an example the price pattern can be constructed by using an element path definition ".*.td", and impose the constraint that immediately before a target of pattern item needs to occur, i.e. expressing the conjunction of atoms: "before(S,X,".*.td", 0,1, Y,_), item (_,Y) ". The use of the underscore is explained below.

Filters which define a specialization instead of aggregation, are required to use a pattern reference instead of an extraction definition atom and a parent pattern reference. For example, if one wants to extract tables which contain some text in green from the set of extracted tables, one is required to specify that each greentable is a table, too.

greentable(S,X)<-table(S,X), contains(X,(.*.td,[font-color,green]),_)

Range Conditions do not correspond to predicates in the usual sense, but permit to express conditions on the cardinality of the set of targets extracted with one filter based on their order of appearance in the parent-pattern instance. Such restriction intervals need not to be contiguous. Range conditions will be explained in detail in the section about Elog rules.

Example

To extract the content of the second column of a table, one pattern is defined which extracts all table rows. Its child pattern is defined to extract all table columns, and is limited with a range condition to extract only the second one.

(5) Conditions on Document Filters

Some embodiments allow to pose special conditions on document filters. Such conditions can be imposed on document filters only. These include predicates such as: smallerthan(X,value), samedomain(X,Y), and maxPages(value). smallerthan(X,value) requires that the size of a Web page as instance of X is smaller than some given value Y (in KB). samedomain(X,Y) evaluates to true if instances of X and Y (Y might be a constant) are URLs of the same domain. maxPages (value) is independent of the page itself—if the filter has been evaluated already for value times, then no further evaluation occurs. This predicate can equally be expressed as a kind of range condition—document filters may additionally contain a single number expressing the maximum number of evaluations for that filter.

Example

A wrapper for eBay shall follow the "next" link (as in the program displayed in FIG. 15). However, the wrapper designer is interested only in the first five pages. Thus she imposes the condition that the filter which serves for extraction of the next page is only used four times using the maxPages predicate.

Example

A wrapper for eBay shall extract additional information for each item. However, as some additional descriptions are very long, the wrapper designer decides that she only wants to extract information contained in URLs which refer to Web pages not longer than 10 KB using the smallerthan predicate.

(6) Extensions of Elog

Those skilled in the art can easily recognize that various extensions of Elog are obvious ramifications of our invention. Several extensions are immediately apparent such as all kind of well-known extensions that can be defined for classical Logic Programming, for instance the use of various forms of negation. Moreover, one could allow that even extracted instances refer to more than one parent instance (in the pattern instance base).

c) Elog Extraction Programs

In our preferred embodiment extraction programs are represented using "datalog like" programs, which are constructed using the predicates defined in the previous sections. In particular, filters are represented using Elog extraction rules (called Elog rules from now on). Conditions are implemented as body atoms.

Elog Rule. An Elog rule is either a standard rule or a document rule. Standard rules are of the form:

NewPattern(S,X) <- ParentPattern(_,S),
ExtrAtom(S,X), Condit(S,X,...) {[a,b], ..., [c,d]} where NewPattern and ParentPattern are pattern predicates referring to the pattern defined by the filter represented by this rule and its parent pattern. NewPattern is the name of the new pattern, ParentPattern is the name of the parent pattern, S is the source variable to be instantiated with a parent-pattern instance, X is the target variable to be instantiated with an extracted pattern instance, ExtrAtom(S,X) is a tree extraction atom or string extraction definition atom, and the optional Condit(S,X) is a set of further imposed conditions (internal, context, and auxiliary predicates). Each rule refers to exactly one parent pattern.

Standard rules are either string extraction rules or tree extraction rules. In the first case, a string extraction definition atom is used together with string conditions, whereas in the second case, a tree extraction definition atom is used together with tree conditions.

Optionally one can specify several intervals at the end of a standard rule, representing range conditions. Each interval is composed of two numeric constants a and b which represent the first and the last target of the list of targets taken among all matched targets of a filter. For example, adding the range [3,5] at the end of the filter means that of all pattern instances matched by the filter in one particular parent-pattern instance, only the third up the fifth should be taken. To make this notion yet more flexible, the constants a and b can also be negative numbers in which case the counting does not start from the first matched pattern instance upwards, but instead from the last matched pattern instance downwards. For example, if the range [3,-2] is imposed on a filter, then from all targets matched only those pattern instances ranging from the third to the second-last will be extracted via this filter (As always, this happens independently for each parent-pattern instance, i.e. the third up to the second-last target in each parent-pattern instance is considered). Similarly, a range [-3,-1] restricts a match to the three last pattern instances. In case of inconsistent intervals such as [8,6] or [10,-1] where less than ten pattern instances are matched by the other conditions, nothing will be extracted. Moreover, it is possible to apply several range condition to the same filter in order to specify that pattern instances from two or more different intervals should be extracted. For example, a filter containing the interval [2,4] and [6,-2] matches the second up to the fourth pattern instance, and the sixth up to the second-last instance. Overlapping intervals such as [3,5] and [4,8] are treated in the same way as the interval resulting from their union (in our example, [3,8]).

Document rules serve to define document filters and are of the form:

NewDocumentPattern(S,X) <- ParentPattern(_,S), getDocument(S,X).

In a document filter rule, the atom ParentPattern(_,S) can optionally be omitted and the variable S replaced with a constant URL. In particular, the constant "$1" can be used to identify the first argument of a call to the program evaluator, i.e. the input document URL on which the evaluator is first applied (for an example, see next section).

In Datalog notions, unification is the process of matching a goal with the head of a clause during the evaluation of a query. A variable unifies with a constant, and is as a result instantiated to the constant. Observe that we use (as in Prolog) a don't care variable "_". Just as in Prolog, the underscore "_" unifies with everything, but does not produce a variable assignment. Don't care variables are used when an argument should be matched but its value is irrelevant. For example, in the above rule expressing a document filter there is a don't care variable for the parent pattern of S (i.e., for the grand-parent of X), because that pattern is simply irrelevant. Using a don't care variable has the same effect as using a fresh variable that does not occur anywhere else in the rule. Note that as in Prolog the scope of any variable is restricted to the rule in which it occurs. Any variable occurring in a rule can be uniformly replaced by another variable that does not occur in the same rule without changing the semantics of the rule.

The semantics of extraction rules is very similar to the semantics of standard datalog rules. A ground substitution for S and X evaluates NewPattern(S,X) to true if this ground substitution for S and X evaluates all atoms in the body to true. Only those targets are extracted (added to the facts, i.e. the pattern instance base) for which the head of the rule evaluates to true. This process is repeated until a fixed-point has been reached.

Let us give an example of a standard rule. An extraction rule that extracts the price for every record in eBay pages can look as follows:

price(S,X) <- record(_,S),
subelem(S, (".*.td", [("elementtext",\varY,false)]), X ),
isCurrency(Y).

The extraction definition subelem( ... ) unifies the variable X with all tree regions whose root node is td, additionally requiring (due to path minimization in case of using a star) that the path from the root node of the parent-pattern instance to the pattern-instance's root node does not contain any further td node, and whose contents contains a currency symbol or identifier. The ontological predicate "isCurrency" is predefined and matches various currencies in various writing forms including "Dollar", "$", "GPB", "ATS" etc. However, not only the currency symbol is extracted here, but the entire node which contains the currency (which is in this case a price). It may happen that some instance of a different pattern contains a string identical to a currency identifier, too—in this case, further refinements are necessary such as using the fact that prices on eBay pages always occur in bold-face. The above rule refers to "record" as parent pattern. S is bound to an actual parent-pattern instance inside which the extracted instance occurs. By the above rule, the atom price(S,X) evaluates to true for all instances price(s,x) for which the body of the rule evaluates to true when X is replaced by x and S is replaced by s. In that case, this predicate instance is added to the pattern instance base (it contains information about the extracted instance, the parent pattern instance, and the name of the pattern). Other filters defining the pattern "price" might refer to a different parent pattern.

For each standard rule r, the set of extracted pattern instances according to r is minimized in the following sense: If two pattern instances a and b are generated by r, and a and b are sequences, where b is entirely contained in a, then a is disregarded and only b is taken as valid pattern instance according to rule r. Containment among sequences (i.e., general tree regions) is formally defined as follows:

Sequence Containment. Given an HTML tree H and two sequences $M=(m_0,m_2,m_2)$ and $N=(n_0,n_1,n_2)$, M is contained in N if and only if $m_0=n_0$, $|m_1|=|n_1|$ and $|m_2|=|n_2|$.

Observe that in case a rule contains conditions, Lixto does not minimize the matched instances of the subsequence predicate, but the matched pattern instances of the entire rule. Hence, in general, additional conditions change the output and may discard unwanted minimal targets which do not fulfill these additional conditions. Note, moreover, that a possible minimization or maximization of pattern instances recognized by a single filter (i.e., by a rule) always happens before range conditions are applied. In other words, range conditions are applied only after non-minimal pattern instances for a given rule have been sorted out.

Some further kind of minimization which applies to the resulting pattern instances of an entire pattern and not just of single filters will be described later on.

Additionally, note that built-in predicates of the Elog language have an input-output behavior that prevents them to be freely used in Elog rules. An extraction definition predicate for instance uses a parent-pattern variable as input, and a pattern variable as output which is used as input variable in condition predicates. An atom can be evaluated only after all its input variables are bound to effective values. The following list specifies for each argument position of each built-in predicate the type, input (i) or output (o) of variables that occur within these position. An underscore indicates that the type (input/output) is irrelevant.

subelem(i,o,o)
subsq(i,o,o,o,o)
subtext(i,o,o)
before(i,i,o,i,i,o,o)
after(i,i,o,i,i,o,o)
notbefore(i,i,o,i)
notafter(i,i,o,i)
contains(i,o,o)
firstsubtree(i,i)
lastsubtree(i,i)
isConcept(i), isConcept(i,o) (e.g. isCity(i), isDate(i,o))
isPattern(i,i) (e.g. price(i,i))
compare(i,i) (e.g. <(i,i))
parentpattern(_,o)

Note that the above classification into input and output arguments applies only to variables in the respective argument position. Constants as arguments are always allowed and will always be treated as input arguments. In particular, the element (string) path definition will in most cases be constant. It contains a variable only if there is a further reference to some concept atom (see the above example rule defining price). The instances of each variable that occurs in an element path definition are, in case the third argument is false, all substrings of the attribute value, in case the third argument is true, the exact attribute value.

Example price(S,X) <--  record(_,S),
                subelem(S, (".*.td", [("elementtext",\varY,false)]), X ),
                isCurrency(Y).

Again consider this example rule. First of all, the predicate record is evaluated and all instances s of the variable S are generated; the instances of S are used to evaluate the extraction definition predicate. subelem computes possible instances x and y of X and Y based on the given tree path. All possible substitution instances (s,x,y) are stored. Finally, after y is bound, isCurrency(Y) is evaluated.

An extraction pattern is represented by a set of Elog rules which define the same pattern predicate.

Elog Pattern. An Elog pattern p is a set of Elog rules $\{r_1,\ldots,r_m\}$ with the same head predicate symbol. An Elog pattern is called homogeneous, if all its filters refer to the same parent pattern. Otherwise, a pattern is called heterogeneous. It is forbidden to mix string and tree filters within one pattern (because pattern instances have to be of one kind, otherwise definition of child patterns is not clearly defined).

Patterns (and their filters) are restricted in their use of parent patterns in the following manner: In case of a tree pattern (all filters are tree extraction rules), all parent patterns of the filters contained in this pattern need to be tree patterns or document patterns. In case of a string pattern, all parent patterns of the filters contained in this pattern can either be string patterns or tree patterns. In case of a document pattern, all parent patterns of the filters contained in the document pattern have to be string patterns.

In case of a homogeneous pattern, i.e. all filters refer to the same parent pattern, the notion of "parent pattern" can be associated with a pattern rather than with its filters. In fact, in a more restrictive embodiment of the disclosed invention, where only homogeneous patterns are allowed, the parent pattern is always specified together with a pattern and not for its filters.

As for standard datalog rules, a pattern acts like a disjunction of rule bodies: to be extracted, i.e. to be an instance of this pattern, a target needs to be in the solution set of at least one rule. Adding rules usually matches more targets, while adding constraints in the rule bodies removes unwanted matches.

The extracted targets of a pattern can be minimized. In our preferred embodiment we chose to consider only those targets not contained in any other target of the same pattern instance. Minimization can be carried out even with recursive patterns. However, this type of minimization is restricted to instances of the same parent-pattern instance. Hence, in example [1521,1522] of FIG. 15, where a nested tables are to be extracted, minimization does not cut off the interior tables, because every table has a different table as parent pattern.

As those skilled in the art can easily recognize, instead of minimization various other alternative ways of simplifying or restricting the legal output pattern instances can be used. It is conceivable that in certain contexts some other methods may be more appropriate than the described minimization. Lixto is open for incorporating such other methods in alternative embodiments.

Note that the reason why a recursive approach was taken in the second example of FIG. 15 is precisely the use of tree path minimization. In fact, starting from the document root, the tree path ".*.table", due to minimization, matches only those tables which occur at the outermost level of any hierarchy of nested tables. To get all tables one can either disallow tree path minimization (which is an option in the GUI; then instead of the star another sign is used for this general descendant navigation), or much better, use recursion to distinguish the various hierarchy levels. In the first solution, all extracted tables at any nesting level are direct children of the entire document, while, if recursion is used the nesting hierarchy of tables is faithfully reflected by the tree of extracted table pattern instances.

Minimization of a pattern, i.e. global minimization across all of its associated filters, optionally occurs as an additional step after possibly having minimized each filter output separately as discussed above. Since different filters may extract objects of different types (e.g., a tree region whose root is a content node, and a tree region whose root is a td node), the best way of comparing such offsets is to use their start and end offsets. In our current embodiment, whenever an object is (offset-wise) covered by another object the larger one is eliminated. In case, two or more objects of different types have exactly the same offset then tie-braking is done by taking the object corresponding to the lowest node in the document tree. Just as filter and tree path minimization, pattern minimization is a default behavior of Lixto which can be explicitly disabled by a wrapper designer or changed to maximization. Note that alternative embodiments can use other strategies for restricting or simplifying the set of instances matching a pattern.

Note that pattern minimization (i.e., minimization across filters as described) could be expressed as follows in Elog extended with stratified negation and a suitable built-in predicate contained_in expressing offset-wise containment as described:

$$p'(S,X) \leftarrow filterbody_1$$
$$p'(S,X) \leftarrow ...$$
$$p'(S,X) \leftarrow filterbody_n$$
$$p(S,X) \leftarrow p'(S,X), \text{not } p''(S,X)$$
$$p''(S,X) \leftarrow p'(S,X), p'(S,X_1), contained\_in(X_1,X)$$

The last rule requires that instances of X and $X_1$ are both from the same parent pattern instance. p' is the pattern predicate initially being built by different filters. Each instance p(s,x) which is non-minimal, i.e. for which there exists a smaller valid p''(s,x), is not derived, and thus only minimal instances are derived. Recall that mixing of string- and tree rules within a pattern is forbidden. Overlapping output pattern instances are possible.

Extraction Program. An Elog extraction program P is a collection of Elog patterns. An Elog program is called homogeneous if all its patterns are homogeneous. Otherwise, an Elog program is called heterogeneous.

Pattern Graph. The pattern graph $G_P$ of an Elog program P is defined as follows. The vertices of $G_P$ are the pattern names of all patterns of P. There is an arc from a vertex a to a vertex b if and only if there exists a filter in the pattern b that refers to pattern a as parent pattern. The underlying undirected graph of a pattern graph $G_P$ is acylic if and only if the program p is homogeneous.

FIG. 15 illustrates the pattern graph of three example programs. There, each document pattern [1501,1521,1513] is depicted as hexagon, each tree pattern [1502,1503,1504, 1505,1506,1507,1508,1509,1511,1512,1514,1515,1516, 1517,1518,1519,1520,1522] as rounded box and each string pattern [1510] as trapezium. Each arc represents the child relation between patterns. A pattern is a child pattern of another pattern if at least one of its filters refers to this pattern as parent pattern (indicated by an arc pointing from the pattern to the parent pattern). Since each filter of a pattern may refer to different parent patterns, there is no parent function, but a relation only. Therefore, none of these example pattern graphs is a tree. In case of a homogeneous program, the parent relation is a parent function and the pattern graph a is pattern tree.

Pattern Instance Base. We denote by P(H) the tree or forest of pattern instances (called pattern instance base) created by evaluating all patterns of P in their hierarchical order (in one or more evaluation round) against an HTML document H. The vertices of P(H) are all pattern instances extracted from P with start document H. There is an arc from vertex a to vertex b in P(H) if and only if b is the parent-pattern instance of a.

The word "pattern instance" is, depending on the context, either used for denoting an extracted tree region or source, or denoting the whole extracted predicate instance with the reference from which parent pattern it evolved.

Each pattern instance is associated with a pattern name. Moreover, if the pattern instance base is presented as a list of pattern instances instead of a tree, each pattern instance needs to be associated with its parent-pattern instance and the name of the parent pattern. Each root element of a tree is the instance of a document pattern. Although represented as tree of its own, this root node contains a reference to the pattern and actual pattern instance from where it evolves. The same tree region (or string source) can be in the pattern instance base more than once if it evolved from a different parent-pattern instance (or even a different parent pattern) or is an instance of a different pattern. These additional parameters are required for establishing the hierarchical structure in the pattern instance base and for the final XML output.

Web pages are also stored in the pattern instance base as tree regions. Alternatively, tree regions and string sources can be stored using pointers.

For example, for the pattern graph depicted in the upper part of FIG. 31, the pattern instance base P(H) (which is not explicitly depicted) can be constructed following the logical evaluation flow of the program as depicted in the lower part of FIG. 31.

Let us, more specifically, see how an Elog wrapper for the first example in FIG. 15 looks like. This wrapper extracts the list of items of an eBay page listing available notebooks. This Elog program essentially defines the structure of a page from the eBay web site listing the available items. The items are embedded in the document as a sequence of HTML tables embedded into another table. See the top graph of FIG. 15 for a visualisation of this particular pattern structure. Observe that the first table does not represent an item and is not considered. Note also that the list of the available items continues into other pages linked in the first page. The second rule for the ebaydocument pattern takes care of this structure by navigating this link chain.

```
tableseq(S,X)     <-  ebaydocument(_,S),
                      subsq(S,(.body,[ ]),(".table",[ ]),(".table",[ ]),X),
                      before(S,X,(".table",
                          [("elementtext","item",false)]),0,0,_,_),
                      after(S,X,(".hr",[ ]),0,0,_,_).
record(S,X)       <-  tableseq(_, S), subelem(S,.table, X).
itemnum(S,X)      <-  record(_,S), subelem(S, ".*.td", X),
                      notbefore(S,X,(".td",[ ]),100).
```

-continued

| | | |
|---|---|---|
| itemdes(S,X) | <- | record(_,S),<br>subelem(S, (".*.td.*.content", [("a","",false)]),X). |
| price(S,X) | <- | record(_,S),<br>subelem(S, (".*.td",<br>[("elementtext",\varY,false)]), X ),<br>isCurrency(Y). |
| bids(S,X) | <- | record(_,S), subelem(S, ".*.td", X),<br>before(S,X,(".td",[ ]), 0,30, Y,_), price(_,Y). |
| amount(S,X) | <- | price(_,S), subtext(S, "[0-9]+\.[0-9]+", X). |
| next(S,X) | <- | ebaydocument (_,S),<br>subelem(S,(".*.p.*.content",<br>[("A","",false),("elementtext","Next",false)], X). |
| nexturl(S,U) | <- | next(_,S),subatt(S,"href",U). |
| ebaydocument($1,X) | <- | getDocument($1,X). |
| ebaydocument(U,X) | <- | nexturl(_,U), getDocument(U,X). |

The pattern ebaydocument is a document pattern consisting of two filters with different parents. The first one refers to the starting document, which is in this case, fixed, whereas the second on follows the "next" button link on each page.

Recall that "$1" is interpreted as a constant whose value is the URL of the start document of a Lixto session. Predicates of the initial filter use the variable $1 or a constant URL as source argument. The variable U is instantiated with string sources which represent an URL.

When an Elog program is evaluated it associates to each pattern a set of ground atoms for each pattern predicate defined in the program. A filter associates two pattern instances: the parent pattern instance and the extracted pattern instances. Thus pattern atoms permit to know from where a certain pattern instance has been extracted. This tree (forest) of pattern instances can then be translated into an XML tree. Mappings to XML are discussed below in an own section. The pattern instance base can be used as a storage of already extracted pattern instances during wrapper generation and wrapper execution. Each pattern instance is stored together with the information to which pattern it belongs and from which parent pattern it was derived.

Consider again FIG. 15. There, each vertex is a pattern, and two patterns are connected with a directed arc if there exists at least one filter which belongs to the second pattern and refers to the first pattern as parent pattern. Therefore, if one allows a graph where each vertex can have multiple outgoing and incoming arcs, a filter can be treated as an arc and each filter can be displayed in the graph.

Evaluating Programs

In this section we describe how Elog programs are evaluated over HTML pages. The evaluation principles for Elog programs differ only slightly from the well-known algorithm(s) used to evaluate standard datalog programs or pure Prolog programs. Many techniques for the evaluation of datalog programs are discussed in S. Ceri, G. Gottlob and L. Tanca, "Logic Programming and Databases", Surveys in Computer Science, SpringerVerlag, ISBN 3540517286. Elog evaluation differs from Datalog evaluation in exactly three aspects:

Elog has a number of built-in predicates which we already described (e.g., before, subelem, etc.). These atoms are evaluated according to their described meaning. Note, however, that these atoms are not evaluated over an extensional database of facts representing a Web page, but directly over the parse-tree of the Web page (in our preferred embodiment, a Java Swing DOM tree). Each built-in atom is evaluated by a specific procedure (in our implementation, a Java method). In this section we will only describe those evaluation procedures for built-in predicates which are not immediately obvious to those skilled in the art from the description already given.

Elog can apply various kinds of minimization which have already been described in detail:

Minimization of the set of elements matching a tree path.

Minimization of patterns instances identified by a filter.

Minimization of pattern instances identified by a pattern.

Elog uses range conditions with filters (and, in some alternative embodiments, with patterns, too)

In the following description we mainly focus on those aspects were Elog differs from the well-known classical language datalog. We describe the semantics of an Elog program, and how rules are evaluated. Recall that each atom for a built-in predicate occurring in a rule body of a correct Elog program must conform to the binding patterns stated earlier in this text. An Elog program evaluator receives as input an Elog program and an HTML document, and computes all the pattern instances derivable by using the Elog rules in the program.

Observe that alternatively Elog can simply be translated to Datalog, and the standard datalog semantics can be applied as illustrated in R. Baumgartner, S. Flesca and G. Gottlob, "The Elog web extraction language", Proceedings of LPAR 2001. In case of combining arbitrary pattern references and ranges, a non-monotonic semantics results.

The system uses well-known evaluation methods for datalog: For example, a top-down evaluation is used, in case of heterogeneous programs with viewing the pattern graph as (possibly infinite) tree where copies of the patterns are attached (rules where the parent pattern atom is not yet true cannot add new facts, hence this evaluation can be considered as tree, as e.g. in FIG. 31). In general, each program is evaluated in "rounds". During each round, unifications with current facts are computed and new facts are added which are additionally used for the next round's evaluation. This step is carried out until no new facts are added, i.e. a fixed-point has been reached, and no new extraction instances are generated. Of course, this algorithm can be improved in several ways, especially if a program does not contain arbitrary pattern references. We illustrate the use of this algorithm with one sample program in FIG. 31. In the first evaluation round a single filter can add facts—the initial document filter. All other filters cannot contribute, because the parent-pattern predicate does not evaluate to true in any case (the pattern instance base is empty). The extracted document is added to the pattern instance base. In the next evaluation round, those filters can have a true head predicate, which use refer to the home document pattern as parent pattern. The process which filter can contribute at which evaluation round continues in this fashion. Therefore, one evaluation round complies with evaluating one level of the evaluation tree (see e.g., lower part of FIG. 31).

A new fact is a new pattern instance which is not yet present in the pattern instance base. If a pattern instance extracts the same tree region as another pattern instance, it is still a new one if it belongs to a different pattern, or is extracted from a different parent-pattern instance. For example, record(s,x) and record(t,x) which denote the same tree region refer to different parent-pattern instances (which can even evolve from different parent patterns). This tree region hence occurs twice in the pattern instance base (at different nodes), and is, by default, mapped to XML twice (Note that the pattern instance base is not required to store the pattern instances as tree if each IDB predicate is considered to have as third parameter the name of the actual parent pattern).

Even examples where the home document pattern of a program has more outgoing arcs, too, pose no problem—computation always starts with the initial filter. The pattern can be visited again in this top-down evaluation.

The sample program in FIG. 31 consists of four patterns [3101, 3102, 3103, 3104], three of which [3102, 3103 ,3104] are interconnected as triangle. Although this particular program is unlikely to be a desired extraction program, it serves very well the purpose of illustration. Each filter is displayed as a directed labeled arc, which explains to which pattern the filter belongs and to which parent pattern it refers. The second diagram of FIG. 31 explains one possible standard way to evaluate such programs, simply using top-down evaluation. First, all instances of the table pattern are created which occur as instances within the document instance [3105, 3106]. Then, all instances of the tr [3107] and td [3110] pattern are evaluated which refer to the currently extracted table pattern (i.e. these two filters are evaluated which refer to table as parent pattern). Then all instances of table [3108] and td [3109] referring to currently extracted tr instances are created in one path of the tree, and at the same time all instances of table [3111] and tr [3112] referring to the extracted td instances. These steps are carried out again and again—and at each step only pattern instances are extracted which occur inside the parent pattern instances extracted in the previous step—it is not necessary to do this for earlier extracted parent pattern instances of one kind, since this was done in a previous step anyway. Although the computation tree is infinite, a fixed-point is reached in finite time, i.e. no more instances are added any longer. Computation in one branch stops if no new instances are extracted. Computation ends if computation stopped in all branches. In homogeneous programs, the number of necessary evaluation rounds is always identical to the depth of the pattern tree of the program.

In general, a fixed-point is always reached because every Web page is finite and has a finite tree representation. Moreover, the universe of Web pages is finite in some respects. Consider the example where a program refers from one document to another, and vice versa. Although this is a loop, at some stage no new pattern instances of these documents will be extracted.

Newly extracted document instances create a new tree within the pattern instance base, and store a reference from which pattern instance they evolved. Observe that the set of extracted instances is due to this evaluation a forest of trees, where each tree is rooted at a different document. These trees can be translated to XML as described below.

The evaluation of a rule corresponding to a document filter is a trivial task, since it requires only to download the corresponding document from the internet and construct the document tree. In our preferred embodiment these tasks are performed using the Java Swing Parser that returns a representation of an HTML document as a document tree (and hence is responsible for cleaning up badly marked up HTML).

Figure 11:
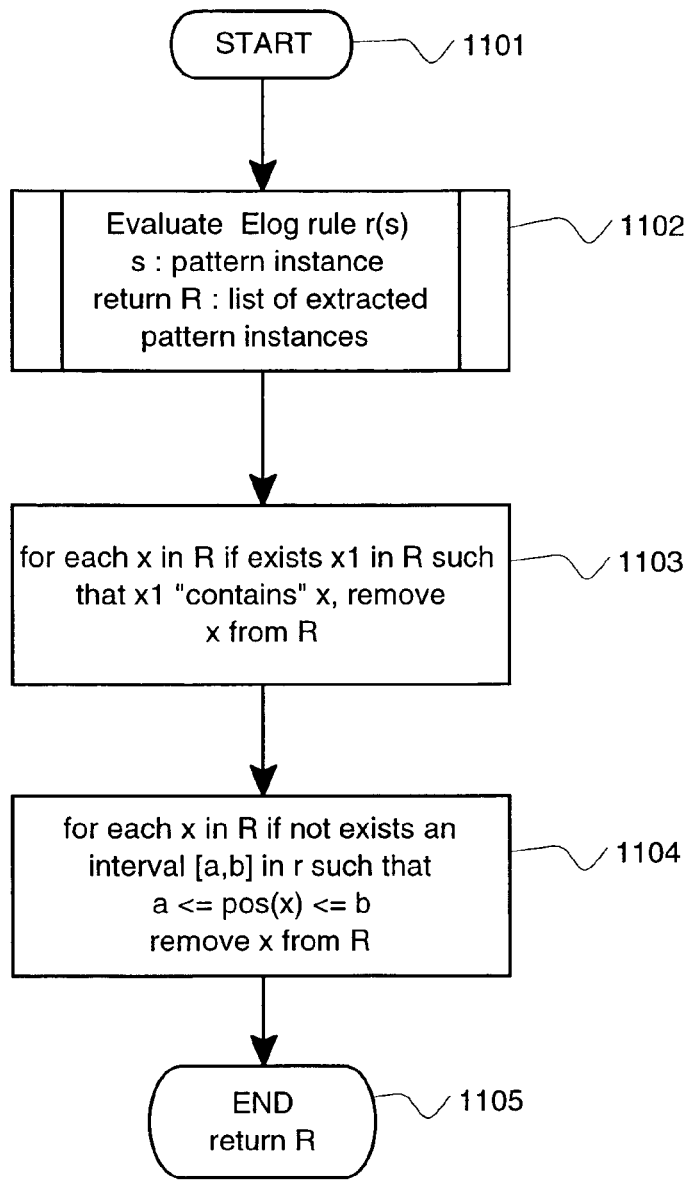

The rule evaluation process for standard rules is described in FIG. 11. After the evaluator starts [1101] evaluating the rule, it has to find all the substitutions for the variables appearing in the rule that make the atoms in the body true [1102]. The conformity of built-in atoms to the prescribed binding conventions assures that it is possible to evaluate built-in predicates. The result of this step [1102] is a list of the pattern instances associated to the pattern instance variable (usually denoted as X), ordered according to their positions in the original document. The next step [1103] removes the non-minimal pattern instances from this list (using tree region containment; only relevant in case of general tree regions). In our preferred embodiment, no minimization is needed for string rules since regular expressions are evaluated from the left to the right; however, targets are never overlapping in this way. In other embodiments with some different evaluation of regular expressions, minimization might be useful. In a final step the evaluator removes the instances whose position does not appear in any of the specified intervals [1104], and returns [1105] the resulting list of pattern instances.

When evaluating a pattern, the union of all extracted instances of all its rules is considered and all non-minimal targets, i.e. all pattern instances which derive from the same parent instance as an instance which is entirely contained inside this instance are dropped. This minimization step is performed by default, but can be optionally omitted if the designer wishes so.

d) Evaluating Tree Extraction Predicates and Tree Conditions

The evaluation of the tree extraction predicates is mainly concerned with the computation of the list of elements matched by an element path definition. Essentially, this computation can be split into two parts: finding the elements reachable from a given start element (the root of the parent pattern tree-region) following a certain tree path, and the validation of these elements w.r.t. the specified attribute conditions.

Finding elements: The following functions compute the list of elements matched by an incompletely specified tree path. They use the function children(x) that returns the list of the children of the element x ordered with respect of their position in the document tree and the function findDescendants(e, t) defined below that returns the list of the descendants of an element x of name t, again ordered with respect to their position in the document tree. The square brackets [ ] identify lists and a notation like [x|C] identifies a list having head x and tail C, whereas the function concat returns the concatenation of two lists. Essentially, the function matchelements(e,p) seeks for the paths in the document tree rooted in the element e that fulfill the element path definition. It starts by finding the elements reachable from e whose type is the same as the type contained in the first part of the tree path p. This process is iterated with the remaining part of the path p.

function matchelements(e,p): List of matched elements

---

INPUT
    An element e (i.e., a node of a document parse-tree)
    An incompletely specified tree path p
OUTPUT
    List of matched elements
BEGIN
    E := [e];
    while (p < > [ ]) do begin -continued

```
        T := [ ];
        if p is [.*.n |p1] then
            while E < > [ ] do begin
                Let E be [x|E1];
                T1 := findDescendants(x, n);
            end
        else begin /* p = [.n| p1] */
            while E < > [ ] do begin
                S := children(x); /* S is the list of children of x */
                T1 := [ ];
                while S < > [ ] do begin
                    Let S be [x|S1];
                    if x has name n then
                        T1 := concat(T1, [x]);
                    S := S1;
                end
            end
            T := concat(T, T1);
            E := E1;
        end
        E = T;
        p := p1
    end
    return E;
END
``` function findDescendants(e, n): List of matched elements

```
INPUT
    An element e
    An element name n
OUTPUT
    List of matched elements
BEGIN
    E = [e];
    T := [ ];
    while E < > [ ] do begin
        Let E be [x|C];
        S := children(x);
        while S < > [ ] do begin
            Let S be [x|C];
            if x has name n then
                T := concat(T, [x])
            else
                E := concat(E, [x]);
            S := C;
        end
    end
    return T;
END
```

The computation of the list of elements matched by an element path definition epd=(p,A) from a starting element e is performed by first calling the function matchelements(e, p) and then removing from its result the elements that do not satisfy at least one condition in A. In the following we denote the function that computes the list of matched elements, i.e. matches the elements and deletes all elements which do not satisfy the additional attribute requirements with match(e, epd) where e is an element (where the actual evaluation of the tree path starts) and epd is an element path definition.

Figure 12:
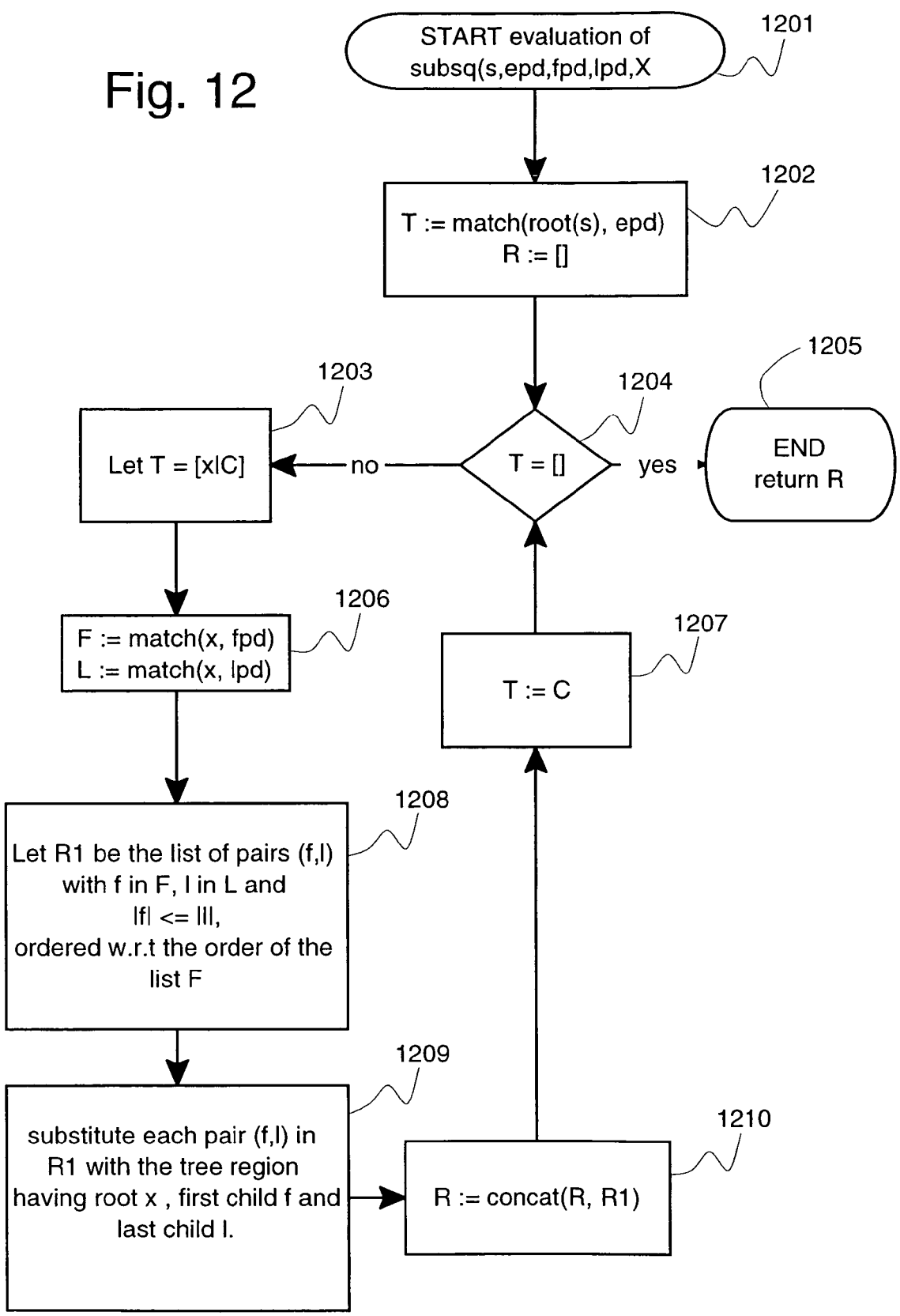

In case S is a simple tree region, the evaluation of an atom subelem(s,epd,X) trivially requires to call the function match (root(s),epd) and takes its result. In case, S is a sequence, a number of calls to this function are required. The evaluation of the possible substitutions for an atom subsq(s,epd,ftd,ltd, X) is not trivial and is described in FIG. 12.

This computation is performed in the following way. First [1201], the list of elements matched by the element path definition epd is computed [1202], then if it is not empty [1204] for each element x in this list [1203, 1207], two lists of its children are computed, the first containing the children matching ftd and the second the one matching ltd [1206]. The elements in the first list are coupled with the elements in the second list [1209] (Pairs such that the second element precedes the first are not considered), and for each such pair a new (general) tree region object is created [1209] and added to the result [1210, 1205]. Recall that minimization is carried out only for the complete filter with all its conditions and not for the subsequence predicate alone.

The evaluation of a contains(s,epd,X) atom derives in a straightforward way from the match function, whereas the firstsubtree(x,Y) atom corresponds to a call of the children function (only the first element of the resulting list is considered).

Figure 13:
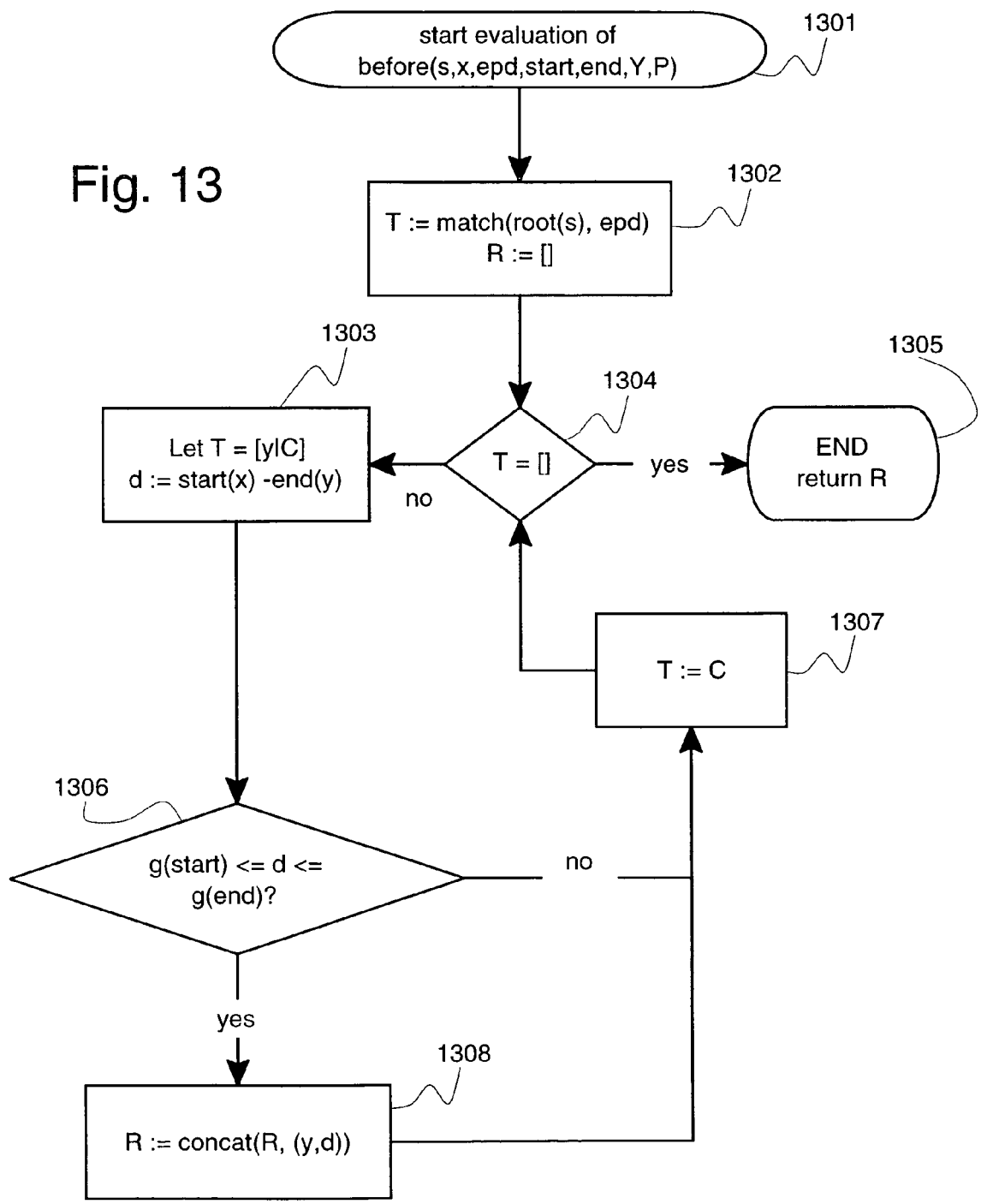

As for the extraction predicates, the evaluation of before and after predicates uses the function match. A flow diagram for the evaluation of the before predicate is given in FIG. 13. The evaluation of the after predicate is almost equal and is not reported here.

The evaluator starts [1301] by computing all the elements in the parent pattern instance s matching the element type definition epd [1302]. Each of those elements is processed in an iteration of the loop [1304, 1303, 1306, 1308, 1307], where it is verified that it is in the desired position interval [1303, 1306], and if this is the case it is inserted into the result list [1308]. In our preferred embodiment the distance parameters are percentages and the function g transforms them to absolute values depending on the current parent pattern instance and pattern instance start offsets.

The evaluation of the built in predicate notbefore is performed using the predicate before. An atom notbefore(s,x, epd,d) is evaluated by evaluating the atom before(s,x,epd,0, d,Y,D) and testing if there exists a valid substitution for Y and D. Recall that in our preferred embodiment d is given as percentage value, whereas a substitution of D uses an absolute value. The evaluation of a before predicate where distances are irrelevant is performed by using before(s,x,epd,0, 100,Y,D).

e) Evaluating String Extraction Predicates and String Conditions

The evaluation of the string extraction predicates requires the computation of substrings of a certain string. Essentially, this computation can be split into two parts: converting the input pattern instance into a string pattern instance (if necessary, i.e. if it is a tree pattern instance), and computing all the substrings of this string pattern instance that belong to the language defined by the string path definition. The following function returns the list of string pattern instances contained in a parent pattern instance that matches the string path definition.

function matchsubtext(s, spd): List of matched substring pattern instances

```
INPUT
    A pattern instance s
    A string path definition spd
OUTPUT
    List of matched elements
BEGIN
    R := [ ];
    if s is a tree region then
        s := text(s);
```

-continued

```
for x := start(s) to end(s) do
    for y := x to end(s) do
        if substrg(s,x,y) in L(spd) then
            R := concat(R, stringpattern(s,x,y));
return R;
```

The test "substrg(s,x,y) in L(spd)" checks whether a string is in the language defined by a regular expression (see e.g., J. E. Hopcroft and J. Ullman: Introduction to Automata Theory, Languages, and Computation, Addison-Wesley, ISBN: 0201441241) or to verify that such a string is in the relation defined by a concept predicate (or a mixture of both). Thus the set of the valid (ground) substitutions for an atom subtext(s, spd,X) is trivially computed by calling the function matchsubtext(s, spd). In our preferred embodiment, only those matches are considered which are not already part of another one, using left-to-right evaluation.

The computation of the above function can be speeded up with the same methods as used for finite state automata (see again the book of Hopcroft and Ullman).

Figure 14:
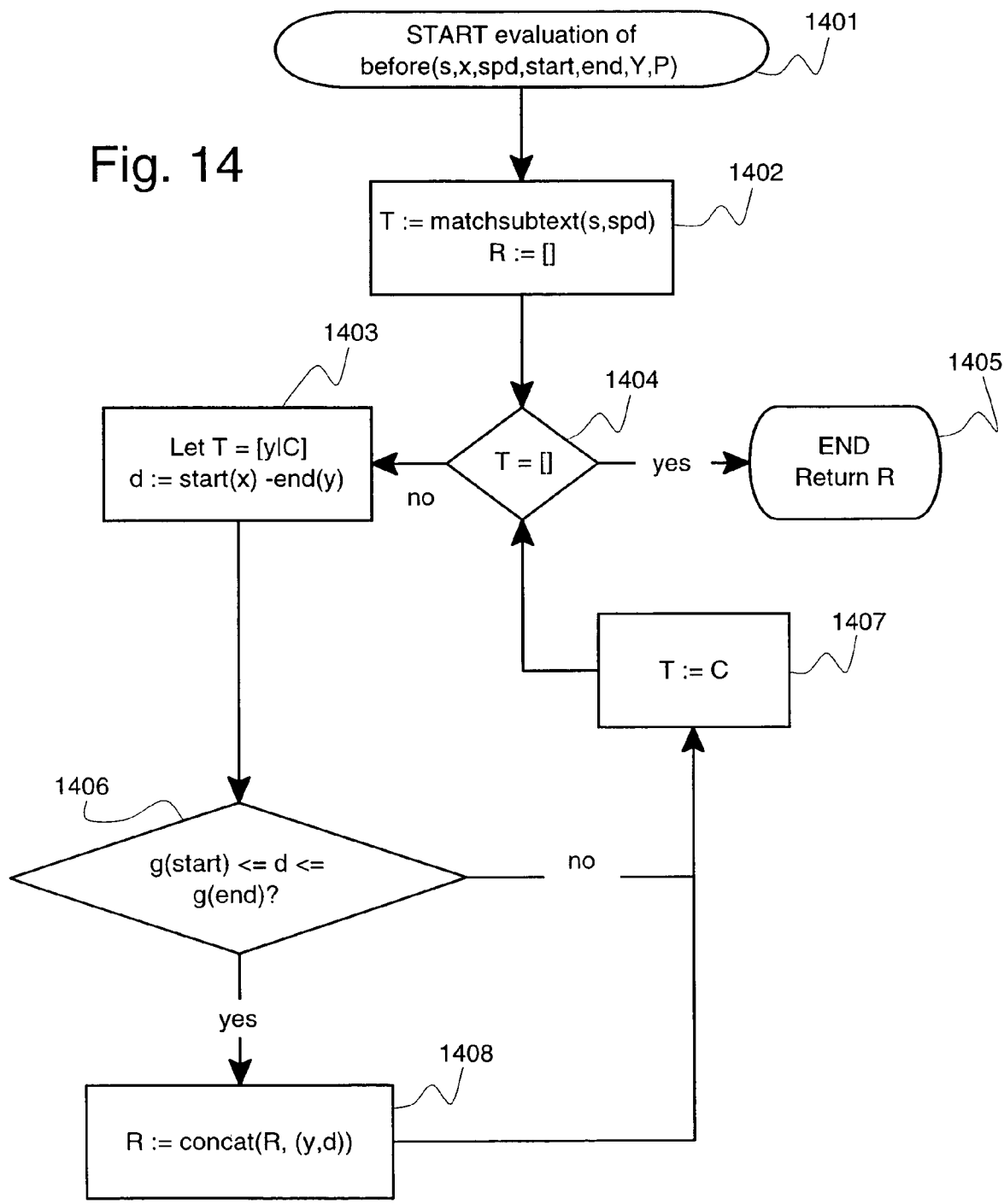

As for the predicate subtext, the evaluation of before and after predicates for string sources uses the function matchsubtext. A flow diagram for the evaluation of the before predicate is reported in FIG. 14. The evaluation of the after predicate is completely analogous, as will be understood by those skilled in the art, and is not reported here.

The evaluator starts [1401] by computing all the substrings contained in the parent pattern instance s matching the string path definition spd [1402]. Each of these substrings is processed in an iteration of the loop [1404, 1403, 1406, 1408, 1407], where it is verified that it is in the desired distance interval [1403, 1406], and if this is the case, the string source (i.e. the string together with its position) is inserted into the result list [1408].

As for elements, the atoms notbefore(s,x,spd,d) and notafter(s,x,spd,d) are evaluated using the corresponding atoms before(s,x,spd,0,d,Y,D) and after(s,x,spd,0,d,Y,D). The evaluation of a contains(s,spd,X) atom derives straightforwardly from the matchsubtext function. In our preferred embodiment we consider "minimal" regular expressions only, i.e. regular expressions not contained in each other, starting evaluation from the left to the right with a "greedy" operator interpretation (like Perl treats regular expressions).

The evaluation of concept predicate straightforwardly follows from this definition. Indeed syntactic concept predicate can be evaluated by simply testing the membership of a string to the language defined by a regular expressions, whereas semantic predicates are directly represented as sets of ground atoms.

f) Translation into XML

The XML translator offers the possibility to map extracted instances of the pattern instance base into XML elements. A simple correspondence holds: Pattern name=Elog IDB predicate name=XML tag (An IDB predicate is an intensional predicate, i.e. a predicate of the pattern instance base).

An XML translation scheme is a function map defining special settings w.r.t. the XML mapping for a pair (pattern, parent-pattern). The function returns a six-tuple for each such pair. The function values can be changed by the wrapper designer as described later. Moreover, the default settings can be changed by the wrapper designer. The arguments of the function are:

1. A pattern name. This argument contains the name of the pattern whose translation parameters (called settings) are given by the values of the function map.
2. A parent pattern name. This argument restricts the parameter settings to those pattern instances which are derived from the given parent pattern.

The domain (pattern, parent-pattern) ranges over all values which are possible according to the pattern instance base. The output of the function is a six-tuple containing the following tuple elements:

1. A substitute pattern name. This tuple element can be empty (default) or contain a substitute pattern name to be used in the XML output. This name does not need to be unique, i.e. it can occur as substitute pattern name in other tuples, too. If this tuple element is empty, then the name of the pattern to which the filter belongs is used in the XML translation.
2. A set of attribute designators. This argument contains a set of attribute designators. The set can be empty (default). All specified attribute designators specified in this set which additionally occur in the actual pattern instance are, together with their respective values, written as XML attributes in the output XML file. The set is always empty in case of a string pattern (one exception is a special reference stored in string pattern instances if they are parents of a document pattern instance).
3. A Boolean variable expressing whether the element content is written. If this parameter is true, then the content of all pattern instances is written. If this parameter is false, then the content of a pattern instance is written in the XML output only if this pattern instance is a leaf in the pattern instance tree. By default, this parameter is false.
4. A Boolean variable expressing whether the pattern instances extracted by this (pattern, parent-pattern) pair are written. If this parameter is true, then all pattern instances extracted by this pattern having this parent pattern are written. Otherwise, these pattern instances are not mapped to XML—nevertheless, this choice does not have any impact on child patterns.
5. A Boolean variable expressing whether the descendant pattern instances of pattern instances extracted by this (pattern parent-pattern) pair are written.
6. A Boolean variable expressing how the instances of document patterns are stored. Recall that a pattern instance base is stored as a forest. Each tree has as root node the pattern instance of a document pattern (with a reference to the "parent"-pattern instance of another tree). If the argument is true, then each instance of a document pattern creates a new XML document tree (together with a link in the document of its parent pattern instance). If it is false, then each instance is simply written as a child pattern instance within the single XML document tree. The value of this variable is irrelevant for standard rules. The default value is true. In case of true, in our preferred embodiment (see the figure below), each document pattern is, regardless of its name, renamed to "document", overruling the value of the second argument.

Example

A program shall generate an XML document containing all current eBay entries on notebooks. The links of the next button on each page are extracted. In this case, each new page shall be at the same hierarchy level as the previous one, i.e. the sixth argument is set to true. However, if a program shall extract additional information of each eBay item which is available when following a link in each item description, it is desired to attach this information to the corresponding item. Hence, in this case the sixth argument is set to false.

In our preferred embodiment, only one XML companion document is created based on several XML document trees. Several XML document trees are combined into one document by introducing a document root node <document>, and renaming the previous document root nodes. The wrapper designer is given the choice to drop these previous root nodes. The XML file header information is stored at the top of the XML document.

Optionally, the just specified arguments could be set individually for the output of each filter instead of the instances of a pair (pattern, parent-pattern) which may contain the output of several filters referring to the same parent pattern. However, then each instance in the pattern instance base has to be augmented with the information from which filter it has been derived, and, moreover, no minimization across filters referring to the same parent pattern can be used.

Below, we present the algorithm for translating a pattern instance base into a number of XML trees. This figure covers only the case where a number of XML document trees is created, and does not use the function values of document patterns. These are, however, easily added to the algorithm: First of all, for each string pattern with a child document pattern, an attribute value for an attribute "reference" is created, and the same value is stored together with the respective document pattern. After all XML document trees have been created, the function values given for the document patterns (i.e. the sixth arguments) are used (which can be stored as XML comment at the beginning of each XML tree) together with the reference information (which can be stored as special attribute) to combine the documents in the desired fashion.

function patternInstanceBase2XML(X,B): XML document

```
INPUT
    An XML translation scheme X
    A pattern instance base B (forest of pattern instances)
OUTPUT
    A set of XML document trees (i.e. a set of XML document fragments)
BEGIN
    while (B < > 0) do begin
        B1 := nexttree(B)
        r := root(B1);                          //exactly the root nodes are
                                                //instances of document patterns
        doc := doc + "<document>"               //adds a "root" node to the XML
                                                //document tree
        while (B1 < > 0) do begin
            if exists child(r) do begin         //adding new element always occurs
                                                //in depthfirst way
                                                //end tags are written depending how
                                                //indent changes
                a := firstchild(r);
                args := map(pattern(a),pattern(r));
                if args(4) = true do begin
                    if args(1) < > "" element := XMLElement(args(1))
                        else element := XMLElement(pattern(a));
                    addAttributes(element,args(2));    //writes attributes of root
                                                       //of tree region depending
                                                       //on args(2)
                    writeContent(element,args(3));     //writes content if args(3)
                                                       //is true
                    doc := doc + element;              //new element is added in the
                                                       //next line
                    indent := indent + 1;              //indent to express nesting
                end
                if args(5) := true removeAllDescendants(r);
                r := a;
            end
            else do begin
                r := parent(r);
                removeChild(r);
                indent := indent-1;
                addEndTags( );
            end
            doc := doc + "</document>";
        end
        docs := concat(docs,doc);
    end
    return docs;
END.
```

The algorithm uses a number of predefined functions. To those skilled in art, the aim of these functions is obvious due to their intuitive names. The function nexttree, provided with a set of trees, returns the next tree (based on some order). The function root returns the root node of a document. The function firstchild returns the first child of a tree node. The function addEndTag adds all necessary end tags depending on the value of indent. The function writeContent adds the element-text of an HTML element to the XML element. The function removeChild removes, in case of a single child, this child from a node. XMLElement creates a new node in an XML document using the specified element name. removeAllDescendants removes all descendants of a given node. XMLheader is a constant containing standard XML header information.

In case a document pattern instance is stored within the XML document containing its parent instance, it is nevertheless possible to decide to not write the document pattern instance itself, but only its child pattern instances (i.e., set the fifth argument to false).

If no special XML translation scheme is provided, then a default XML translation is carried out. To each Elog program one or more XML translation schemes can be defined.

In case of homogeneous programs, the value of the parent pattern is irrelevant, because it is unique. In our preferred embodiment, the wrapper designer chooses even for heterogeneous programs how to map a pattern independent of the parent pattern, however, with the additional option to treat patterns in a different way based on their actual parent patterns. In many cases, it is sufficient to define a mapping for the whole pattern, i.e. for all its instances, independent of their actual parent-pattern instance.

Example

Consider the eBay example programs whose pattern graph is presented in FIG. 15. The default XML translation of an eBay program creates several documents obeying the following XML structure:

```
<document>
    <tableseq>
        <table>
            <record>
                <itemnum>
                <itemdes>
                <price>
                    <pricewc>
                <bids>
            <next>
                <nexturl>
```

The element content of each leaf node is written (e.g. in case no currency was extracted, then the text of price is written, otherwise pricewc). In this case, the following XML scheme can be useful: The pattern instances of tableseq and table are not mapped to XML (auxiliary pattern during construction)—the fifth argument is false in this case. The text of instances of price is always written. Moreover, the instances of next and nexturl are never written. In nexturl, a link is stored pointing to the next extracted page. However, usually the order of pages is not interesting for the designer in this case. Hence, in this example scenario these patterns are dropped. Moreover, the set of documents can be combined into one XML companion, hence all records are mapped into a single XML output file (using a new document root node and removing the children of it, namely the old ones). A single XML companion is created obeying the following structure:

```
<document>
    <record>
        <itemnum>
        <itemdes>
        <price>
            <pricewc>
        <bids>
```

In case the wrapper designer is interested in more detailed information for each item, she could add patterns to itemdes following the given link for each item. In this case, she would rather select to store the extracted document instances (or better, the instances of descendent patterns containing relevant information) for each item within the same document as child of the respective item description. Hence, the seventh argument is set to false.

As mentioned in the ramifications, it is possible to impose constraints (Consistency Check Alerts). In our preferred embodiment, one can specify an allowed number of children for a pattern instance, and how often a pattern instance is allowed to occur within a parent-pattern instance (both using a min/max value). In alernative embodiments, a DTD or an XML Schema can be created.

E. User View

Before describing the extraction pattern builder module and the pattern generation algorithms in detail, we briefly describe on base of an example how the pattern construction process is conceived from the viewpoint of a designer using the system during a wrapper construction session.

A wrapper designer can create a wrapper in a fully visual and interactive way. The designer creates an extraction program with assistance of the visual UI (user interface; sometimes abbreviated as GUI for graphical user interface) based on one (or more) example pages which are stored and can be accessed and swapped in a document manager. Generating a Lixto wrapper is a teaching process which relies on a small number of well-chosen examples.

After having signalized (e.g. via a button click) that a new program should be created, and after having chosen a starting Web page (i.e., an example document) and having opened it in the browser, the designer can start to define patterns [501, 502]. She selects the kind of pattern [503] (tree, string or document pattern; in the displayed embodiment, the possibilities for using "bestseller" as parent pattern are displayed. Since it is no URL no document pattern can be created. An attribute pattern is, in this embodiment, a pattern which takes attribute filters only) and a pattern name. Patterns carry user-defined names which as we have seen are also used as default names of XML elements. Then one or more filters for the current pattern can be added.

In our preferred embodiment, when defining a filter, the designer selects an example target and an attribute selection mechanism, and in the background the system generates a basic Elog rule by choosing a suited element path and default attributes. Then the designer is shown all targets matching the current filter ([505], [506],[507],[508] illustrate the example below).

If undesired targets are matched she has the choice to refine the rule by adding conditions to it. Conditions are added until no undesired pattern instances are matched by the filter. Filters are added as long as some desired patterns are not yet matched. Alternately imposing conditions and adding new filters can perfectly characterize the desired information.

After finishing program generation, the program can be saved, and the Extractor can be regularly used to generate XML output of similarly structured pages. This demonstration illustrates the main features of the Lixto wrapper generator such as user/system interaction, the capacious visual interface, the marking/selecting procedures and the extraction tasks by illustrating the following examples.

Figure 6:
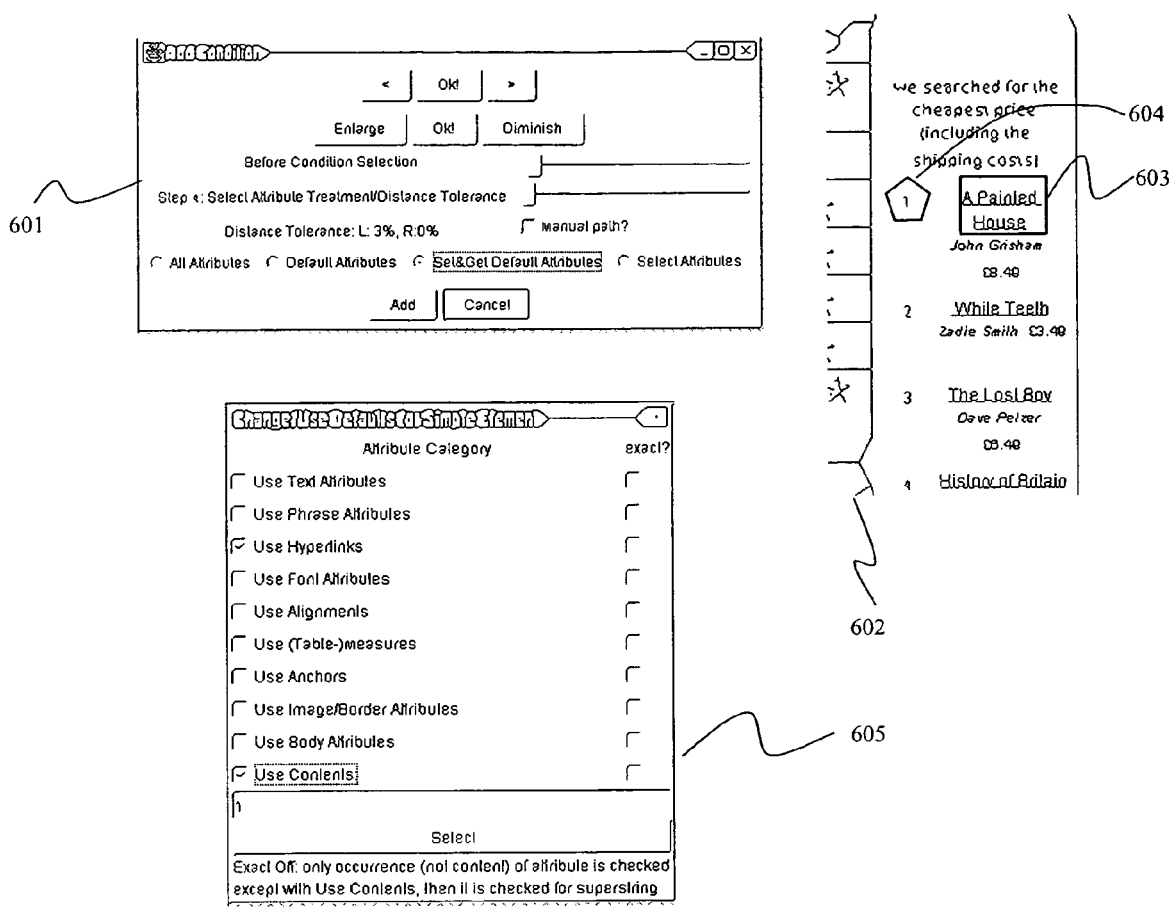

We describe the program generation process with an easy example as illustrated in FIGS. 5 and 6. This very easy example shall serve to illustrate pattern creation in detail and to show how to add external conditions. Moreover, it shall mediate that single occurrences and multiple occurrences of pattern instances are treated in the same way. Assume the designer is interested in the current bestsellers of various bookshops. Consider the page www.books.co.uk [504] and the creation the creation of a program which extracts the current bestseller.

1. Create a new program name by using a dialog box and typing in the name.
2. Open an example page in the browser (e.g. this week's page, [504]).
3. Add a new pattern to the root pattern <document>, calling it for instance <bestseller> [502].
4. Choose default attribute settings (this means that the system considers attributes of a previously specified default list).
5. With two mouse clicks mark the example target.
6. Test the current filter.

In this case, testing the current filter returns too many targets as indicated in [505,506,507,508]. Each book in the Top 10 list matches this filter. Here, the designer is merely interested in a single match, so she has to restrict this pattern. She decides to add a condition (FIG. 6).

7. Opt to add a before condition expressing that a certain element should immediately appear before the desired target pattern [601].
8. Visually select the desired before element [604]; the system allows to navigate for fine-tuning ([602]). The selected before element, here highlighted with a polyeder, can be changed using the condition UI [602]). [603] is the current example target (here highlighted with a box).
9. Select distance tolerance settings (In which distance interval is the element allowed to occur) [601].
10. Choose "Set and get default attribute" setting [605]. In this kind of attribute selection we put attributes into several groups so that users without HTML knowledge can specify that, for instance, the font of a particular element is characteristic for the target and hence shall be used for extraction.
11. Choose "Use contents", and use the exact contents "1" (exact because "1" might appear inside of other elements, too, such as in some prices).
12. Test the filter again. Now it extracts the desired target only.
13. Save the filter, the pattern and the program.

In our preferred embodiment the program can be saved in three different ways: first, by using serialization (as supported by Java), second by storing the Elog rules into a textfile, and third by writing the Elog program as XML file. The first and third possibilities facilitate a quick loading of programs.

The resulting program can be applied to new versions of the page repeatedly by using the program evaluator as a stand-alone module as described before in the Overview section. Below the output of two pages of two different weeks is presented:

```
<?xml version="1.0" encoding="UTF-8"?>
<document>
    <top>A Painted House</top>
</document>
<?xml version="1.0" encoding="UTF-8"?>
<document>
    <top>White Teeth</top>
</document>
```

If the page structure does not change significantly, the extraction program will continue to work correctly, especially if rather stable conditions had been chosen.

Below, some more examples based on this page are briefly sketched:

Return all books by J. R. R. Tolkien currently in the Top-10 (Use content information): This can be achieved via an after condition enforcing that the name of this author occurs after the title.

Return all top ten titles together with author names and prices (Use hierarchical extraction): This requires a hierarchical program generation by first extracting a region <record> containing rank, title, author and price information and subsequently creating patterns for <author> etc. inside this parent pattern. For instance, to extract prices, exact font information (characterizing prices as red colored content) can be used. The XML output groups the corresponding authors, titles and prices together inside one <record> entry.

Additionally separate currency and price (Use string extraction): This requires the creation of a string pattern using regular expressions entered via a simple interface (possibly using predefined concepts as currency).

Extract the Top-3 titles (Use range conditions): Impose a range condition expressing that just the first up to the third target of the above described filter without the before condition yields the desired result.

Here is a short sketch of a slightly more complicated example. Recall the introduction's example and a designer who would like to automatize her search for a special notebook offer. Even though she is not familiar with HTML nor capable of script programming, she can use Lixto and create wrapper programs for her favorite sites. She chooses one eBay example page, creates a program and then decides which patterns are written to XML, possibly using auxiliary patterns and restructuring the output. In a structured source as eBay one example page is sufficient to create a program which correctly characterizes information on all other eBay pages. For Yahoo auction pages the designer creates a program mapping into a similar scheme as eBay. Applying these two programs to other pages of eBay and Yahoo auctions, respectively, creates XML companions of these pages. This can be done regularly, say, once a day. XML pages of several auction sites can be merged and queried with existing query engines or with the query module of the Infopipes system (see ramifications). The user can issue her desired query without wading through thousands of pages manually and choose to impose some automatic trigger conditions, e.g. to send the information as email whenever the XML result changed.

F. Method of Pattern Building

The Lixto method allows fully visual and interactive wrapper generation. Instead of script file editing, straightforward region marking and selection procedures are used. No knowledge of the internal language representation is necessary and familiarity with the tree structure is not required. Lixto is very expressive as it allows for extraction of target patterns based on surrounding landmarks, on the content itself, on attributes of the used DOM, on the order of appearance and on semantic/syntactic concepts.

The extraction pattern builder [106] provides the algorithms and the visual user interface. In our preferred embodiment, this UI resides on the client side and is implemented with Java relying on an internal browser. In an alternative embodiment, this UI is in HTML interacting with a Java servlet—together with the HTML document inputs this interface can be used in the designer's favorite browser (see the packaging and implementation section). For one skilled in art it is immediately apparent that similar user interfaces can be thought of which are all in the spirit of this invention.

Figure 16:
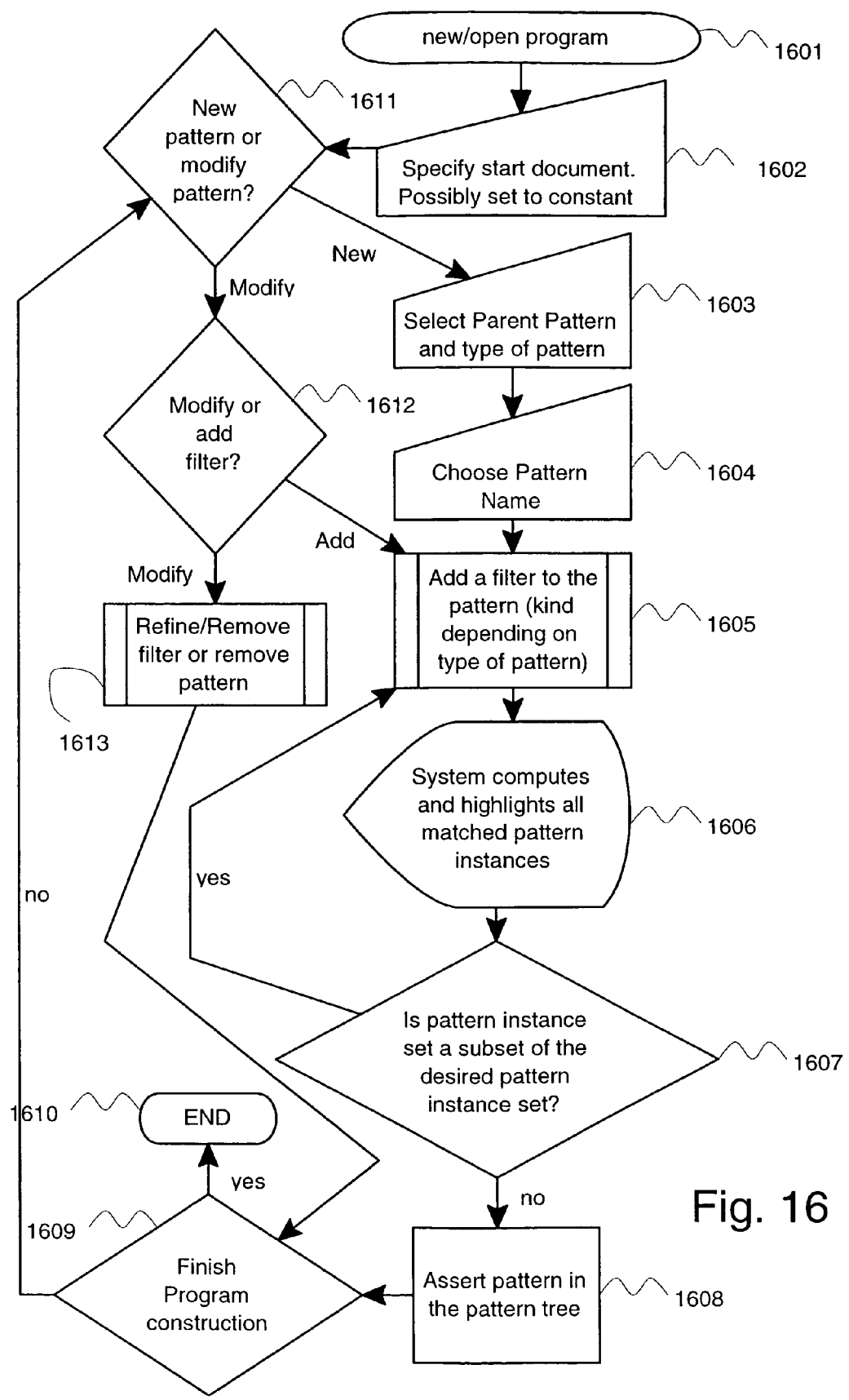

(1) Pattern Generation (FIG. 16)

A Lixto wrapper program is interactively generated by creating a pattern graph or tree. Each pattern characterizes one kind of information. For example, one can first define a pattern item and then define a child pattern price. The child pattern relationship expresses in this case that each extracted instance of price must occur within one instance of item. In the general setting, one pattern may have multiple parents.

The set of extracted instances of a pattern, which are either DOM tree elements, lists thereof, or strings, depends on the current page. In the following description, we sometimes distinguish between the construction of homogeneous and heterogeneous wrapper programs. In many cases, homogeneous wrapper programs are sufficient. They are a class of limitation which deserves own treatment. Let us recall their definitions.

Homogeneous Programs: The pattern graph is a tree. Each pattern (in particular all its filters) refers to exactly one parent pattern. The home document pattern, the root pattern of the pattern tree, consists of simply one filter which extracts the referred URL. Even homogeneous programs might contain further document patterns, however no recursive calls are allowed. They also consist of one document filter only.

Heterogeneous Programs: Each pattern can refer to more than one parent pattern because each filter of a pattern can refer to a different parent pattern. Each document pattern can consist of various filters pointing to various parent patterns.

In both cases, a pattern requires at least one filter when evaluating a program.

Example of an heterogeneous program: Consider an eBay page about notebooks (FIG. 15 illustrates the described example). Somewhere on the page a special link "Next page" is located. This button is wrapped by creating a tree pattern called "next". Document filters have as parent instance a string which can be identified as URL. Hence, to define a document pattern first a tree pattern is needed to identify the element containing the link, then a string pattern as child of it with an attribute filter extracting the link itself, and then a document pattern as child using the URL and extracting the linked Web page. These three steps can be done directly in one step if desired. However, a document can be followed even if it is only mentioned somewhere in the text. Then a document pattern needs to be created manually as child of a string pattern. This eBay example pattern needs two document filters: One, using the parameter $1 for the URL of the starting page, and a second one which has a variable which is instantiated during wrapper execution with URLs pointing to subsequent pages. The initial document filter (i.e., the one referring to $1) has no reference to a parent pattern. However, other filters of this particular document pattern refer to parent patterns, namely to string patterns whose instances are the extracted URLs.

A program may contain several different document patterns for various types of URLs to be extracted. For example, in an eBay page one document pattern may describe the links to detailed item descriptions while another document pattern describes links to follow-up pages of an eBay search result. A single pattern may have instances in various documents.

Figure 29:
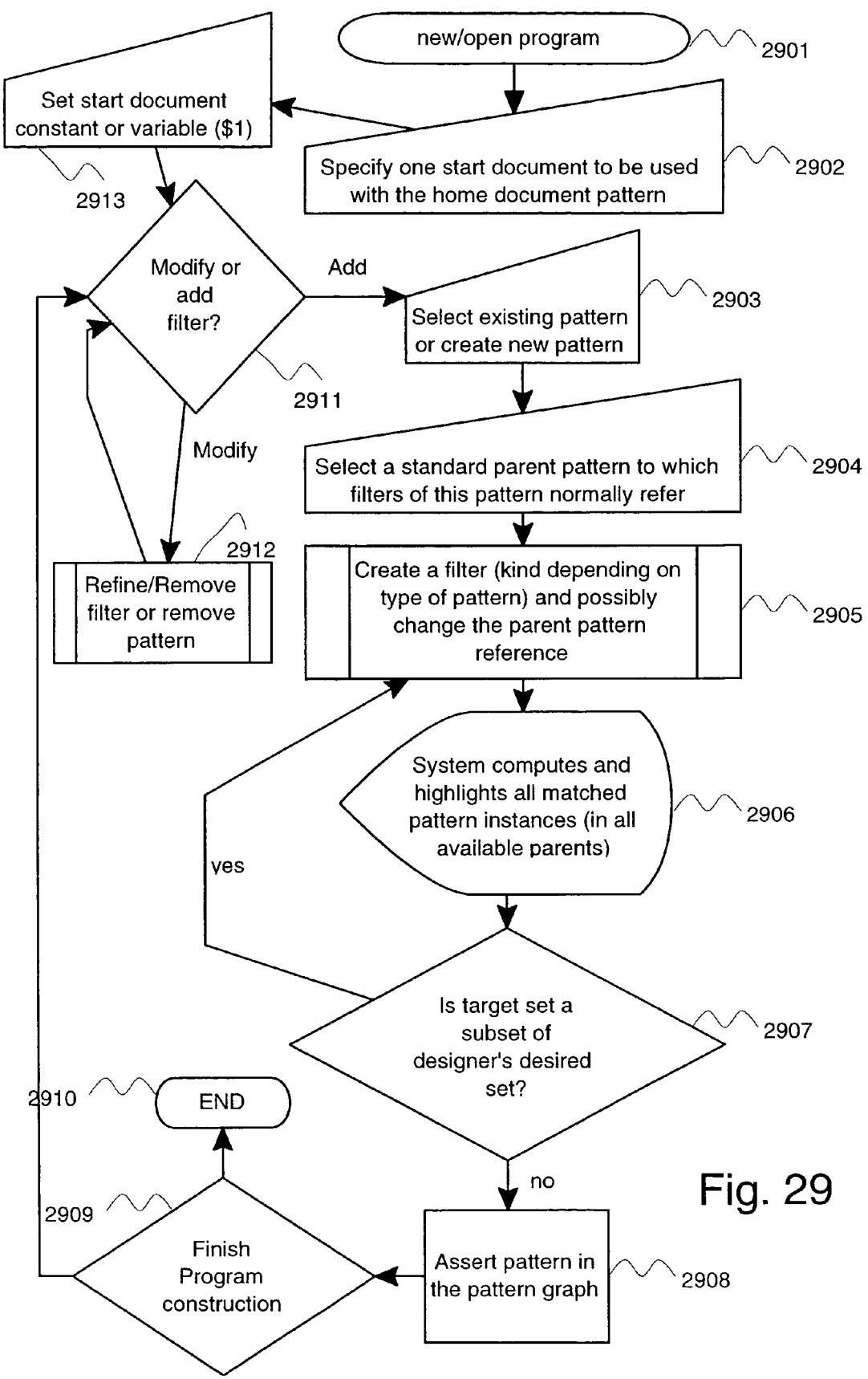

Our description of pattern building will first concentrate on homogeneous wrapper generation and in case of differences, it is mentioned what happens in the heterogeneous case. FIG. 16 describes pattern generation in case of a homogeneous program (every filter of a pattern has the same associated parent pattern), whereas FIG. 29 describes pattern generation where recursive behavior is allowed (every filter of a pattern can have a different associated parent pattern). FIG. 29 describes the general case.

The construction of a wrapper either starts by opening an existing extraction program (which can be stored in various ways, for instance as simple text file or XML file expressing the patterns and filters) or by starting a new program [1601].

The designer opens an example document (in the preferred embodiment, an internal Java Swing browser with navigation capabilities is used) [1602]. This sample page is associated with the initial existing home document pattern. The system generates a document tree for each of the sample pages (inserting missing tags and parsing the page). At the beginning of program generation, only one document pattern (containing one automatically constructed filter based on the entered URL) is present. The designer may choose to modify the initial filter. The initial document filter (which in the homogeneous case is the entire document pattern) is always the starting point of program evaluation.

The designer then can decide to add a child pattern to one of the patterns in the pattern tree [1603]. Moreover, she can choose the type of pattern, i.e. either a tree pattern or a string pattern (both together are referred to as source patterns as mentioned above), or a document pattern. In case of a document pattern its single filter is automatically added in the homogeneous case, simply consisting of a getDocument predicate using the value of a parent string pattern. Next, the user chooses the desired name of the new pattern [1604]. This name acts as default name in the desired XML translation.

Each pattern is defined by a set of filters (as specified above). In case of homogeneous program construction, the home document pattern is predefined and takes only one filter which can either specify to take a specified page ($1) or to load a fixed page. This pattern has a unique instance, namely the document itself. Recall that a filter allows the system to identify a set of similar nodes of a DOM parse tree or a set of similar strings. Adding a filter to a pattern usually extends the set of of extracted target pattern instances whereas imposing a condition to a filter restricts the set of pattern instances. Alternately imposing conditions and adding new filters can perfectly characterize the desired information.

Figure 28:
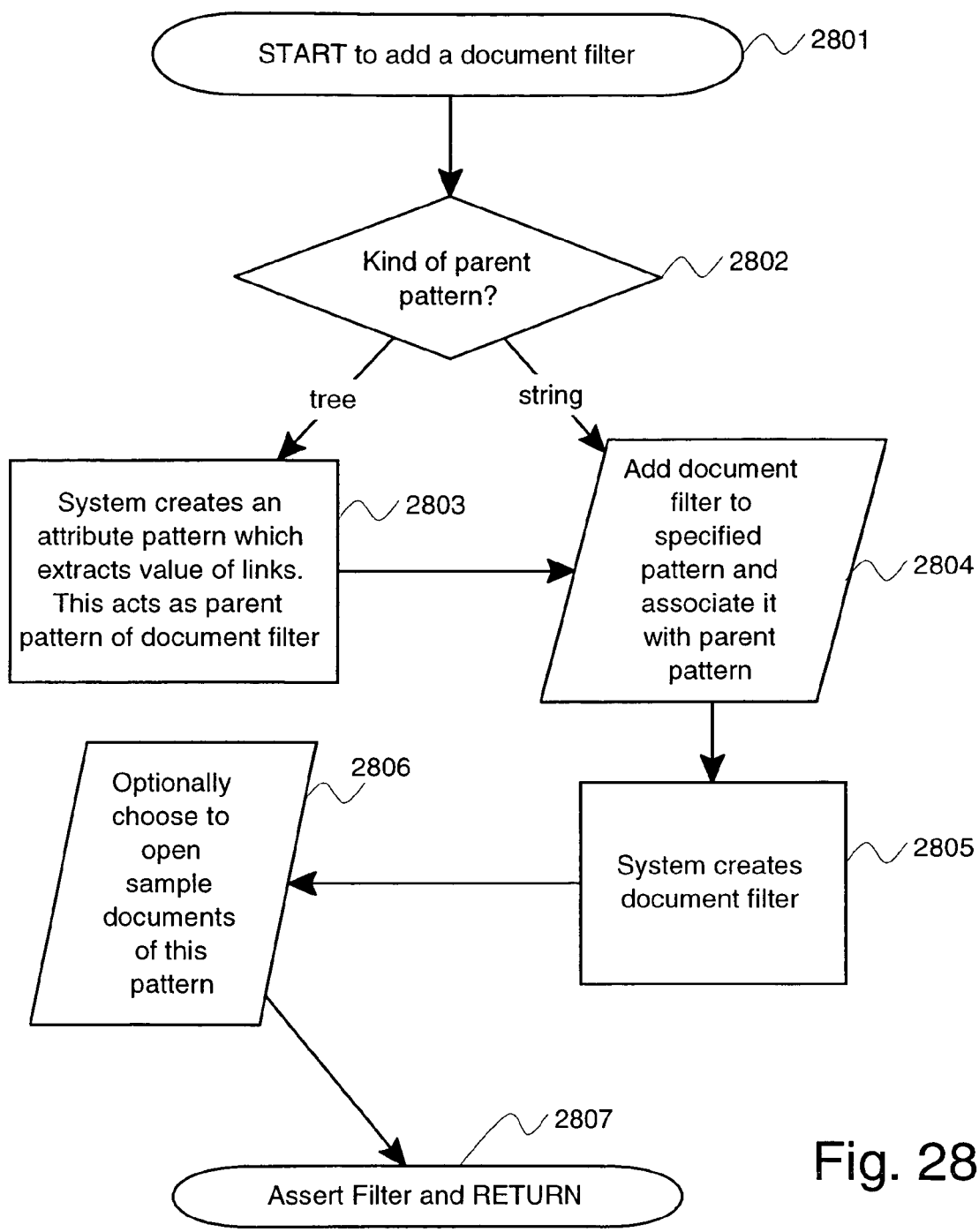

Recall that tree patterns can host tree filters only, whereas string patterns can host string filters, that are text filters and attribute filters (the latter contain also image filters). The process to add filters [1605] is described in more detail in FIG. 17, FIG. 18 and FIG. 19. FIG. 28 illustrates adding of a document filter.

If the designer chose to add a document pattern, this algorithm is launched. The designer can either add a document pattern to a tree pattern whose elements contain a "href" attribute (an auxiliary intermediate pattern is created), or add a document pattern as child of a string pattern.

Having finished the filter construction, the modified pattern is tested by computing and displaying the current pattern instance set within all parent-pattern instances [1606]. Here, the disjunction of filters is evaluated.

In our preferred embodiment showing the test results is fulfilled by flashing highlights in the used browser. If the target set is a subset of the designer's desired set then another filter should be added [1607]. Otherwise, the pattern already exactly identifies the desired target set because filter construction [1605] rules out that target set can be a superset of the desired set in [1607].

If the pattern identifies exactly the desired target set, the pattern can be saved in the program [1608]. The designer now has the choice to add another pattern or finish program construction [1609,1610]. In the first case, the wrapper generation terminates, whereas in the second the designer returns to [1609,1611].

In our preferred embodiment, the extracted set of targets of an asserted pattern is stored in a knowledge base and is accessed for further pattern construction. However, alternative embodiments can re-compute the pattern instances set each time. Hence, usually the knowledge base and the program are not displayed in the flow diagrams.

The program reflected by the pattern tree (graph) can be saved during pattern construction. In our preferred embodiment, saving occurs after a filter has been saved to a pattern.

For sake of completeness, FIG. 16 alsor illustrates how to modify an existing pattern ([1611,1612,1613]). In our favorite embodiment, removing a pattern or a filter is done by simply clicking on the relevant pattern or filter of the pattern tree. If the designer desires to modify an existing filter [1613] the saved filter is opened again and the previously chosen options are presented as default options when re-running filter creation. She can easily alter conditions which have been added before. In some cases, the designer has to select another example pattern instance (e.g. when switching the example page she works on).

Defining child patterns of a pattern usually corresponds to what is called aggregation in the information systems field. In fact, in the XML output higher level objects such as record can be conceived as aggregation of all its children, i.e. item, price etc. However, the Lixto method is also capable of dealing with object specialization (corresponding to the subset-relation "is a" in the entity-relationship terminology). For instance, if a designer wants to specialize a pattern which extract tables to a pattern which extracts only tables which contain a special word, specialization is applied. In our preferred embodiment, this specialization is expressed via a kind of aggregation and additional conditions. The designer selects one parent pattern instance, selects as target exactly the same instance (which has to be one of the specialized instances) and expresses additional conditions, in particular attribute conditions. However, in alternative embodiments an own button for adding a specialization is provided. Specialization is reflected in Elog by filters which do not contain an extraction definition atom, but in addition a pattern reference atom.

Example

Consider, the designer would like to specialize a pattern extracting tables to a pattern extracting tables where some green text occurs. Such a pattern is internally reflected by using a pattern reference atom table(S,X) instead of an extraction definition atom and a parent-pattern reference:

```
greentable(S,X) <- table(S,X), contains(X,(.*.td,[font-color,green]),_)
```

Addition for heterogeneous program construction:

FIG. 29 describes the pattern generation process in case of possible heterogeneous patterns. Initially, the home document pattern is created and the designer can associate a number of sample documents with it. Moreover, she can decide to use a variable input condition in the initial filter (which is an entry point for the designer to specify another page when using this wrapper, in Elog expressed with "$1") or to use a fixed page [2913].

When adding a new filter [2911], the designer creates a new pattern or selects an existing pattern [2903] and selects a standard parent pattern to which this pattern (i.e. filters of this pattern) refers unless explicitly stated otherwise [2904]. This can even be the pattern itself as in the second example [1522] of FIG. 15. With this, different filters of a pattern might have different parent patterns and hence each pattern can have multiple parents.

When the system highlights all matched pattern instances [2906], they are not only highlighted in all instances of one parent pattern, but of all or some (in our preferred embodiment, in all currently opened documents with the option to automatically switch between documents). All other steps remain like in FIG. 16 (2901,2902,2905—there multiple document filters can be created, 2907, 2908, 2909, 2910, 2912). In our preferred embodiment, we distinguish a partial and general testing method.

In our preferred embodiment, parts of the pattern graph are displayed as tree rooted at the home document pattern. If a pattern occurs more than once, then its child patterns are not displayed in these additional occurrences. This pattern itself is displayed twice (or more often) in the tree. Its additional occurrences are displayed in italics. This display conforms to the way how filters are actually evaluated. If the designer clicks on a pattern specified in italics, then a tree rooted at this occurrence of the pattern is displayed in the same fashion.

b) Construction of Filters

Figure 17:
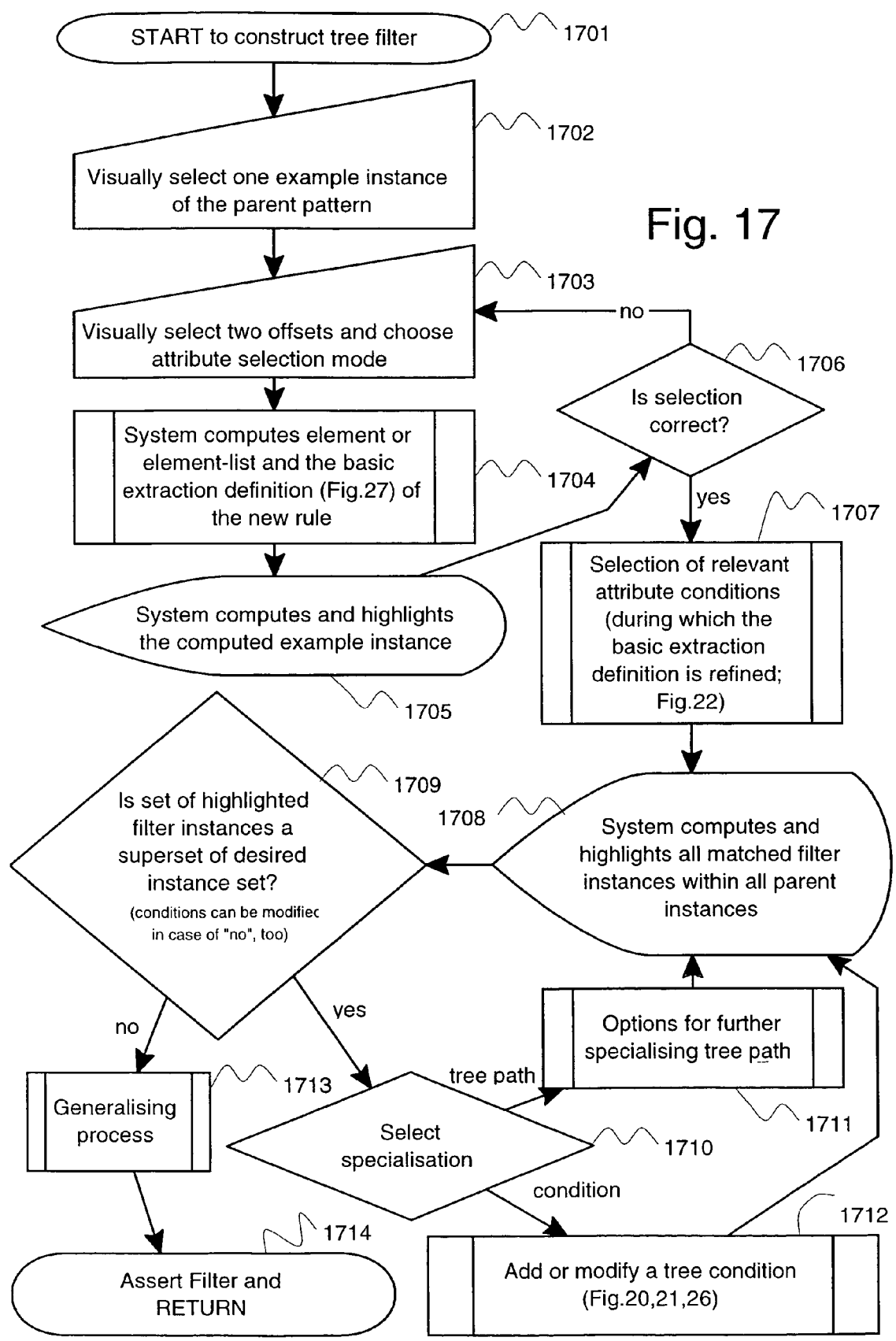

(1) Constructing a Tree Filter (FIG. 17)

As both in heterogeneous and homogeneous wrapper generation a filter is only associated with a single parent pattern, no special comments need to be made for heterogeneous program construction. In general, construction of filters (and specification of conditions) works by specifying one example. Attributes and the path information of the example are used to generate an extraction definition. In our preferred embodiment a new rule with an extraction definition atom is created; further conditions which are added later are reflected as further body atoms. The selected example can be replaced by another one when returning to modify the filter. This "sample based" method has the advantage of a very fast wrapper generation. Even when defining a "notbefore" condition, the designer selects a sample notbefore element which either occurs before the target in one other source, or occurs after the target in one source (A designer is not interested in specifying conditions which are never relevant). Only for string filters we chose a non-example based creation method—nevertheless, this could be easily changed, too, within the spirit of our invention.

To a tree pattern only tree filters [1701] can be asserted. The designer visually selects one example source instance [1702]. In our preferred embodiment, the system highlights the first instance of the parent pattern and the designer may navigate through the instances to select the actual parent example instance. While the embodiment described is fully capable of achieving the objects and advantages of the present invention, it is to be understood that the above embodiments are shown merely for the purpose of illustration and not for the purpose of limitation. E.g. another embodiment can allow to show all pattern instances and select the desired one.

In the next step [1703] the system asks the designer to visually select two offsets, in our preferred embodiment simply using two mouse clicks onto the sample document. Based on these, the system generates a basic extraction definition [1704] without attributes and a generalized tree path. This process is described in detail in FIG. 12. The designer is shown the computed example target [1705] and she is asked if the target is the desired one [1706]. In [1707] the basic extraction definition is refined. Several options are possible to select relevant attribute conditions. All of those are "sample based", i.e. somehow refer to attributes occurring within the example target. Within attribute selection, the designer might choose to add concept/pattern conditions and comparison conditions. These are, in our preferred embodiment, reflected as special atoms occurring in the same filter as the extraction definition atom and share some variables with it. With concepts and comparisons one might for instance express that the content of an element is a date and is before 10th of Mar. 2001 (keep in mind that the content of an element is used as special attribute). See FIG. 22 and FIG. 27 for a more detailed description and a flow-diagram for adding attributes and concepts.

After the selection of an attribute, the system starts an interactive process to generate the attribute conditions and attaches them to the extraction definition [1707]. The system then computes and highlights all matched filter instances within all instances of the parent pattern [1708]. Often a unique filter instance in each parent pattern instance occurs, hence the designer can not only test which targets are extracted inside the current parent pattern instance, but in all. Observe that in case of a general tree region, our preferred embodiment returns minimal filter instances, hence targets cannot be contained in each other (possible overlaps might occur even in that case). In the case of general tree regions it may even happen that the sample pattern instance is not matched. However, in this case the system proposes conditions to be added which match the example pattern instance, too (e.g. restricts it with before and after conditions, or use specialties of the first and last selected child).

If the current filter extracts a subset of (or precisely) the desired instance set, it can be saved [1709]. In the first case, another filter can be added to the pattern (FIG. 16) (referring to the same parent pattern) to cover the remaining desired pattern instances. If the current filter is too general in the sense that at least one undesired target is matched, then conditions have to be imposed to sort these targets out [1710].

The designer may choose among two such kinds of constraints. The first is to impose conditions [1712]; adding them is described in FIGS. 20 and 21. The other option is to impose a specialization to the generalized tree path [1711]. This can either happen manually or, as in our preferred approach, happen by specifying a negative example, i.e. the designer clicks on one undesired but matched instance. Based on this selection the system refines the tree path (in our actual implementation the system can even modify attribute settings or impose conditions). After adding a condition or specialization on the tree path the filter is tested again and the user can decide whether to keep this refinement.

A condition can also be revisited and modified (and of course removed). When revisiting a condition, the condition adding algorithm is launched with input values as specified in the previously constructed condition.

This procedure is re-done as long as the filter matches undesired targets. It even may be applied if the filter matches no undesired targets. As soon as the filter matches a subset of desired targets only, it can be asserted to the pattern [1709]. Before this actually happens, an interactive generalization step [1713] takes place which offers various ways to generalize the current filter in a manner such that it matches exactly the same targets on this sample page (but might be more flexible for other pages). After this, the filter can be saved [1714]. Alternatively (not displayed in the figures), the filter creation can be cancelled in each step.

In our favorite embodiment, the extraction definition atoms for tree filters are as follows (see also FIG. 27):

subelem(S,epd,X)

subsq(S,epd,fpd,lpd,X)

S acts as the parent pattern instance variable, X as filter instance variable, epd is an element path definition, and fpd and lpd are simple element path definitions. These have already been described in the language section in detail. Element paths are always computed relative to the current parent pattern.

Attributes are stored in the element path definition. As described before, an element path definition consists of a tree path and a set of attribute triples (attribute, value, exact/substring) or, in an alternative embodiment, pairs (attribute, required regular expression). Moreover, attribute values may be variables referring to a concept predicate (the most general option is to allow a regular expression possibly containing such variables). For more details refer to the description of FIGS. 22 and 27.

Figure 18:
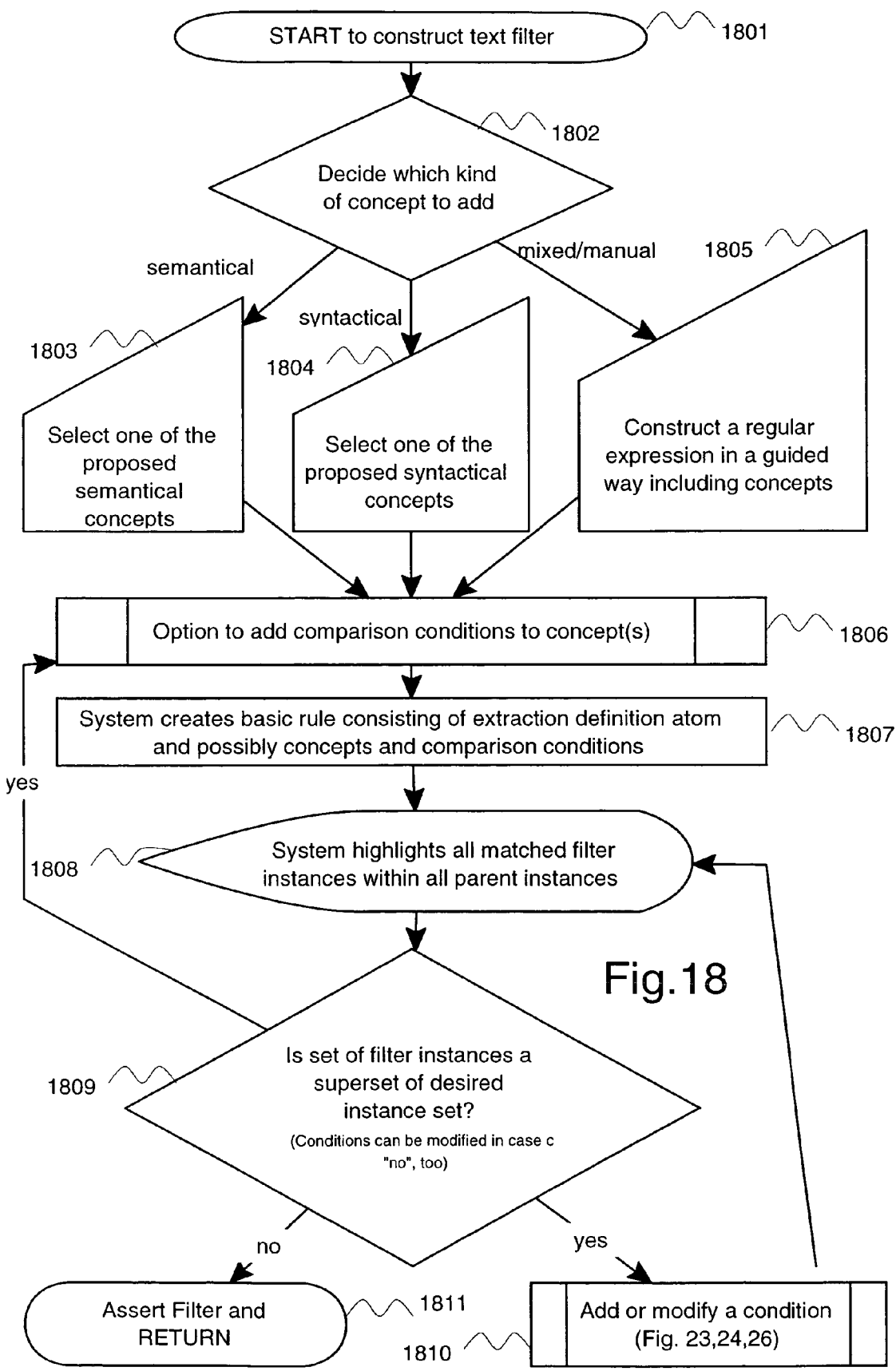

(2) Constructing a Text Filter (FIG. 18)

To a string pattern one can add string filters only. String filters are either text filters or attribute filters. A text filter works on the elementtext of the document. One may mix text and attribute filters within a string pattern (although mixing is seldom required in real-life scenarios). Constructing string filters [1801] works slightly different from constructing tree filters. For string filters the designer does not specify an example but instead selects from a list of predefined concepts [1802]. These concepts are either Semantic Concepts: These include for instance "is a city". Semantic concepts are checked with an ontological database. The system proposes to the developer a list of predefined semantic concepts to select from [1803].

Syntactic Concepts: These include for instance "is a date" (which can approximately be treated as syntactical concept). Syntactical concepts are checked with predefined regular expressions. For designers the difference is irrelevant, however if an experienced designer uses the concept editor to add built-in concepts, she has to distinguish between these two [1804].

Regular Expressions in general: The designer is guided through the creation of a regular expression which may include concepts. In our preferred embodiment some special conjunction operators are proposed to the designer, e.g. "Vienna, Austria" can be defined as " "isCity" ", " "isCountry" " [1805].

Designers can decide to add comparison conditions to concepts [1806]. To some concepts, relations are attached. For instance, the concept "isCity" features the relation "sameCity": A designer might specify that the system extracts the city name "Vienna" regardless in which language (as defined in the ontology database). Another example is to compare dates using "earlier than". Adding comparison conditions is described in more detail in FIG. 25 for both tree- and string filters.

The system creates a basic rule containing the extraction definition, and if necessary, the related concept predicates and comparison conditions [1807]. Then it computes and highlights all matched filter instances within all parent instances [1808]. In our preferred embodiment, highlighting works as follows: If some ancestor pattern contains attribute filters, then not only the standard browser window is shown for display, but one additional text window, which contains the output of an attribute filter where the extracted information is presented and additionally information is given from where this information is extracted.

Figure 21:
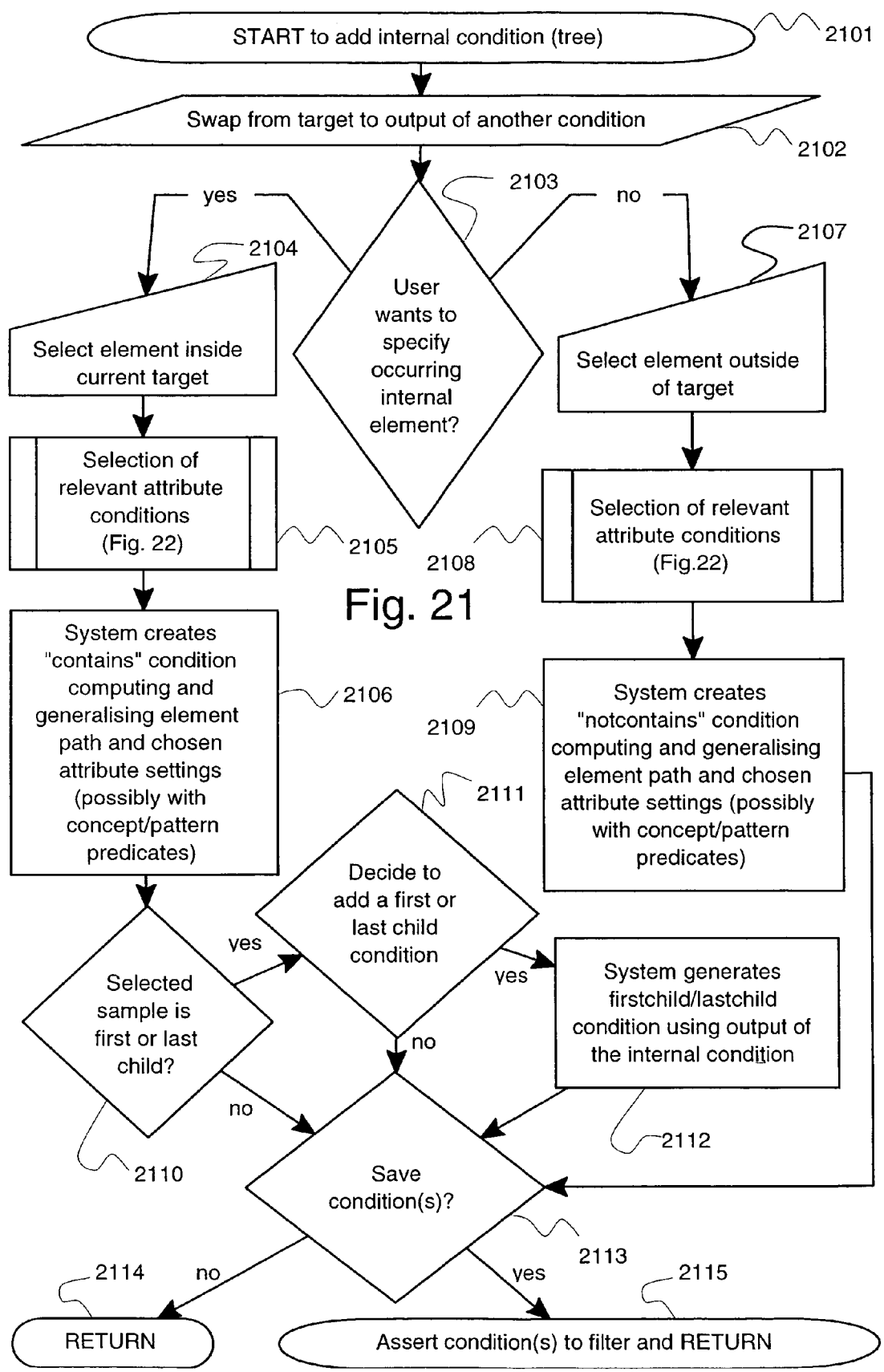
Figure 23:
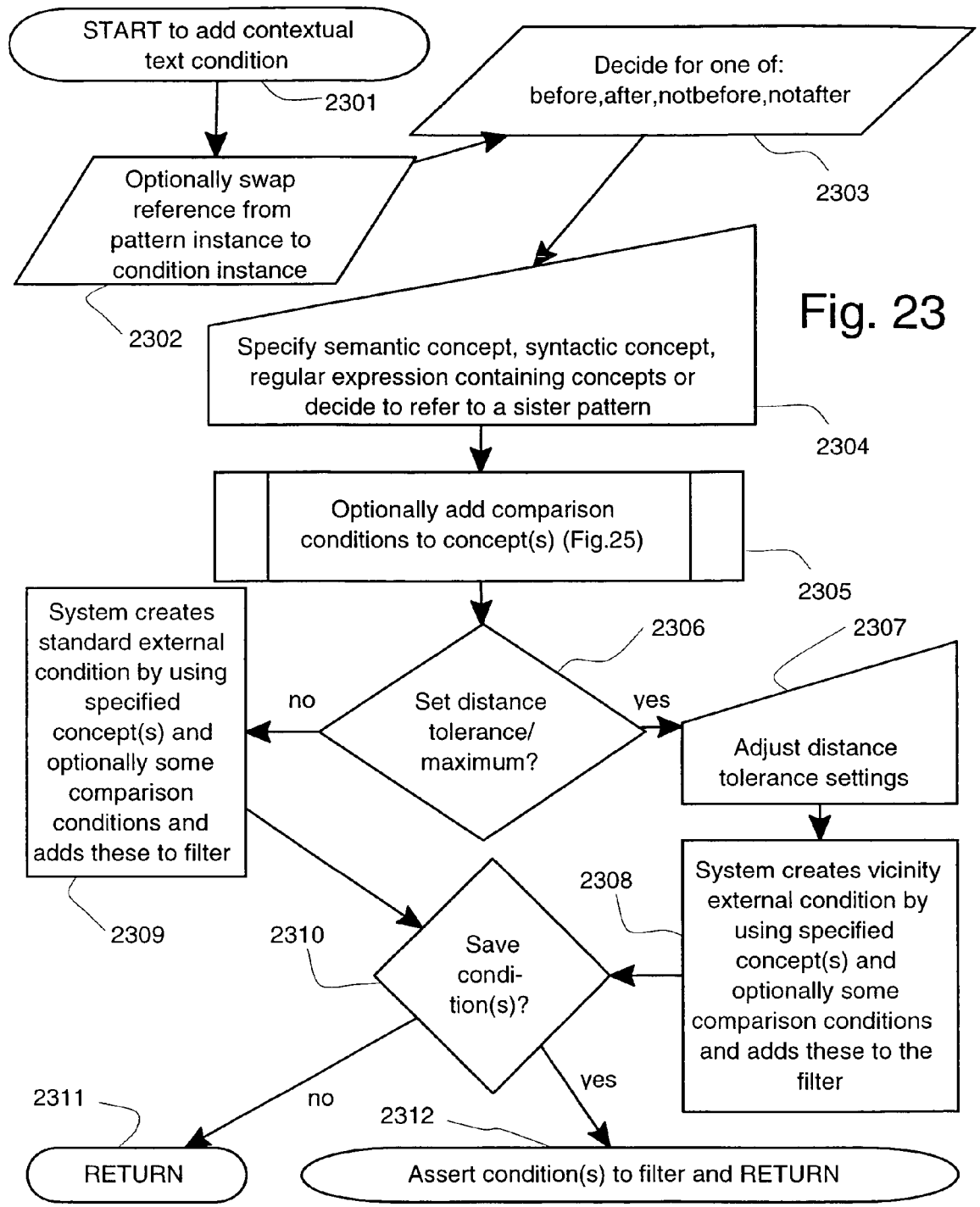

If the set of filter instances is a superset of the designer's desired set [1809] of instances, she adds or modifies a condition ([1810], FIG. 21, FIG. 23). Otherwise she can assert the filter to the pattern and return [1811]. Observe that even for string filters, internal conditions are relevant: Consider that a designer defined a string filter extracting city names (semantically defined), and then would like to specify that it additionally contains "V" which can, in this case, not be gained from the string path definition.

In our preferred embodiment a text filter is constructed by using "subtext(S,spd,X)". spd is the string path definition which is either a variable or a regular expression (possibly featuring variables). We construct own predicates for the same filter which refer to variables used in this atom. Other interpretations could express this within one predicate.

In our preferred embodiment, the construction of a string path definition is carried out by using drag- and drop techniques. The designer may drag concepts and special signs (such as the comma, space etc.) to create a pattern in a visual way. E.g., the designer first drags the concept "number" and drops it at the beginning of the desired string characterization. Next, she drags the special sign "space" and drops it. Finally, she drags the concept "city" and drops it. Using this, she has created a string path definition for characterizing a zip number followed by a city name (there can even be an own concept characterizing a zip number).

Figure 19:
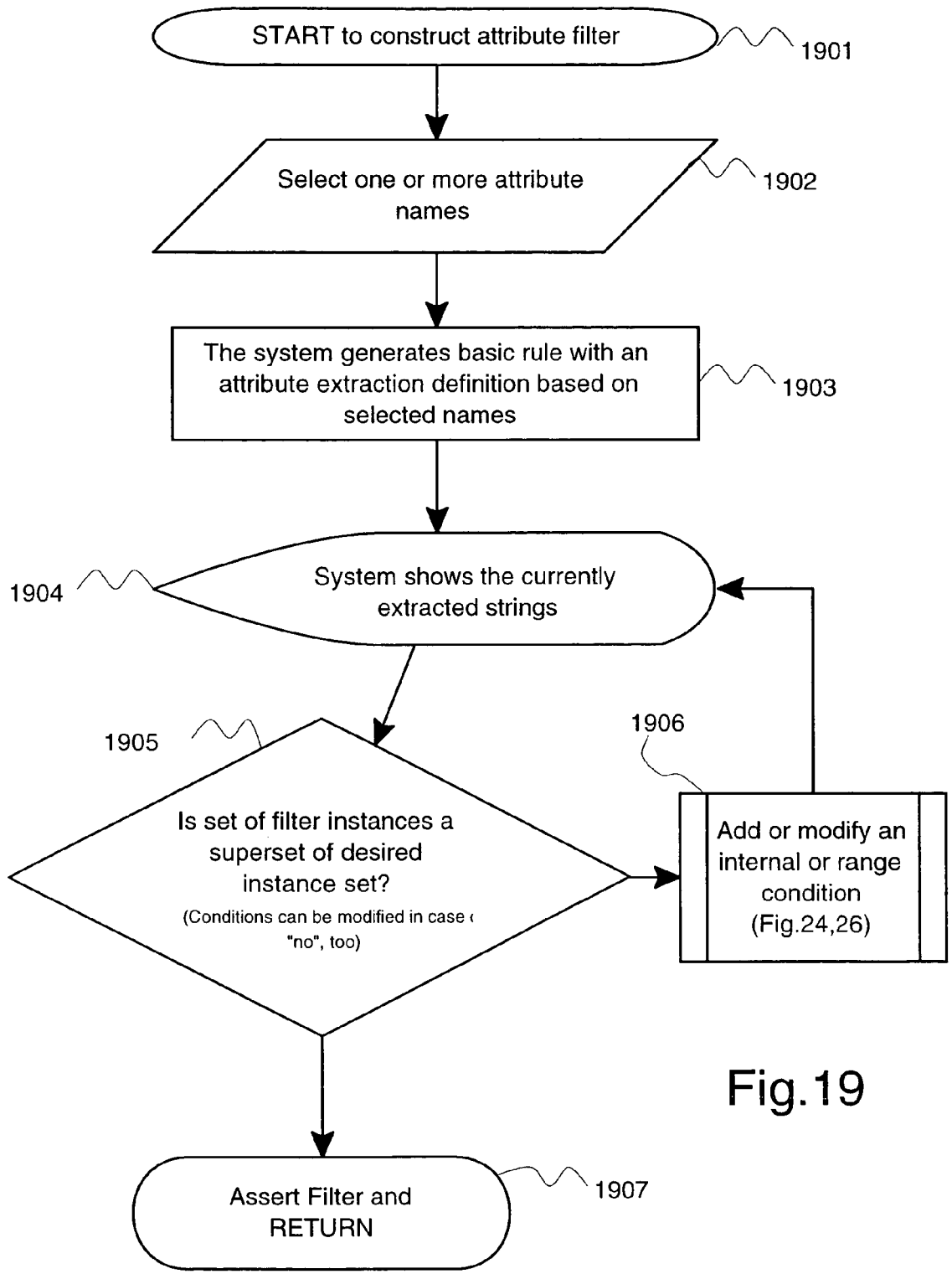

(3) Constructing an Attribute Filter (FIG. 19)

Attribute filters [1901] always return the full value of one or more attributes. In our preferred embodiment, a subatt atom is used having a string (other embodiments use a regular expression) as attribute path definition. If the regular expression matches the attribute designator, then its value is extracted as string. As mentioned before, attribute filters can only be used if the parent pattern is a tree pattern. Obeying this restriction, attribute filters theoretically can be combined with textfilters into a common pattern. Further child string patterns can extract substrings of extracted strings. Attribute filters may have child patterns which extract inside the extracted attribute value. Attribute filters disallow external conditions (as they do not make sense in that context).

An attribute filter can also be used to extract the complete content of an element. However, this can be done more directly with a text filter as there even partial content information can be extracted directly.

The designer can select to specify one (in case of a string as attribute path definition) or a number of attributes (in case of a regular expression as path definition) [1902]. In the preferred embodiment, this is done via selecting an attribute designator (the system proposes those present in the current source root nodes) or, in other embodiments, by specifying a regular expression (or is substring of) to match more than one attribute.

As described above, we defined several virtual attributes. These include "elementtext", "colpos" and "imgdata". "imgdata" is used to extract the actual image. The value of the attribute "imgdata" is set to the content of the image file. With this special attribute filter, one can extract the image content itself (and theoretically could work on it with subsequent string patterns) in the same way as the value of real attributes can be extracted.

Based on the designer's selection, the system finally generates an attribute extraction atom [1903]. The system then illustrates the set of extracted targets to the designer [1904]. Since attributes and their values are not shown in the document display, our preferred embodiment uses own text windows where each window displays the extracted value and the corresponding source element.

Figure 26:
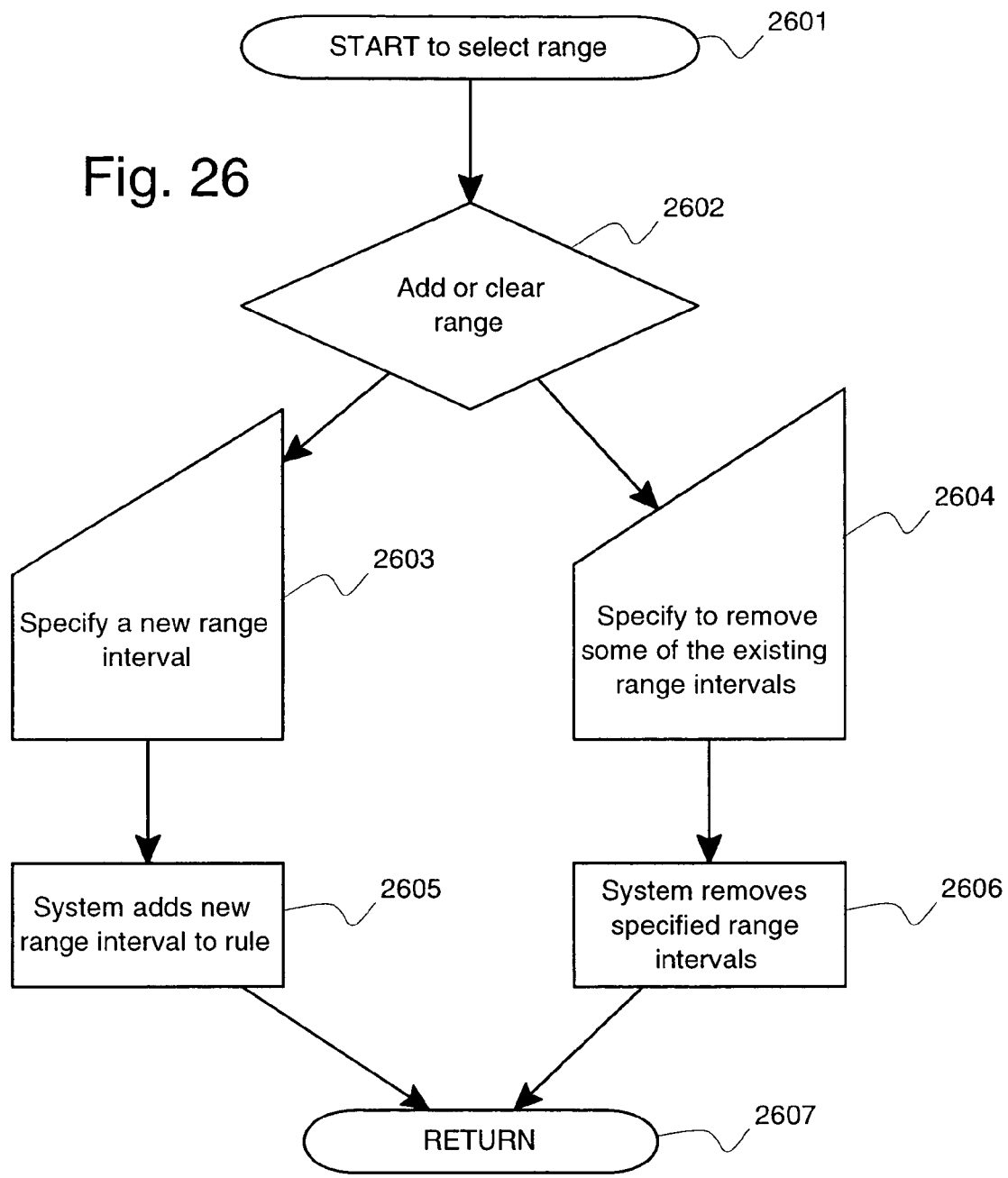

If the target set is a superset of the desired target set [1905], the designer can decide to add a condition [1906]. In case of attribute filters, conditions are limited to internal conditions (FIG. 24) and range conditions (FIG. 26). Both work exactly as for string rules (and indeed generate the same objects). The same internal condition object and range attributes as for string rules are used.

c) Adding Conditions (FIGS. 20-26)

To refine a filter, a condition can be imposed. Conditions are used to reduce the number of matched targets. Wrapper designers have to add conditions on filters as long as at least one undesired target is matched. It does not matter if some desired targets are not matched as these can be added with defining a second filter later.

Conditions include contextual (external), internal and range information. Conditions can be added based on the way how information is presented or based on the way how information is structured, or both.

In the following, we describe how conditions can be added through the user interface. Whenever the designer adds a condition of a certain type, the filter under construction is augmented by these conditions. In our preferred embodiment, a corresponding condition atom is added to the rule under construction. Moreover, if conditions referring to concepts or pattern reference atoms are created, then the appropriate atoms and specific variables are additionally incorporated into the rule body.

Attribute Conditions are a special form of internal conditions, however, they are discussed in a flowchart of its own (FIG. 22), since every kind of condition and the extraction definition atom contain element path definitions on which attribute conditions can be imposed. With attribute conditions, a designer can for instance express that all bold-faced city names shall be extracted.

In case of tree filters, internal conditions (FIG. 21) may implicitly refer to descendent subtrees of the target. Internal conditions can also be of use for string filters (FIG. 23), for instance if the extraction definition is defined in a semantic way (such as "extract a city name"), the designer could specify that the city contains a particular sequence (such as "Rio").

Contextual (external) conditions (FIG. 20,23) refer to elements occurring before or after (and not before/not after) the target within the respective source. External conditions allow the wrapper designer to express distance tolerance parameters. In our favorite embodiment, we simply use the text length as basics of distance measurement for both string and tree conditions. Range conditions are constraints that directly restrict the set of matched targets depending on their order of appearance.

Conditions also include reference to previously constructed patterns (e.g. "extract an item if directly before the pattern price occurs), reference to semantic and syntactic concepts (e.g. "extract an entry only if it contains a date") and comparison conditions (e.g. "extract an entry only if it contains a date after the 10th of March", FIG. 10). Recall that in our preferred embodiment, these are implemented as own atoms sharing variables with the extraction definition predicate or a condition predicate. For tree filters these are defined via attribute conditions (FIG. 22) whereas for string filters these are directly defined in the string path definition.

Condition imposing can refer not to the target only, but to other tree regions, too. The system proposes to refer to the target (e.g. "before the desired information there occurs something in bold-faced), however the designer can decide to change this to refer to the output of another condition (e.g. "before one of the output instances of the bold-faced before element there needs to occur a price).

Conditions can be re-visited and modified. In this case the previously specified condition values are proposed and can be changed. If the example target selected for specifying a condition is no longer available the designer has the option to select a new sample.

The element path included in tree conditions always refers to simple elements and never general tree regions (as allowed for target selection). We believe this is sufficient as conditions using a tree region can easily be expressed by some equivalent conditions referring to elements only.

Figure 20:
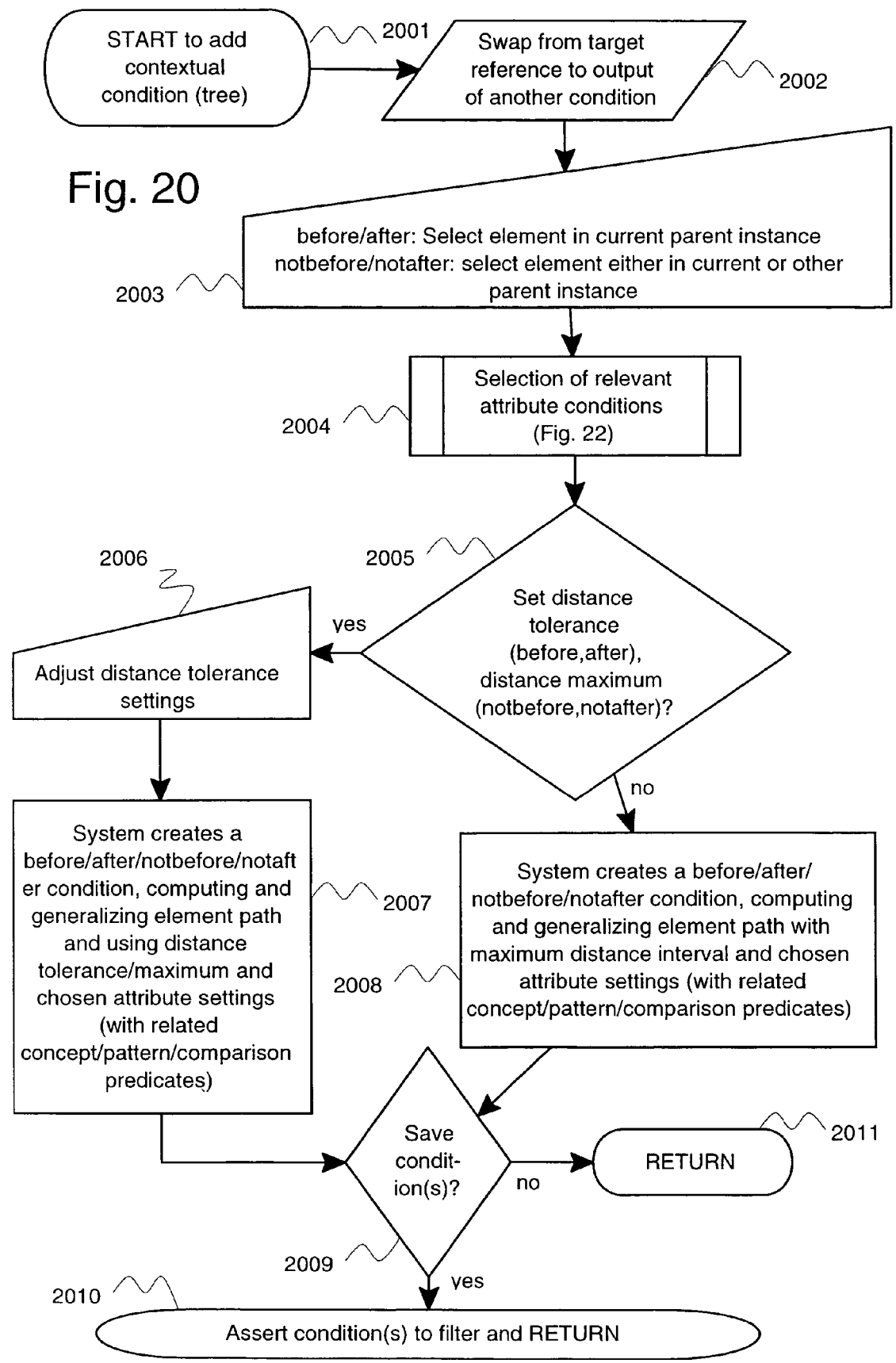

(1) Imposing a Contextual Condition to a Tree Filter (FIG. 20)

Contextual tree conditions include positive conditions (before, after) and negative conditions (notbefore and notafter). To express that something starts with or ends with a particular element are internal conditions and are reflected via firstchild and lastchild conditions for tree filters and via a regular expression interface for string rules (offering options such as "Start with").

After deciding to add a contextual condition [2001] the designer may change the default selection of referring to the target pattern to referring to the output of another (previously constructed) condition [2002]. To this end, she has, if the previous condition has more than one output instance on the example, to choose one of these.

Then, the designer chooses one of the following condition types:

After: In this case she visually selects an element in the current parent-pattern instance which occurs after the selected sample pattern instance.

Before: In this case she visually selects an element in the current parent-pattern instance which occurs before the selected sample pattern instance.

Notbefore: In this case, she either visually selects an element in the current parent-pattern instance which occurs after or inside the selected example pattern instance (a positive example), or she chooses a different parent instance, selects a different example target and an element occurring before it (a negative example). The first case reflects that usually an element which shall not occur before the target occurs after or inside it, and the second case that it occurs before the target in another source. With this method we can specify an example and select its attributes such as with positive conditions.

Notafter: works analogously and vice versa to "notbefore".

Recall that the selection is entirely visual and happens on the browser-displayed HTML document itself, not on a tree representation or else. In our preferred embodiment it is possible to select a leaf element and move it to the next/previous leaf element and enlarge and diminish to parent/child elements, or even to generate a subregion (a list of elements).

Next, the designer selects relevant attributes (2004, FIG. 22) in the same fashion as already described for characterizing target information above. In [2005] the designer can decide to create a "standard" condition (internally reflected by setting the distance values to 0% up to 100%) or a "vicinity" condition. In the second one, an additional vicinity condition, for instance referring to the target distance, is used. This can be specified by the designer [2006].

In case of positive conditions, the designer may specify two distance tolerance values (in our preferred embodiment by moving sliders and highlighting the current tolerance interval). The first value indicates the allowed deviation from the current position to the left, and the second one to the right. In case of negative conditions one value can be specified expressing the maximum allowed distance (e.g. by simply clicking into an example pattern instance to indicate the maximum allowed distance).

Figure 30:
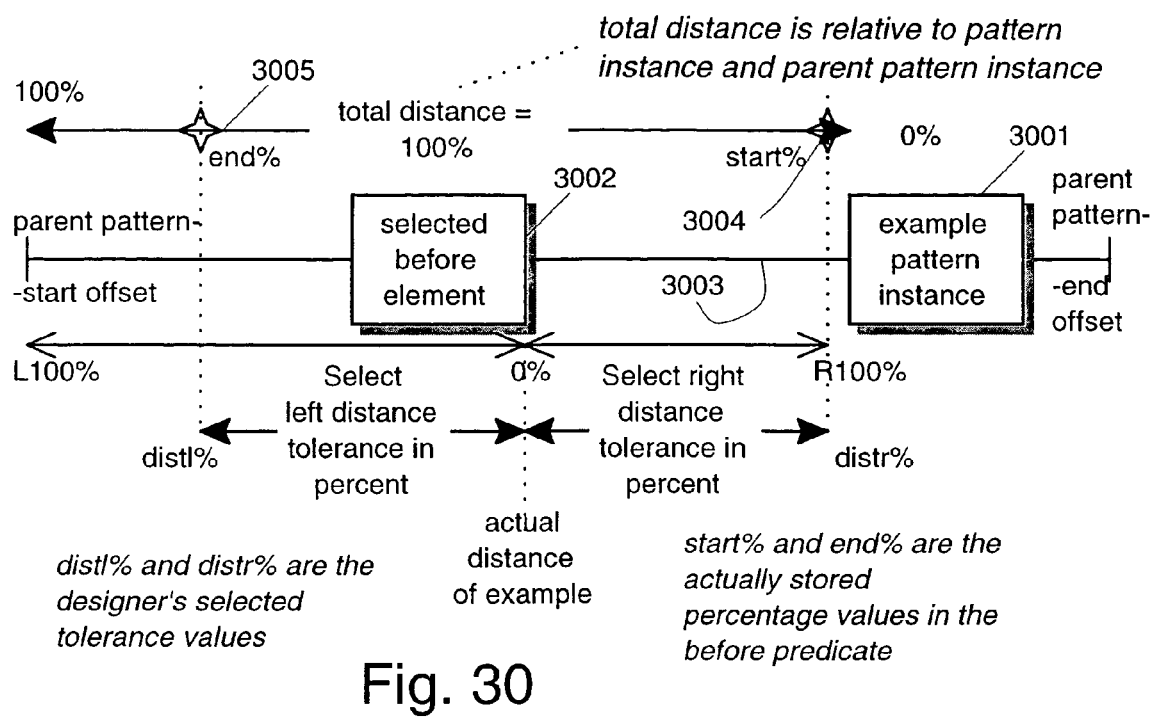

FIG. 30 illustrates how selected distances are reflected as percentage values in the external condition predicates by giving an example. [3001] illustrates an example pattern instance, and [3002] a selected before element. In case of before elements, the end offset is considered for computing the actual distance from the pattern instance (for which its start offset is used). [3003] is one selected parent pattern instance wherein both the pattern instance and the before element occur. Based on the actual distance and the maximum and minimum possible distance the designer can set two distance tolerance percentage values, one to the left and one to the right. Setting both to 100% internally is represented as start %=0 and end %=100. The selected distance tolerances are recomputed on the basis of the distance from the pattern start instance to the parent pattern start instance (which acts as 100% and maximum possible distance from pattern instance) to two percentage values, in the example labeled as start % and end % [3004,3005]. These values are relative to the current pattern instance and parent pattern instance since percentages are stored (instead of absolute values).

In case of negative external conditions the maximum distance can be set directly. The system tells the user about the current distance in percentage of the total possible distance, and the user is allowed to change this value between the given one and the maximum one.

Based on the provided information, the system then creates the contextual condition predicate. It computes the relative tree path to the sample element and generalizes it [2007, 2008]. Moreover, it adds the specified attribute values and either creates a vicinity external condition [2007] or standard external condition, depending on the previous choice [2008]. The designer can choose to save the condition [2009] which is then asserted to the filter [2010] or cancel it [2011]. In the first case, it can be tested afterwards (as described above in 1708). "Save condition(s)" is in plural because when defining attributes one may have added auxiliary concept and comparison conditions.

(2) Imposing an Internal Condition to a Tree Filter (FIG. 21)

Internal tree conditions are constructed [2101] in a very similar way to external tree conditions. By default, an internal tree condition refers to the target pattern instance. However, internal conditions can also be imposed on the output of condition atoms. Hence, this can be changed by the designer [2102]. Then the system poses the question whether the designer is interested in a positive internal condition ("contains") or a negative one ("notcontains") [2103] (alternatively, this could be decided by two different menu items).

If the wrapper designer chooses to generate a positive internal condition, she visually specifies an element inside the current target [2104]. In our preferred embodiment this is realized by simple clicking into the highlighted target. Please recall that we do not allow general tree regions to be selected, hence element path generation is easier than for selecting pattern instances (as described in FIG. 27). After the selection of relevant attribute conditions [2105] (and related concepts/comparisons/patterns) (FIG. 22) the system creates a "contains" condition by computing and generalizing the element path and attaches the chosen attribute settings and related conditions to the filter, too [2106]. This condition is in our favorite embodiment reflected by the predicate "contains" as described in the language section; this predicate does not need a reference to the parent pattern instance, but to the actual pattern instance (or a condition output) only, hence in our preferred embodiment the path is in this case computed from the pattern instance (or from the condition element, if chosen in [2102]).

If the designer wants to specify that the pattern instance (or a condition output instance) starts with (resp. ends with) a specific element [2110] (e.g. with a bold-faced word), then she might additionally add a "firstchild" (resp. "lastchild") predicate [2111], but only if the system discovers that the selected condition sample is the first or last child of the pattern instance (or condition element). The system generates such a condition using the output of the "contains" condition and e.g. the pattern instance. In our preferred embodiment an example looks as follows: "contains(X,epd,Y),firstchild(X, Y)" Other embodiments might express this within a single specific predicate.

If the designer desires to add a "notcontains" condition, she visually selects an element outside the pattern instance [2107] but within the current parent pattern instance (or possibly, switching to another parent-pattern instance and specifying a new pattern instance sample to choose a negative example). Usually the designer wants to generate a negative internal condition because some element sometimes occurs inside the pattern instance and she is not interested in those. Therefore, she can either label a contained element in a negative example, or usually she labels an element which occurs outside the pattern instance to specify that this one shall not be contained inside.

Attribute selection is as before [2108] and the generation of the "notcontains" condition as for the "contains" condition [2109]. In our favorite embodiment, the "notcontains" condition uses an element path relative to the pattern instance as for "contains". If an external element is selected, then the element path is computed by using the chosen element name and attaching a preceding star (so even in that case no reference to the parent pattern instance is necessary).

In both cases, finally the designer can opt for saving the condition to the filter or cancel condition creation (in fact, in our preferred embodiment condition creation and filter creation can be cancelled in each step) [2113,2114,2115].

Figure 22:
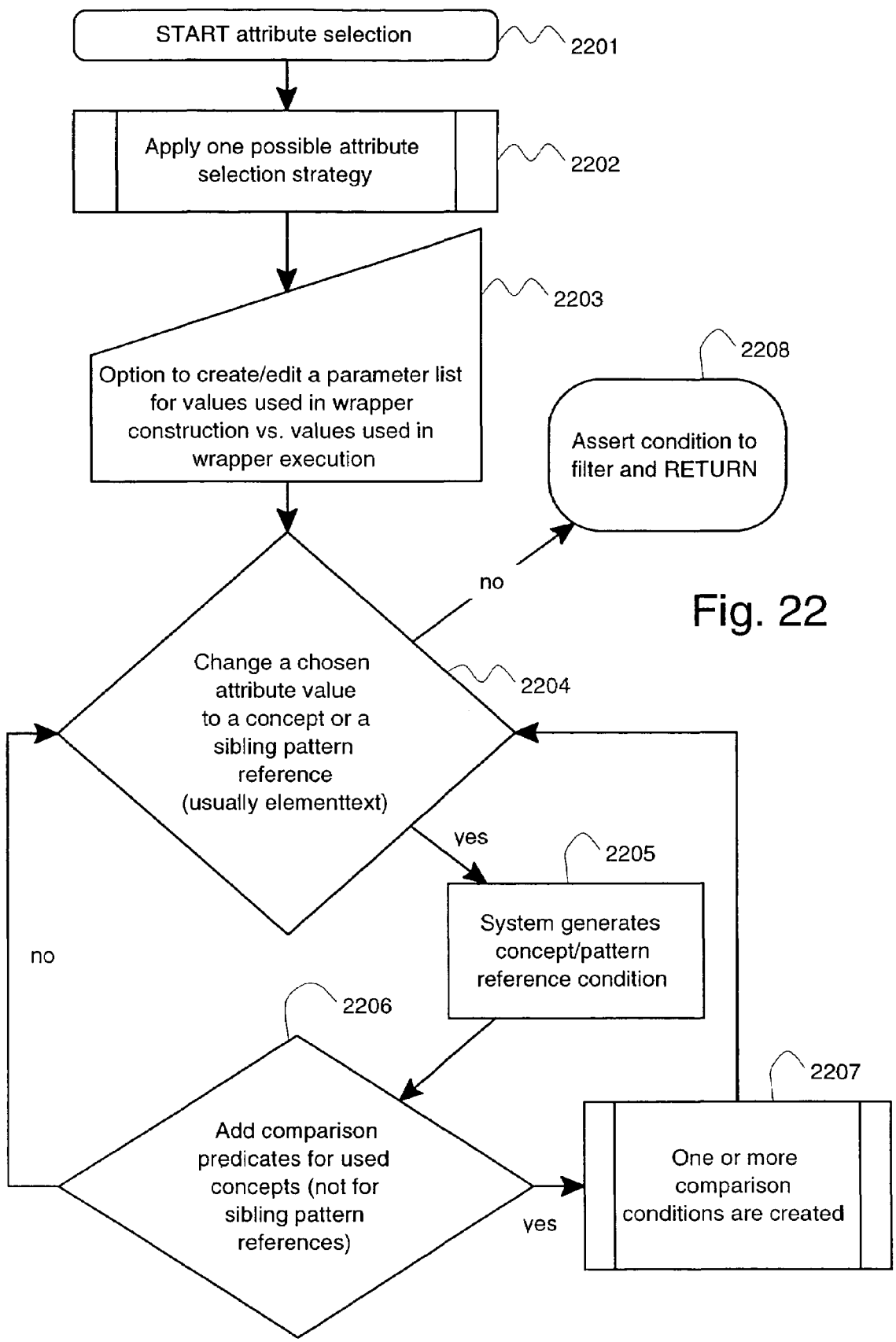

(3) Using Attribute Conditions in Tree Filters
(FIG. 22)

This process selects a number of attributes [2201] and imposes some value constraints on them. The constraints may be defined through constants, concepts, or pattern references. To illustrate the case of pattern reference, one could, for instance, require that a price pattern must occur after the desired pattern instance. Note that such pattern references do not necessarily refer to siblings of the pattern instance to be extracted (A sibling of a pattern instance is another pattern instance which has the same parent pattern instance). For example, one could require that a table contains some price; here, the table and the price may have different parent patterns, e.g. the home document pattern, and a table entry pattern, respectively.

Recall that the attributes we refer to are the attributes of the DOM tree including some virtual attributes defined by Lixto. Virtual attributes include:

elementtext containing the value of the content of the element. This is useful, as many conditions require to specify that there is something before the target which contains something in its text, e.g. "$" or a date.

colpos is attached to each table data entry (or similar designer-selectable tags in trees different from HTML). Its value is an integer or list thereof reflecting the position in the table. This attribute is useful in case the designer does not opt for hierarchic extraction.

imgdata is attached to each image tag (or similar designer-selectable tags in trees different from HTML). Its value is the binary representation of the image. With this, an image can be extracted by using an attribute filter.

There are various possible methods to implement the selection and constraining of attributes [2202]. In our preferred embodiment, this works as follows: Assume a designer has previously defined a class of objects through (the visual specification of) an element path definition and wants to restrict this class by imposing conditions on the attributes of its elements (the objects could be either extraction targets or marked-up before elements, or internal elements, etc.).

In order to achieve this, the designer marks (highlights) one example object that has the desired attribute-values and selects on the base of this element, which attributes are relevant for the desired class restriction. This selection is done via a menu offering the following options:

Select all occurring attribute designators and allow arbitrary values.

Manually select attributes, their required values and whether exact/substring match is required (with help of some suited UI).

Set and get default categories of attributes. With this method, the attributes are ordered in groups, e.g. font attributes, measure attributes. The system presents the designer the relevant groups and the designer selects which groups to consider and if an attribute value of the sample is relevant or not. The system moreover stores these categories as default chosen categories for subsequent choices.

Select default settings. Initial sets of default attributes for different types of HTML elements are provided by the system. These initial sets are used unless they were previously overwritten by other sets chosen by the designer in some previous action on similar HTML elements. In the latter case, the most recently used attribute set is used.

While the embodiment described is fully capable of achieving the objectives and advantages of the present invention, it is to be understood that the above embodiments are shown merely for the purpose of illustration and not for the purpose of limitation. Related embodiments may further rely on a designer profile pre-selecting the kind of attribute selection.

Alternative embodiments even allow designers to specify that only those elements are to be extracted, for which some attributes do not occur, or do not occur with a specific value (Elog can easily be extended to cover these aspects).

Lixto's mechanism for attribute selection can, moreover, work with dummy values and substitutions in case there is no suitable element on the example page having a desired attribute value. For example, imagine, a designer wants to teach the system to extract tables in which the word "Madonna" occurs, but currently no such table exists in an example document. In this case, a designer can use an existing attribute value as example during the visual wrapper construction phase and tell the system that this value should be replaced by the desired one during the wrapper program execution. For example, assume that the word "Beatles" occurs in some table, then the designer constructs a wrapper for extracting tables containing the word "Beatles" and then indicate the parameter substitution "Beatles/Madonna" stating that "Madonna" should be used instead of "Beatles".

In fact, the system can maintain a list of parameter substitutions and change them in step [2203]. An alternative embodiment allows to work without examples, but the designer just specifies some attribute conditions, which act either positive or negative examples.

Regardless of the previous method of attribute selection, the designer may decide to generalize some specified attribute values to a concept or pattern reference. The system automatically proposes available concepts and patterns matching the desired attribute value, and the designer may select one of these [2204].

If the designer chooses to generalize an attribute value to a concept condition, the system automatically generates an appropriate concept condition to be added to the rule body [2205]. In our preferred embodiment, concept conditions are unary and binary predicates such as "isPrice(Y)" or "isDate(X,Y)" (as already described), while pattern reference predicates are defined as pattern predicates i.e. such as "price(_, Y)", where "price" is a pattern name.

Observe that a condition predicate using a pattern reference still requires an element path which is created by the system as usual (In an alternative embodiment, the tree path of an element path definition could be a variable). For instance, the designer may restrict extraction items by expressing that a price element must occur before the extraction item. The designer has two possibilities of imposing such a restriction. Either she uses another pattern called "price" which was or will be appropriately defined during the same wrapper generation process, or she uses available concept predicates. The designer has the possibility to choose between these two options [2204]. This choice is implemented in our preferred embodiment via a pop-up menu with radio buttons and some text fields for entering either the name of pattern reference predicate or the name of the concept predicate.

We distinguish (as mentioned above) semantic and syntactic concept predicates. The latter are predefined regular expressions, whereas the former refer to an ontology database. Concepts can be compared with each other or with fixed values. Like for string filters in [1807], one can add comparison conditions [2206] to tree filters. Another figure explains the algorithm of how to add comparison conditions ([2207], FIG. 25). Observe that pattern reference conditions cannot be compared because they lack predefined comparison methods (otherwise they behave in the same way as concepts).

The described process of generalizing fixed attribute values to concept or pattern reference conditions can be repeated for each attribute. Finally, after all changes have been remembered in volatile memory, the designer can make these changes permanent by letting the system make suitable updates to the element path definition of the respective condition or extraction definition atom and saving the associated concept and pattern predicate reference atoms [2208].

(4) Imposing a Contextual Condition to a Text Filter (FIG. 23)

As described above, the generation of string conditions differs from the generation of tree conditions as string conditions do not rely on examples.

The first step when selecting to add a contextual condition to a text filter [2301] is (as for tree conditions) to opt for one of the following two modes: The standard mode is to refer to a target pattern instance. This can be changed to refer to the output of a previously constructed condition for the same filter [2302].

In [2303], the designer decides whether to add a positive external condition or a negative one, and determines the kind of condition (after or before). Next [2304], like in the construction of the extraction definition atom of a string filter, she specifies a concept or regular expression possibly containing concepts. Moreover, she can specify a pattern reference. Unlike with tree filters a pattern reference directly replaces the string path definition, e.g. "before(S,X,Y,0,100,P,Z),price (S,Y)" (using Y as string path definition variable).

Figure 25:
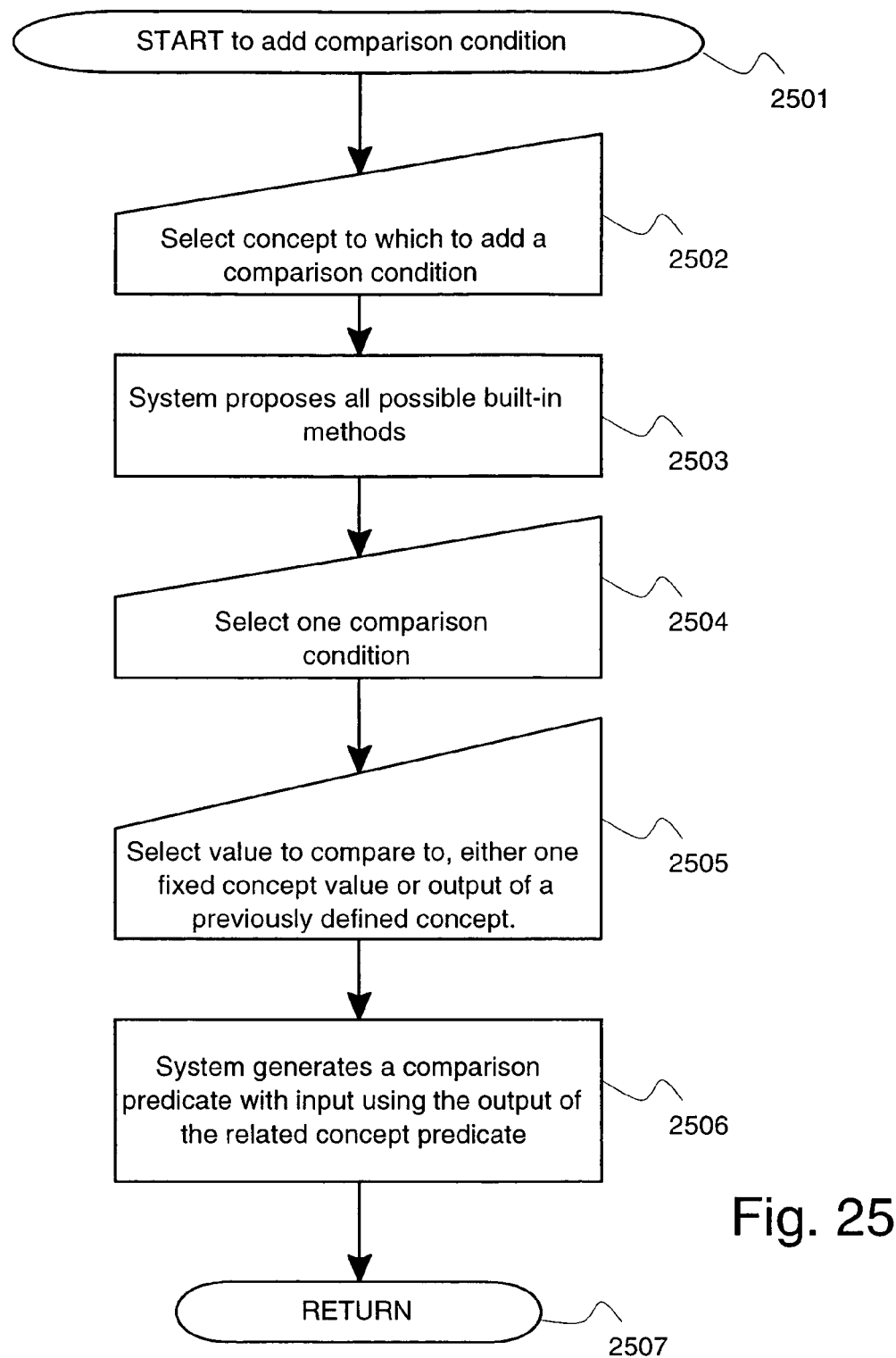

In [2305] the designer can decide to add comparison conditions to used concepts as illustrated in FIG. 25. Additionally, she can decide [2306] if to create a "standard" external condition or a "vicinity" external condition (as above for external tree conditions). In the second case she can specify distance tolerance for positive conditions, and a distance maximum for negative conditions [2307] (as for external tree conditions, hence not explained in detail again). In case the designer adds a distance, she has to select one sample condition instance and then she can proceed as in FIG. 30 for tree filter condition distance tolerance.

The system creates either a standard external condition by using specified concepts and comparison conditions [2309], or a vicinity external condition by further using the distance tolerance settings or distance maximum setting [2308].

Finally, the designer may choose [2310] to assert the condition to the text filter and return [2311] or to cancel condition adding [2312].

Figure 24:
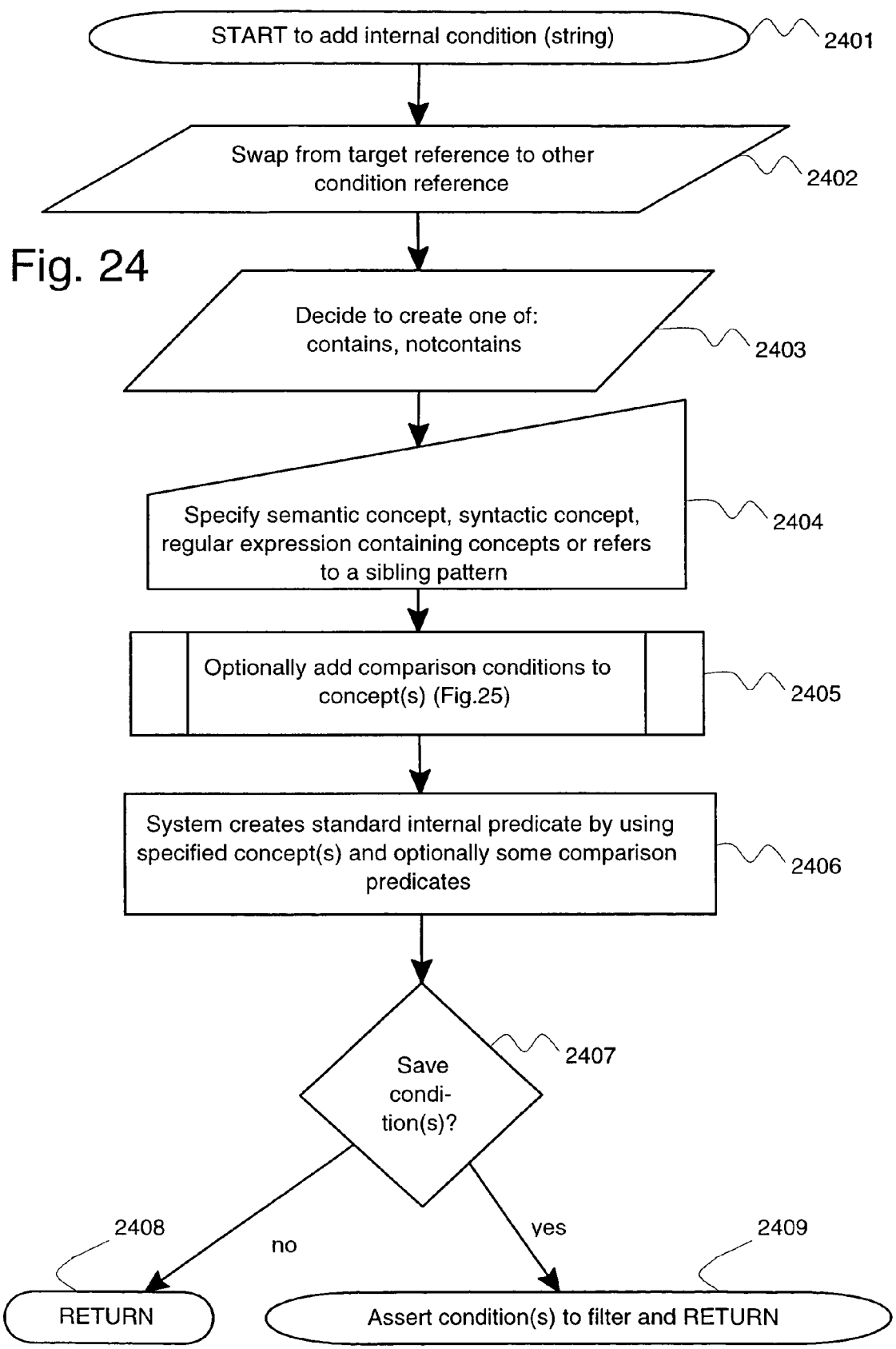

(5) Imposing an Internal Condition to a String Filter (FIG. 24)

Internal string conditions [2401] can be added to both text filters and attribute filters (-even the same class can be used to represent the internal condition w.r.t. the implementation). The description how to add an internal string condition is brief since most processes have already been described for other conditions.

Internal conditions are of use for text filters because a designer may decide to characterize a string filter with a semantic concept and then would like to specify an internal syntactic condition or vice versa. They are of use for attribute filters to restrict extraction of attribute values to those who match additional conditions.

First, the designer can choose to swap from pattern instance reference to a condition instance reference (for instance expressing to characterize the interior of a before condition) [2402]. Then she selects whether to create a positive or negative internal string condition [2403]. Since string extraction is not defined via examples, she specifies a concept or a regular expression containing concepts (or she may even refer to another pattern) as indicated in [2404]. Additionally, she might desire to impose comparison conditions to used concepts [2405].

The system creates an internal predicate by possibly using specified concepts and comparison predicates [2406] and adds these to the filter. Finally, the designer has the choice to assert the condition [2407] to the string filter [2409] or to cancel building [2408].

(6) Using Comparison Conditions (FIG. 25)

For each concept some methods are predefined which can be used for comparison. After having selected the actually used comparison condition (e.g. concept "is a city", comparison "equals Milan regardless of language" or concept "is a date", comparison "smaller than 12.3.1998") the designer can specify the comparison parameters such as "Milan" or "12.3.1998" (which are instances of the same concepts).

Concept comparisons can be used both in the generation of tree filters and string filters.

In our preferred embodiment, the system uses the output variable of the related concept predicate and uses it as input variable of the comparison predicate. One parameter can be a constant, at least one must be a variable.

When the designer decides to add a comparison condition [2501] she has to select the concept she wants to attach the comparison to (as discussed above) [2502]. The system then proposes all currently defined methods for this concept [2503] (e.g. for "date": "earlier than", "later than", "is a Friday"; several different date formats are detected). Some comparison conditions have parameters to be chosen by the designer such as "is a particular weekday". In [2504] the designer selects one of these comparison conditions. In [2505] she sets the parameters. Moreover, she decides whether to compare with a fixed value or some other output variable defined in the corresponding condition. The system responds by generating a comparison predicate [2506]. As input, the output of the related concept predicate is used. This process finishes [2507], and the main process asserts the generated conditions to the filter.

In our favorite embodiment, comparison conditions are reflected by comparison predicates such as "earlierthan(Y, 12th Apr. 2001)". The input variable Y is occurring as output in the attribute list of another condition (e.g. a before condition) and is also an input for the concept predicate (e.g. "date(Y)").

(7) Imposing Range Conditions to a Filter (FIG. 26)

Range selection is not example-based. If the designer selects to cope with a range condition [2601], she can choose to add a new interval or delete an existing one [2602]. In the first case, the designer creates a new interval [2603]. In our preferred embodiment she can choose to click on parts of the document before and after which no targets shall occur and let the system create the range itself. In an alternative embodiment this can be set with sliders. In the second case, the designer may choose to delete one interval [2604]. In our preferred embodiment it is moreover possible to combine redundant intervals.

The system adds the new interval to the rule [2605] or deletes an existing interval from the rule [2606] and returns [2607].

If a rule is modified, for instance if a before condition is added, then the wrapper designer has the possibility to specify a new range condition, given that the old range condition no longer returns the correct result.

Figure 27:
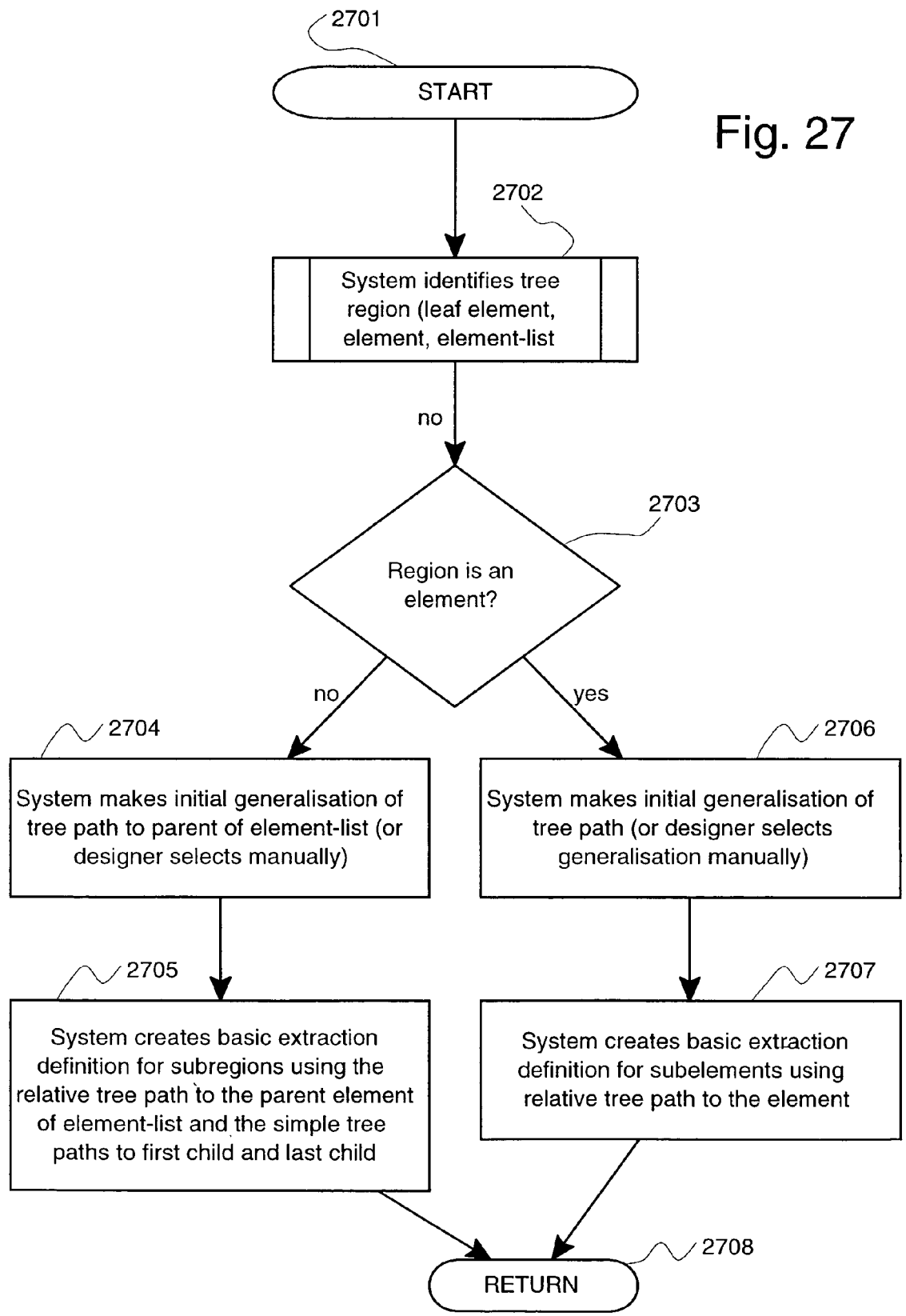

(8) Computing a basic Tree Extraction Atom (FIG. 27)

Here the process of the generation of the basic tree extraction definition atom is discussed in detail. The designer submits two offsets when the process starts [2701]. In our preferred embodiment this is done via two consecutive mouse clicks (or a double click which is interpreted as leaf element).

In [2702] various heuristics are applied to identify a tree region. In general, a suited element is generated based on the two chosen offsets. If not possible, a general tree region is generated instead. In our preferred embodiment two equal offsets are interpreted as leaf element which occurs at this offset. Moreover, if the two offsets are close to an element, an element is generated, otherwise a list of elements (a tree region in general).

In [2702] the system creates a tree path to the tree region. In case of an element it is the tree path to the element, in case of a general tree region it is the path to the parent element of the element list. Moreover, the first and last entry of a list are characterized by a simple tree path (later, attributes can also be attached to these, too). Observe that this tree path is always relative in the sense that its root is the current parent pattern instance root.

If the system has created an element ([2703] is a system choice, not a designer choice), then it applies generalization techniques [2706] to it to match various targets which then can be restricted by conditions later. Our preferred embodiment takes the full tree path and inserts wildcards at each step (see the language section for formal definition). Moreover, it offers alternative ways of generalizing (such as dropping path elements which are far away from the element itself) and the designer can view the matched targets for each and select one. Alternatively, she is allowed to manually modify the tree path [2706]. Based on the basic element path the system creates the basic extraction definition atom [2707] and returns [2708].

The process is quite similar for the case of tree regions in general ([2704],[2705]). The only difference is that additionally two simple tree paths are created (which do not need to be generalized) to create the extraction definition. In our favorite embodiment the system proposes some conditions to be added immediately which allow that the selected sample target is among the matched ones. Otherwise, if e.g. minimization is chosen, the sample target may not be among the extracted targets.

(9) Constructing a Document Filter (FIG. 28)

Document filters [2801] can be created depending on the choice [2802] whether the parent tree pattern has as instances elements where a hyperlink occurs, or whether the parent string pattern has as instances strings which are URLs. In case of heterogeneous program construction, document patterns can take multiple filters.

In the first case, the system creates one or two patterns. First a string pattern with an attribute filter extracting the value of the link attribute is created [2803]. Second, a document filter is defined with these values as pattern instances; either a new document pattern is created or the filter is attached to an existing document pattern [2804]. In the second case, one filter is created (and possibly a new pattern) [2804]. After having defined to which pattern the filter is asserted, the system creates the new document filter [2805].

Document patterns normally do not take any conditions (some possible conditions are, however, discussed in the language section). They simply consist of the extraction definition atom getDocument which has a source variable (an URL string) and a target variable (an HTML page or tree in general). The designer can choose to add some sample documents of a new document pattern [2806] before she asserts the filter [2807].

If the designer opts that a filter shall point to a document pattern as parent pattern, there are several choices of how to visualize the selection of a parent pattern instance. In our preferred embodiment, this is carried out by generating a Web page which contains the URLs of all possible instances of the document filter with the first one highlighted. The designer can choose one of these, and follow the link to select a sample target pattern instance.

d) Constructing an XML Translation

In our preferred embodiment we decided to split into an extraction phase and a translation phase. The same could be carried out directly by moving all or parts of the translation phase directly into the system. Those skilled in the art will recognize that all or parts of the described XML translation could be shifted to the wrapper definition process (such as the possibility to set a flag to auxiliary patterns). Moreover, those skilled in the art will recognize that our approach can also act as XML query language.

The wrapper designer can visually construct an XML translation scheme, i.e. adapt the function values for each pair (pattern, parent-pattern). Each arc in the pattern graph represents such a pair. For each such arc the designer can specify an XML translation. In our preferred embodiment, a list containing each possible pair is stated. Alternative embodiments display parts of the graph as tree as for pattern construction.

In our preferred embodiment, the wrapper designer can enter the six arguments (specified in the evaluation section) with the help of checkboxes and selection lists. Alternative embodiments can add more arguments, e.g. including dependencies such as "write this pattern instance only if the pattern "price" has no instance within the actual parent-pattern instance". Moreover, leaf instances could be decided to be written as attributes of their parent instances.

e) Concept Editor

Experienced developers also can access the concept editor of Lixto to add new concepts. New concepts for instance can be specified as regular expressions, or with a reference to an ontology database with a convenient visual interface. Moreover, every designer can choose to add "advanced concepts", these are concepts which allow comparison methods to be defined. In our preferred embodiment such advanced concepts are stored as Java classes with methods following particular guidelines, whereas standard concepts are simply defined in an XML file.

G. Empirical Results

These results illustrate using the preferred embodiment of the Lixto wrapper generation tool onto various sample documents. We chose twelve example sites (FIG. 7, Table 1), some of which were already used for testing purposes by other wrapper generators. Several designers of whom not all are familiar with details of HTML contributed to our test results. Initially, we asked them to create a wrapper based on a single example page. Then we raised and answered with the help of people who use Lixto the following questions and remarks in Table 2:

1. Is it possible to wrap this page with Lixto?
2. How "complex" is the constructed program for this site? (ratio of required predicates to used output patterns)
3. What is the percentage of correctly wrapped pattern instances of a number of randomly chosen similarly structured test pages with a wrapper written on one example page only.
4. How many example pages are necessary (due to structural deviations) to get 100 percent of correctly matched pattern instances?
5. Moreover, we specify the time needed for constructing the initial wrapper based on one example page. Additionally, the time for constructing one output pattern is computed to gain a measure how much "thinking time" was required for each output pattern.
6. In the last row the depth of the pattern tree is specified.

Let us describe some more details: On eBay the initial wrapper worked well on almost all test pages like queries on cars, football, etc. However, one filter rule of date required that dates must contain a colon and a dash. This matched one item description, too, which used both. Hence, the pattern had to be refined based upon the knowledge of this second page to match 100% of the patterns of all example pages. For the CIA Factbook, the designers chose a bad example page: United Kingdom has one border country only, hence many mistakes occurred in the creation of multiple such tags for other countries. However, even after improving these filters, Albania had to be treated in a special way since some arguments were given in brackets which destroyed the string pattern extraction. Therefore an additional auxiliary pattern was added to split the bordering countries string and then analyze its parts. The wrapper for DBLP relies on a number of intermediate auxiliary patterns, indicated by the high nesting depth of the document. For the CNN pages of the US election results per state, a wrapper just extracting names of president candidates and received votes was written in a few minutes; due to a very homogeneous structure, one example page was sufficient to extract these data for all states.

Using the initial Travelnotes wrapper some numbers and explanations were messed up on some testpages, and two more pages helped to clarify these issues. The "Jobs Jobs Jobs" site is the only example where the number of needed sample pages depends on the number of test pages due to a wide variety of structures for job offers. The Perl Module List is a special case, since we are merely interested in writing a wrapper for a single Web page. However, in this case this is not straightforward. This list uses mainly preformatted text, hence the program heavily relies on string extraction. Due to the current implementation some auxiliary patterns are needed, and some clever constructions to obtain a 100% match for the five chosen patterns (module group, leaf patterns name, DSLI, description, info). We conclude that a large amount of Web pages can be visually wrapped with Lixto. For none of the test pages the wrapper designer had to modify the Elog program manually! However, sometimes a wrapper could be simplified if even more features of the theory were already implemented. Some sites such as DBLP have a rather difficult structure (high complexity and depth of patterns required), however, Lixto did well with these pages, too, and correctly extracted all authors, the journal, the paper title and a possible link etc. for each paper entry. Wrapper construction is usually very fast. More time was only required if more complicated regular expressions were needed, and for removing subtle errors. The program length measured in predicates used is never unreasonable large compared to the output patterns (ranging from 1.78 to 4.4). The designer never had to consider more than three example pages to get a 100% match for all test-pages.

H. Implementation and Packaging of the Preferred Embodiment

Figure 4:
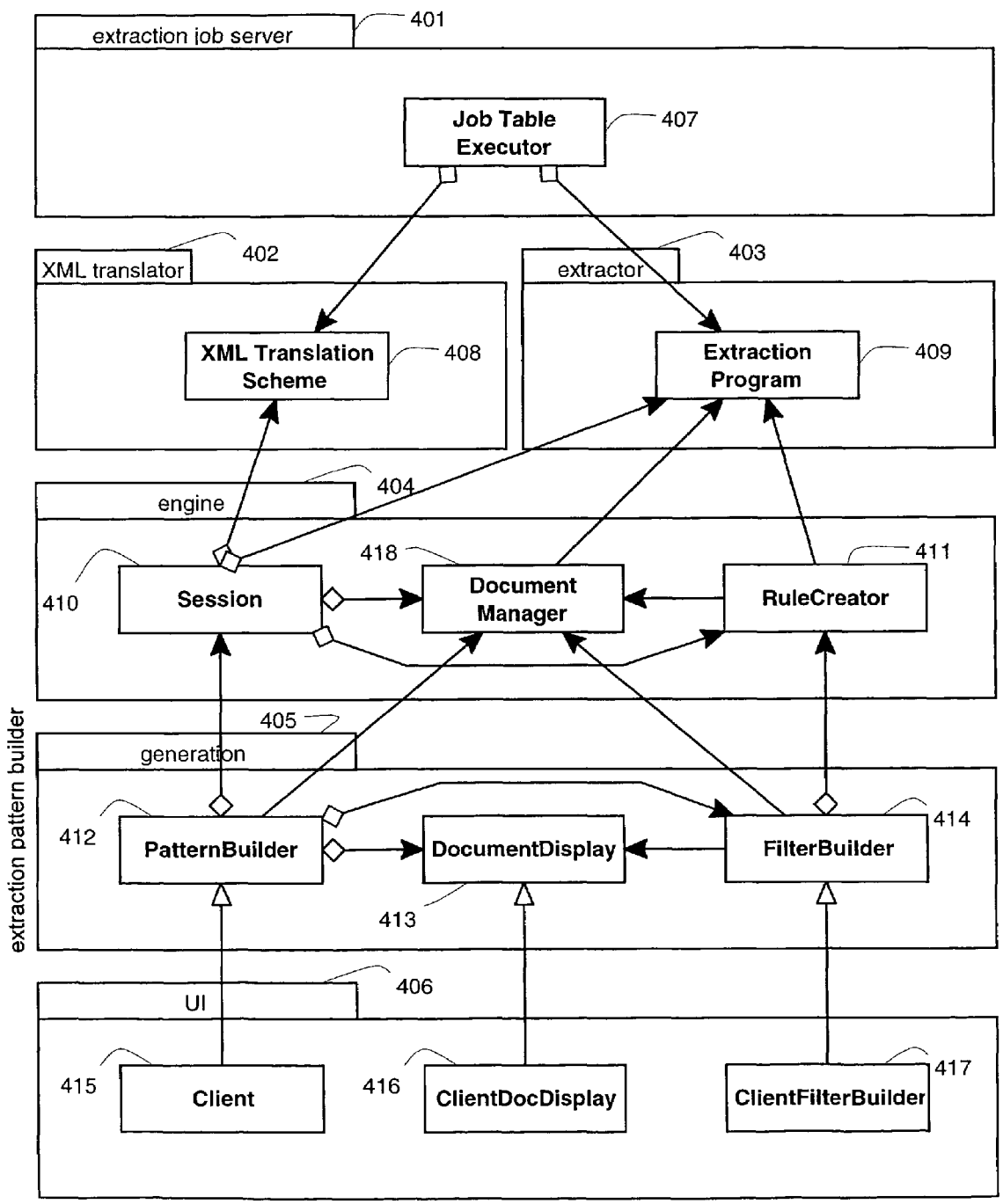

Our preferred embodiment is illustrated in FIG. 4. At the moment, let us ignore the top-level package extraction job server and its dependencies—this package is described in the ramifications and not necessarily included in the Lixto implementation.

Both modules of the visual builder [103] modules are together organized as a tier consisting three blocks, engine [404], generation [405] and UI [406] packages. Dependencies exist only between engine and generation, and generation and UI. Standard notation is used for UML class diagrams (see e.g. Martin Fowler, "UML Distilled: A Brief Guide to the Standard Object Modeling Language", Addison-Wesley, ISBN 020165783X). The depicted class structure has been simplified for representation issues. Our preferred embodiment makes use of JDOM (http://www.jdom.org) and XERCES (http://xml.apache.org) for parsing and dealing with XML documents. Moreover, it uses OroMatcher for regular expression matching (http://www.savarese.org/oro/software/OROMatcher1.1.html). These packages can easily be replaced by other equivalent ones.

(1) Engine Package

Engine [404] accesses the extractor [403] package which interprets Elog programs and the XML translator [402] package which provides methods to transform the pattern instance base [108] into an XML file [113], possibly removing auxiliary patterns, moving patterns elsewhere and so on.

An alternative embodiment does not rely on a three-tier builder structure, but provides logic together with the generation algorithm and visualization. This has the disadvantage that it is not straightforward to replace the frontend. However, it has the advantage that the system does not need to "label" the document with offset information and remove other links as described below. This all-in-one approach relies on the Java Swing parser for both visualization/selection and program generation. Those skilled in art will easily recognize that other embodiments are also in the spirit of our invention.

The engine[404] represents the logic of the builder module. Here, rules and patterns are actually created and added to the program based on the user-defined parameters. Its main classes are Session [410] and RuleCreator [411]. The extraction program [409] is implemented as Java TreeModel: The first children of a pattern are its filters followed by its child patterns. In case of heterogeneous programs, parts of the extraction program are presented as tree. Patterns which occur more than once are displayed in italics without their children, but they can be expanded by clicking on them. Conditions and the extraction definition atom are leaf nodes. Each Session owns an extraction program [409] and an XML translation scheme [408]. Session [410] handles tasks such as:

adding and removing patterns
adding and removing filters
adding and removing conditions
testing patterns and filters (in whole document)
loading/saving (the program as XML), import/export various formats (in particular, text and serialized objects)
creating and using a RuleCreator
creating a parsed document One of its main fields is program which stores the so-far created program. In this approach, the pattern instance base is always recomputed, because this is easier to handle when e.g. an individual filter is deleted. A DocumentManager [418] handles loading and managing of documents and parts of documents.

To add a new rule, a RuleCreator [411] is created and used. The rule creator uses the field rule to store the current rule. It contains several methods such as methods for computing a region
creating a rule
adding a condition
getting attributes of sample target
testing the rule inside current sample pattern instance
creating a parsed source
adding attributes
tree path modifications These methods receive inputs such as a parent pattern instance (using identifiers) and a number of character offsets. For instance, if the designer labeled a sample target for rule creation inside one sample pattern instance, the start and end offset of this target (and some other information) are passed on together with the parent pattern instance as identifier.

We chose this procedure instead of passing parsed sources and elements, because if the different tiers are on different computers using different Java versions, the document might be interpreted in a different way. Moreover, this freedom assures the possibility of various different frontends. For instance, in the servlet frontend the user is allowed to label documents in her favourite browser and access the menus as HTML forms. We, however, do not use the document object model and parser used in this browser for evaluating user's choice, but instead pass on element offsets and the pattern instances as identifiers which are evaluated in the engine [404] using the Java Swing parser. Moreover, we do not only rely on relative tree paths as described in the language section, but also on relative offsets while creating a rule.

(2) Generation Package

The generation tier [405] knows three main classes which are PatternBuilder [412], DocumentDisplay [413] and FilterBuilder [414]. This package is responsible for carrying out the generation algorithm as it tells the system which procedures to call in which order. This tier implements the flowcharts describing program generation. However, the actual generation is carried out by engine [404] and the actual interface to the user is provided by UI [406]. In this preferred embodiment rules do not need to be created in strict order but can easily be revisited and modified.

This package provides clear interface definitions to interact with the engine [404] package and the UI [406] packages. It especially determines which methods a possible frontend has to implement to show user interfaces and which methods it needs to call.

PatternBuilder [412] processes all of the basic menu actions. These are the extraction program editing actions from the main user interface. It launches rule adding, rule deletion, condition adding, condition deletion etc. It contains abstract methods to show the parent pattern selection interface, to show the document management interface and the main pattern tree interface. The document management interface handles the set of Web pages where the user selects the sample page(s) from as described in the flowcharts.

The FilterBuilder [414] drives the algorithm for generating filters. It belongs to the pattern builder. It launches rule creation, and pattern instance selection (to select or re-select one target instance), and attribute selection, and possesses abstract methods for displaying attribute selection dialogues, pattern selection and tree path selection.

The DocumentDisplay [413] belongs to the pattern builder. It contains abstract information for displaying a document, a pattern instance and several variants of highlighted documents or pattern instances, e.g. a document with highlighted test results of applying a filter. Moreover, it could contain abstract information about the user interfaces of [412] and [414], too.

Session [410] returns the targets of the filter as list of absolute document offsets. Different frontends know different ways of presenting such a highlighted document. DocumentDisplay [413] does not display the document as it is, but gets a modified version from the document by Session [410] which is usable for every UI frontend. Such a document presentation attaches a javascript to each symbol (or alternatively, word) and removes some complex and unnecessary stuff such as other links. Each javascript call moreover contains the information at which character offset the actual target occurs so that in an actual realization of the document display the offsets can easily be obtained regardless of the frontend.

Generation [405] stores all of the information received during the pattern creation and testing process. This avoids problems with frontends as the servlet frontend when the user opens a dialogue in a new window and works in both windows simultaneously. The system can manage this via cloning. Moreover, the result of "back" buttons is handled in this package and the document navigation history. Generation allows only one accessible dialogue at one time to maintain compatibility with a servlet frontend.

(3) UI Package

The UI [406] is a frontend for using Lixto. Various frontends can be added without much effort by simply accessing and implementing the existing methods in generation [405]. The Client [415] class is an entry point to the client GUI, responsible for displaying the currently relevant information to the user in a fancy and intuitive way and for providing buttons, menus etc. Exactly one dialogue frame can be displayed on the screen at one time (to assure compatibility to the servlet frontend). ClientDocDisplay [416] is the actual realization of the document display and ClientFilterBuilder [417] provides the methods to display the user interfaces corresponding to filter creation. In our preferred embodiment three different frontends are available:

- Java Frontend: This frontend can reside on the same as well as on a different machine as the other packages. It provides a Java UI and relies on the internal Java Swing browser (improved w.r.t. several issues by us) for display issues. Each dialogue is presented as Java frame. The document display actually uses the swing parser again, however, only for display and to retrieve the additionally stored offsets of the "labeled" document. Hence, it causes no problems if the client builder resides on a different machine using a different swing version which interprets elements differently or uses different offsets.
- Servlet Frontend: The servlet UI allows the user to use her favorite browser. The dialogues are realized as HTML forms, and below these forms, inside a table (or alternatively, in an own browser window or frame), the sample document or sample pattern instance is presented. Get and Post commands are used for interaction.
- A regression test frontend: This frontend uses a number of predefined example wrapper generation steps to test the wrapper generation process. It lacks user interfaces, but the UI outputs are feigned in these examples. It can be used for benchmark testing w.r.t. correctness of an update.

In the pattern structure dialogue, the system presents the user the current pattern structure of the extraction program, displaying each pattern, its rules and its child patterns, and moreover, the conditions. As described above, in case of allowing multiple parent patterns, a tree presentation of the pattern graph is created by attaching copies of sub-trees (and if necessary, dots, too), which are displayed in italics and gray in our preferred embodiment. In the client version a selected pattern can be removed or a rule or child pattern added with a single button selection. In the web version (i.e., servlet version), each pattern provides its own buttons.

(4) Extraction Job Server

One possible way how an extraction job server might look like is presented in the ramifications. The extraction job server uses the extractor and XML translator package.

The Executor [407] in the extraction job server [401] provides a visual user interface for creating and manipulating job tables. The executor of our preferred embodiment is implemented as Java servlet, allowing different wrapper designers to get different views on it and to provide job entries to other developers.

I. Ramifications

(1) Complement Extraction

Lixto also supports complement extraction, i.e. defining an extraction pattern which extracts everything except the selected tree region(s). This can be used to remove advertisements from Web pages.

(2) Work on More than One Sample Document

The Lixto method to create patterns can equally work on more than one start page by opening each of them in an own browser.

(3) Universal Quantifiers for Condition Selection

Instead of requiring that just some descendent element of a pattern instance must satisfy some particular attribute condition, one may require that all descendent elements have to satisfy it. Using this kind of universal quantification, one can e.g. express that a table has to contain all its text in red.

(4) Using XPath and XSLT

Element path definitions can be expressed within an extended XPath syntax (additionally, variables of attribute conditions need to be supported). Moreover, for a limited class of Elog programs, we offer a translation to XSLT. Such an XSLT program is quite complex as it can not be represented as simple as an Elog program. To use this XSLT program, the HTML input needs to be (or be converted to) XHTML.

(5) Range Conditions on Patterns

Range conditions can be imposed on the output of patterns in the same way as they are imposed on the output of filters.

(6) Elog PDL Editor

The designer has the choice to work in an interactive Elog editor which presents rules as clickable colloquial expressions. This editor "colloquially" expresses Elog rules in a language called Pattern Description Language. This editor describes Elog rules in a formal language close to standard English. Parts of this description are clickable, and can be changed by the designer. E.g. if the user clicks on the keyword "after", she is shown a selection menu, where she can change this word to other possible values (here: "before", "notbefore", "notafter").

Figure 32:
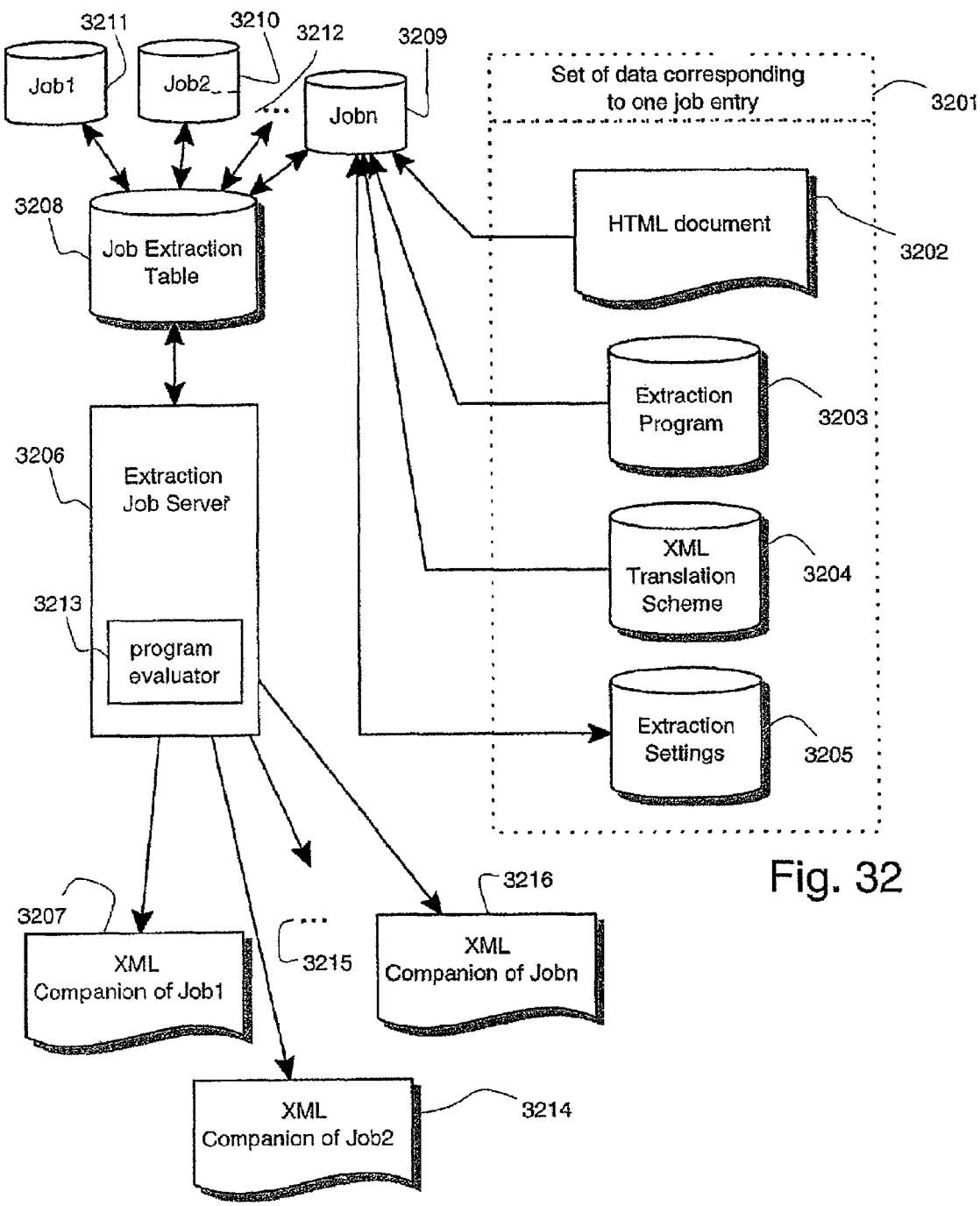

(7) Extraction Job Server (FIG. 32)

FIG. 32 illustrates the Extraction job server [3206]. This is an application where the program evaluator [3213] is used continually or repeatedly with the same Elog program on Web pages with changing content. For each job, the extraction job server can handle several jobs of a job table [3208], where each job [3209,3210,3211,3212] (more jobs are indicated by dots in [3212]) has the following input parameters [3201]:

an HTML page [3202]
an extraction program [3203]
an XML translation scheme [3204]
further extraction settings, such as the relative or absolute query time intervals [3205]

The extraction job server [3206] produces as output an XML companion [3207,3214,3215,3216] for the respective job. In our preferred embodiment, the extraction job server is implemented as servlet, allowing to give different users different views of the job table.

(8) Compute Interesting Results

Lixto can be used for tasks not only concerned to extraction. One can extend the system to e.g. extract only the smallest price of a number of prices occurring on a Web page.

(9) Consistency Check Alerts

A designer may specify so-called consistency constraints to filters, patterns or Elog programs. Such a constraint requires that at least one pattern instance must be extracted by the filter, pattern, or program (in the last case, disjunctive constraints can be specified, e.g. of two particular patterns, one must have an instance). More complex constraints can be included in the system, too (e.g., requiring two extracted pattern instances).

If the consistency condition is not fulfilled, a warning signal is given or a warning email is sent to an administrator and/or wrapper execution is stopped. Consider a wrapper designer, who once created a wrapper and uses it since then for repeated extraction; after three months, the structure of the page changes significantly and he could lose some information without even knowing about it. The wrapper program hence can give some warning message that some structural conditions are no longer fulfilled, and this page does not classify as a suited page for this wrapper. It is useful that such consistency conditions can be specified by the wrapper designer herself, because she knows best, which requirements to pose as conditions for stable extraction.

As just said, one way to create consistency conditions is to mark that some patterns need to have at least one instance to make the wrapper consistent (in this case, labeling a checkbox for such a pattern is sufficient). Such patterns are constructed in the same way as ordinary ones. They do not necessarily need to extract information.

(10) Possible Example Scenarios

One possible scenario uses Lixto wrappers to wrap sites of TV broadcast companies and provide an user interface to query the combined XML companions of TV program HTML pages of various channels.

Another scenario is to provide support in programming a video recorder. Instead of typing in a VPS number one can choose to type in the name of an interesting broadcast. The VR returns more information about this from a wrapped database and the option to program one of these broadcasts.

(11) Information Pipes System

In one of our embodiments, the extraction job server is embedded into a user-personalizable information process flow which accesses the XML output in order to query it and deliver parts of it to the user in case of changes, and a merger to map several XML outputs of different wrappers into a common scheme. Lixto wrappers can be embedded into a personalizable user information pipe. There information is processed from various sources, wrapped, merged, transformed and finally delivered.

Lixto is a tool for Web information extraction, information labelling and translation to XML. Its ideal companion is the InfoPipes system, which provides a tool for Information integration and transformation, and multi-platform information delivery.

InfoPipes takes care of navigating through passwords, HTML forms, etc. to provide Lixto an HTML page to wrap. InfoPipes is capable of integrating various XML companions, transforming them, and querying them by providing easy-to-use graphical interfaces for manipulating XSLT. Finally, the information can be delivered via email, SMS or into a database, or stored as HTML or XML. New deliverers can easily be added.

One possible example scenario uses Lixto wrappers to extract the currently played song title and interpret from radio-station's Web pages, and to integrate this information with the current chart position, lyrics, and where to buy the respective CD. All this information is extracted from various Web pages. This way, one is regularly informed about the currently played title of various radio-stations and additionally receives a variety of background information.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for visual and interactive generation of wrappers for documents, and for automated information extraction comprising:
    defining extraction patterns on at least one example page, by visually and interactively selecting example-elements occurring on the example-page;
    visually and interactively declaring properties of the extraction patterns;
    generating a wrapper;
    applying the wrapper to at least one production document; and
    automatically extracting matching instances of the extraction patterns from the production documents
    wherein the processes of generation of a pattern further comprises:
    a) receiving from a user a pattern name and storing said name;
    b) creating and storing a filter for the pattern;

c) visualizing the set of instances of the filter on at least one example document by evaluating the filter over the document and visualizing all data elements of the document that are matching instances, whereby a user can test the filter;
d) modifying a previously created filter by adding to it refinement conditions that the instances of the filter must fulfill, where the refinement conditions are obtained from a user by receiving interactive commands from the user and where the refinement conditions are combined with those conditions for the filter that were added earlier;
e) visualizing simultaneously all instances of all filters of the given pattern on at least one document by evaluating its corresponding pattern description against the document, whereby a user can test the pattern description constructed so far,
wherein one of said refinement conditions is an internal condition expressing properties which the instances of a pattern must fulfill regardless of their context,
wherein the representation of each of said filters is organized according to a logical conjunction of all conditions contributing to said filter, and where the representation of each of said patterns is organized according to the logical disjunction of all filters contributing to said pattern, whereby a pattern can be defined via successive narrowing and broadening steps corresponding to the addition of a new condition to a filter of said pattern, and to the addition of a new filter for said pattern, respectively.

2. The method of claim 1 wherein the representation of each of said filters is organized as an explicit Boolean conjunction of all conditions contributing to said filter, and where the representation of each of said patterns is organized as an explicit logical disjunction of all filters contributing to said pattern, whereby a pattern can be defined via successive narrowing and broadening steps corresponding to the addition of a new condition to a filter of said pattern, and to the addition of a new filter for said pattern, respectively.

3. A method for visual and interactive generation of wrappers for documents, and for automated information extraction comprising:
defining extraction patterns on at least one example page, by visually and interactively selecting example-elements occurring on the example-page;
visually and interactively declaring properties of the extraction patterns;
generating a wrapper;
applying the wrapper to at least one production document; and
automatically extracting matching instances of the extraction patterns from the production documents,
wherein the processes of generation of a pattern further comprises:
a) receiving from a user a pattern name and storing said name;
b) creating and storing a filter for the pattern;
c) visualizing the set of instances of the filter on at least one example document by evaluating the filter over the document and visualizing all data elements of the document that are matching instances, whereby a user can test the filter;
d) modifying a previously created filter by adding to it refinement conditions that the instances of the filter must fulfill, where the refinement conditions are obtained from a user by receiving interactive commands from the user and where the refinement conditions are combined with those conditions for the filter that were added earlier;
e) visualizing simultaneously all instances of all filters of the given pattern on at least one document by evaluating its corresponding pattern description against the document, whereby a user can test the pattern description constructed so far,
wherein an element of a document is either an ordinary element or a sequence of contiguous elements, and wherein each of said internal conditions belongs to a set consisting contains conditions, notcontains conditions, firstsubtree conditions and lastsubtree conditions;
wherein contains conditions impose one or more restrictions on some subelement of the pattern to be defined,
notcontains conditions require that instances of the pattern to be defined do not contain subelements satisfying specified restrictions,
firstsubtree conditions require that some element with specified properties be the first element of a sequence of elements to be defined; and
lastsubtree conditions requires that some element with specified properties be the last element of a sequence of elements to be defined
where said restrictions are selected from a set consisting of
restrictions on font type,
restrictions on font size,
restrictions on font color,
restrictions on the text contained in said subelement,
restrictions on hyperlinks and other anchors,
restriction on explicit positional parameters,
restriction on element types, and
restrictions on the value of a hidden attribute
where at least one of said restrictions is expressed in terms of a predefined ontological concept.

* * * * *